United States Patent
Weising et al.

(10) Patent No.: US 11,504,628 B2
(45) Date of Patent: Nov. 22, 2022

(54) SYSTEMS AND METHODS FOR GENERATING A META-GAME FROM LEGACY GAMES

(71) Applicant: Sony Interactive Entertainment LLC, San Mateo, CA (US)

(72) Inventors: George Weising, Culver City, CA (US); David Thach, San Mateo, CA (US); Ernesto Corvi, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/220,227

(22) Filed: Apr. 1, 2021

(65) Prior Publication Data

US 2022/0314124 A1 Oct. 6, 2022

(51) Int. Cl.
*A63F 13/69* (2014.01)
*A63F 13/85* (2014.01)
*A63F 13/46* (2014.01)

(52) U.S. Cl.
CPC .............. *A63F 13/69* (2014.09); *A63F 13/46* (2014.09); *A63F 13/85* (2014.09); *A63F 2300/61* (2013.01)

(58) Field of Classification Search
CPC .......... A63F 13/69; A63F 13/46; A63F 13/85; A63F 2300/61
See application file for complete search history.

(56) References Cited

U.S. PATENT DOCUMENTS

| 2006/0046824 A1* | 3/2006 | Silva ................... G06F 9/455 463/16 |
| 2014/0066177 A1 | 3/2014 | Zalewski |
| 2014/0094314 A1* | 4/2014 | Watson ................... A63F 13/70 463/42 |

(Continued)

FOREIGN PATENT DOCUMENTS

EP 2745893 A2 6/2014

OTHER PUBLICATIONS

PCT/2022/021792, Notification of Transmittal of the International Search Report and the Written Opinion of the International Searching Authority, or the Declaration, PCT/ISA/220, and the International Search Report, PCT/ISA/210, dated Jul. 15, 2022.

(Continued)

*Primary Examiner* — Kevin Y Kim
(74) *Attorney, Agent, or Firm* — Penilla IP, APC

(57) ABSTRACT

A method for generating a meta-game is described. The method includes receiving, via a first user account, a first user input for a first challenge during a play of a legacy game. The first challenge is created from a first plurality of basic blocks of the legacy game. The method further includes recording at least a portion of the first challenge and receiving, via the first user account, a second user input for a second challenge during the play of the legacy game. The second challenge is created from a second plurality of basic blocks of the legacy game. The method includes recording at least a portion of the second challenge, determining whether a third user input is received via the first user account to request creation of the meta-game, and generating the meta-game from the first and second challenges upon determining that the third user input is received.

20 Claims, 42 Drawing Sheets

(Block Interpreter)

(56) References Cited

U.S. PATENT DOCUMENTS

| | | |
|---|---|---|
| 2017/0312639 A1 | 11/2017 | Watson et al. |
| 2017/0312640 A1 | 11/2017 | Watson et al. |
| 2020/0129868 A1 | 4/2020 | Watson et al. |
| 2020/0139256 A1 | 5/2020 | Watson et al. |
| 2021/0339129 A1 | 11/2021 | Zalewski |

OTHER PUBLICATIONS

Cyrille Wagner, "Developing Your Own Replay System", Internet Citation, Feb. 4, 2004, XP001543381, URL: http://www.gamasutra.com/features/20040204/wagner_01.shtml, retrieved on Jan. 1, 1900.

* cited by examiner (Block Interpreter)

(Runtime)

(Components)

(Download gcN to Game Console)

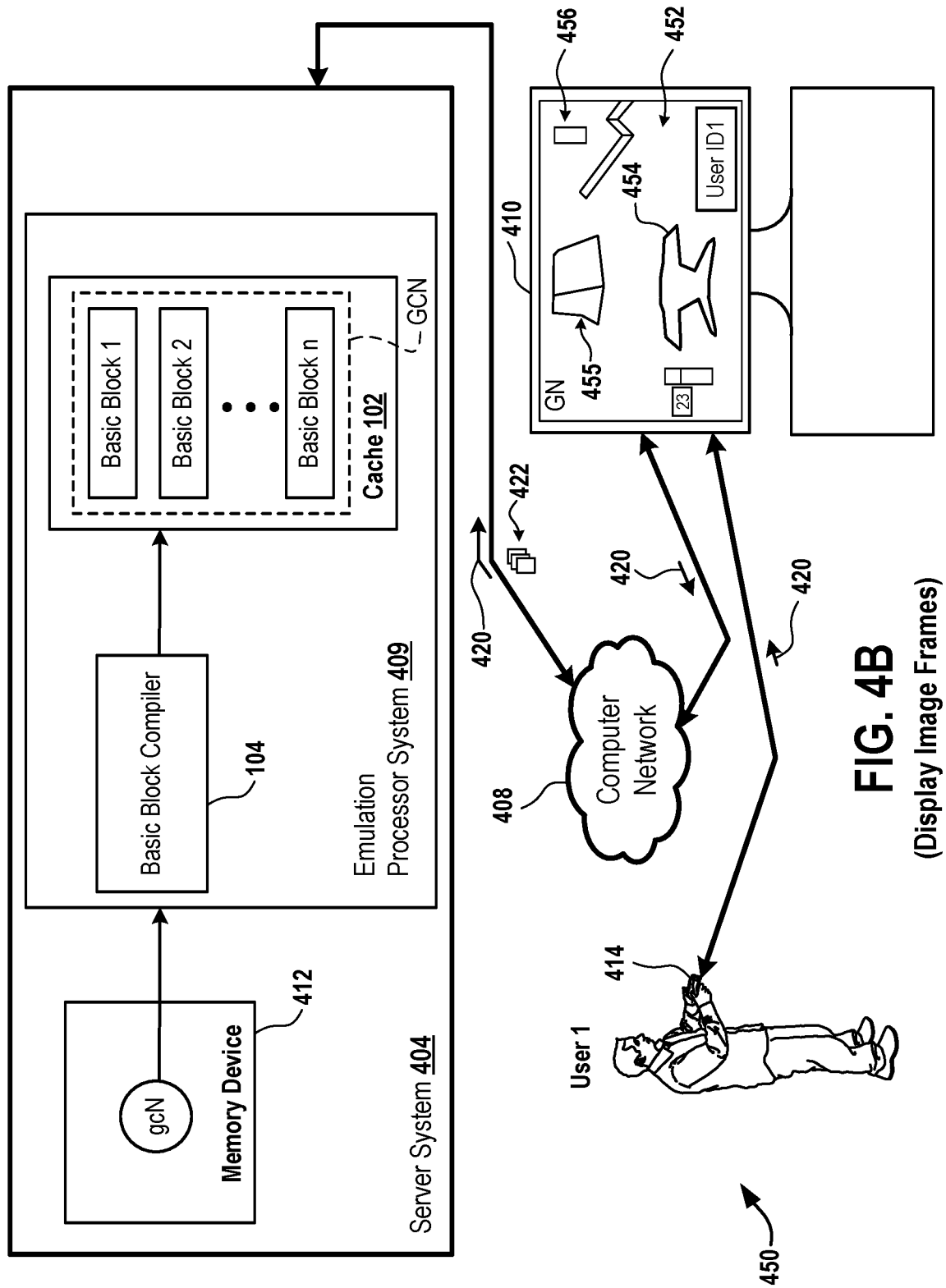

(Basic blocks)

(Method for Dynamically Compiling Basic Block(s))

(Validation)

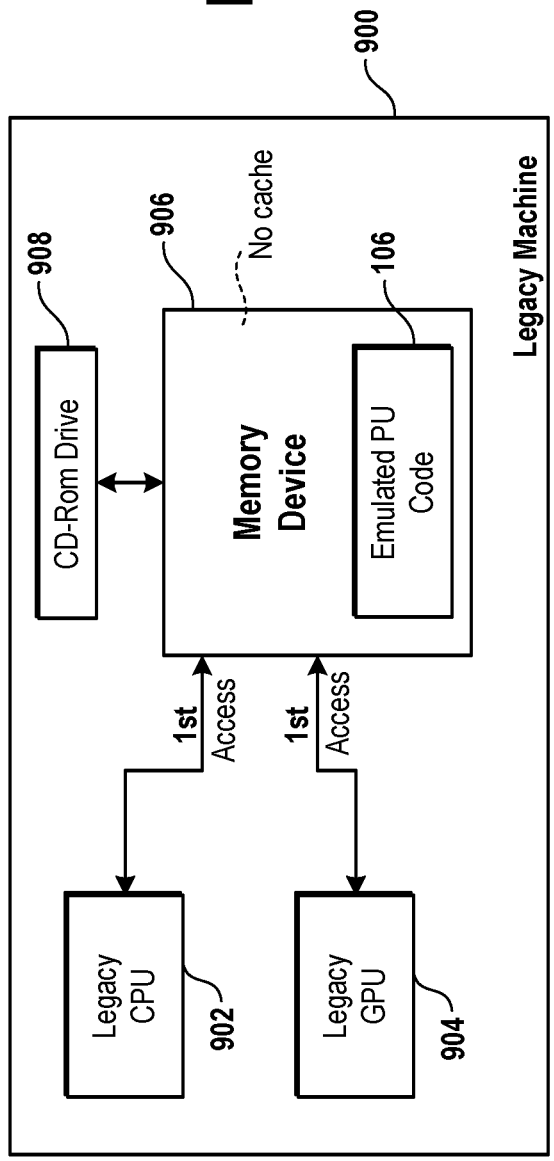
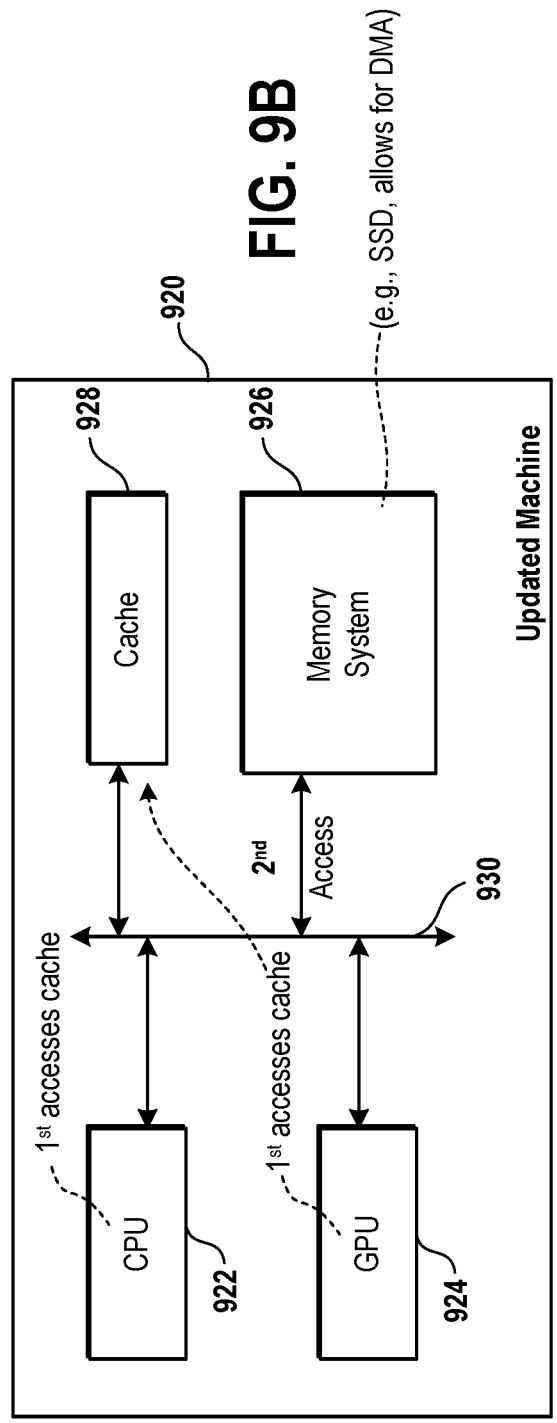

(Basic blocks for Same Instruction Integrated)

(Modification of basic block)

(Skip Subroutine)

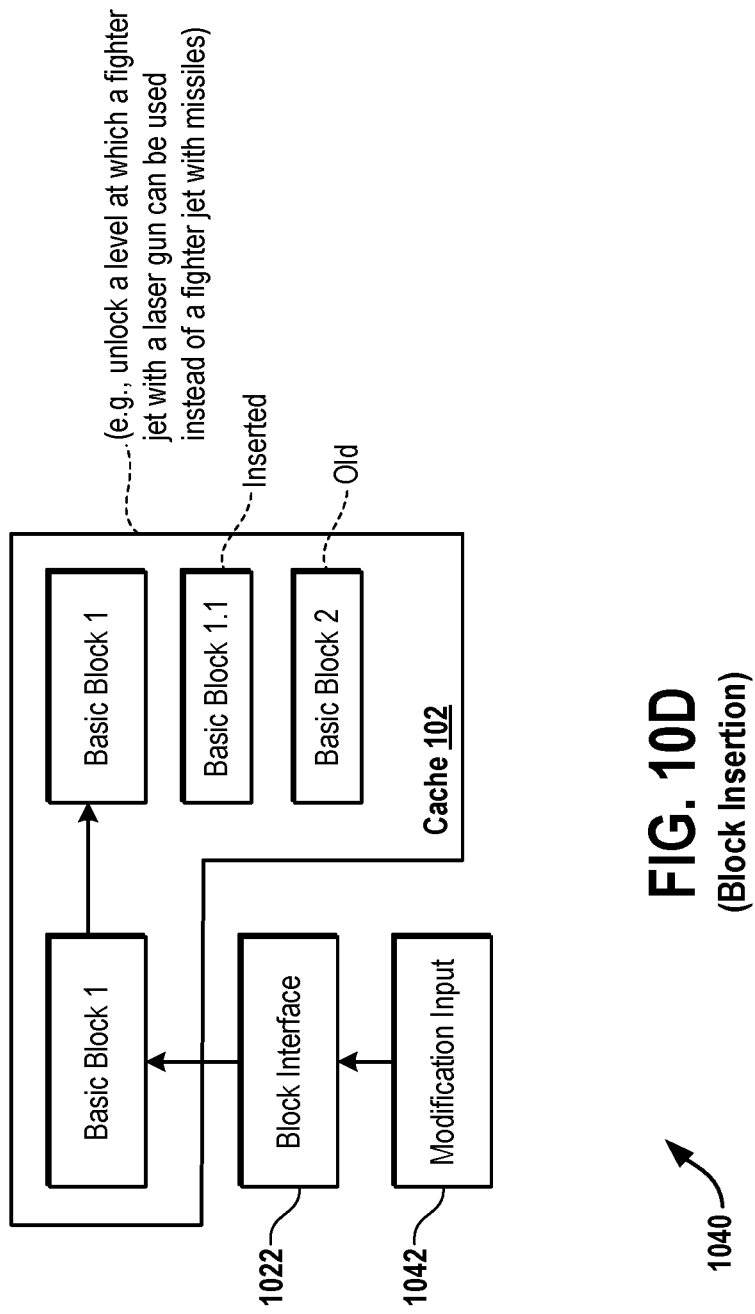

(Switch Order of Execution)

(Transfer of Basic Blocks to Another Client Device)

(Cool Move at Game Level 1) Easy level (Cool Move at Game Level Z)

(Meta-game)

SYSTEMS AND METHODS FOR GENERATING A META-GAME FROM LEGACY GAMES

FIELD

The present disclosure relates to systems and methods for generating a meta-game from legacy games.

BACKGROUND

As electronic gaming and networking technologies have become more advanced, the complexity of games has increased accordingly. As a result, there may be more complex storylines, game play objectives, missions and tasks, capabilities associated with game play avatars, and scoring. Scoring may occur and be weighted in various ways and likewise be determined in various categories or on an individual or team basis.

The significance of the aforementioned problems only increases as the complexity of electronic games increases. As such, some players may wish to play older games, which are less complicated.

It is in this context that embodiments of the invention arise.

SUMMARY

Embodiments of the present disclosure provide systems and methods for generating a meta-game from legacy games.

In one embodiment, a method for facilitating a play of a legacy game is described. The method includes receiving a user input during the play of the legacy game, determining whether one or more blocks of code for servicing the user input are cached, and accessing one or more instructions of a legacy game code upon determining that the one or more blocks of code are not cached. The method further includes compiling the one or more blocks of code from the one or more instructions of the legacy game code, caching the one or more blocks of code, and executing the one or more blocks of code to display a virtual environment.

In an embodiment, a computing device for facilitating a play of a legacy game is described. The computing device includes a processor configured to receive a user input during the play of the legacy game. The computing device further includes a cache coupled to the processor and a memory device coupled to the processor. The processor determines whether one or more blocks of code for servicing the user input are stored in the cache. The processor accesses, from the memory device, one or more instructions of a legacy game code upon determining that the one or more blocks of code are not stored in the cache. Also, the processor compiles the one or more blocks of code from the one or more instructions of the legacy game code. The processor stores the one or more blocks of code in the cache and executes the one or more blocks of code to display a virtual environment.

In one embodiment, a method is described. The method includes generating a first validation result from one or more instructions of a legacy game code. The one or more instructions of the legacy game code are associated with one or more blocks of code. The method further includes examining one or more memory addresses associated with the one or more instructions to determine whether the one or more blocks of code are to be marked as invalid. The method includes determining whether the one or more blocks of code are to be executed, and determining whether the one or more blocks of code are marked as invalid upon determining that the one or more blocks of code are to be executed. The method includes examining the one or more memory addresses to generate a second validation result from the one or more instructions, comparing the first validation result with the second validation result to determine whether the one or more blocks of code are invalid, and recompiling one or more additional blocks of code associated with the one or more instructions upon determining that the one or more blocks of code are invalid. The method includes executing the one or more additional blocks of code to display a virtual environment.

In one embodiment, a method for generating a meta-game is described. The method includes receiving, via a first user account, a first user input for a first challenge during a play of one or more legacy games. The first challenge is created from a first plurality of basic blocks of the one or more legacy games. The method further includes recording at least a portion of the first challenge and receiving, via the first user account, a second user input for a second challenge during the play of the one or more legacy games. The second challenge is created from a second plurality of basic blocks of the one or more legacy games. The first plurality of basic blocks are compiled from a first plurality of instructions of the one or more legacy games and the second plurality of basic blocks are compiled from a second plurality of instructions of the one or more legacy games to enable the one or more legacy games to be played on an updated machine. The method includes recording at least a portion of the second challenge. The method further includes determining whether a third user input is received via the first user account to request creation of the meta-game and generating the meta-game from the first and second challenges upon determining that the third user input is received.

In an embodiment, a non-transitory computer-readable medium containing program instructions of the method for generating a meta-game is described. The execution of the program instructions by one or more processors of a computer system causes the one or more processors to carry out a plurality of operations of the method.

In one embodiment, a computer system for generating a meta-game is described. The computer system includes a processor. The processor receives, via a first user account, a first user input for a first challenge during a play of one or more legacy games. The first challenge is created from a first plurality of basic blocks of the one or more legacy games. The processor records at least a portion of the first challenge. The processor further receives, via the first user account, a second user input for a second challenge during the play of the one or more legacy games. The second challenge is created from a second plurality of basic blocks of the one or more legacy games. The first plurality of basic blocks are compiled from a first plurality of instructions of the one or more legacy games and the second plurality of basic blocks are compiled from a second plurality of instructions of the one or more legacy games to enable the one or more legacy games to be played on an updated machine. The processor records at least a portion of the second challenge. The processor further determines whether a third user input is received via the first user account to request a play of the meta-game, and generates the meta-game from the first and second challenges upon determining that the third user input is received. A memory device is coupled to the processor.

Some advantages of the herein described systems and methods include allowing functionality of the legacy code to be executed by an updated machine. Without the conversion, due to security issues, the functionality of the legacy code cannot be executed by the updated machine. For example, there is no permission to execute the legacy code from the updated machine and write data generated upon execution of the legacy code to registers in the updated machine. As such, by providing the conversion, the execution of the functionality of the legacy code by the updated machine is facilitated.

Further advantages of the herein described systems and methods include saving time of execution. As an example, two or more instructions, such as a routine and a subroutine or two similar instructions, of the legacy code are combined into one basic block of the updated code. As such, execution of the updated code is faster compared to execution of the legacy code.

Additional advantages of the herein described systems and methods include recompiling one or more additional basic blocks of the updated code upon determining that one or more basic blocks of the updated code are invalid. For example, when the one or more basic blocks are marked as invalid, it is determined whether the one or more basic blocks are actually invalid. Upon determining so, instead of executing the one or more basic blocks, the one or more additional basic blocks are compiled and executed. The one or more additional basic blocks correspond to the same game to which the one or more basic blocks correspond.

Yet further advantages of the herein described systems and methods include that all of the basic blocks do not need to be checked for invalidity. For example, only those basic blocks that are marked as invalid after compiling the basic blocks are checked for validity. This reduces latency in displaying a virtual environment from the one or more basic blocks. Also, processing power used for checking all of the basic blocks for invalidity is not needed.

Also, advantages of the herein described systems and methods include saving processing time and processing power when the updated code for a game is already compiled. Once the updated code is generated at a server or at a game console, the updated code need not be recompiled. Rather, the updated code can be transferred from the server or the game console to another game console. As such, processing time and processing power in regenerating the updated code at the other game console is saved.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 4B is a diagram of an embodiment of a system to illustrate compiling of the basic blocks within a server system.

FIG. 9A is a diagram to illustrate an embodiment of a legacy machine.

FIG. 9B is a diagram to illustrate an embodiment of an updated machine.

FIG. 10D is a diagram of an embodiment of a system to illustrate an insertion of a basic block between two basic blocks.

DETAILED DESCRIPTION

Systems and methods for generating a meta-game from legacy games are described. It should be noted that various embodiments of the present disclosure are practiced without some or all of these specific details. In other instances, well known process operations have not been described in detail in order not to unnecessarily obscure various embodiments of the present disclosure.

Figure 1:
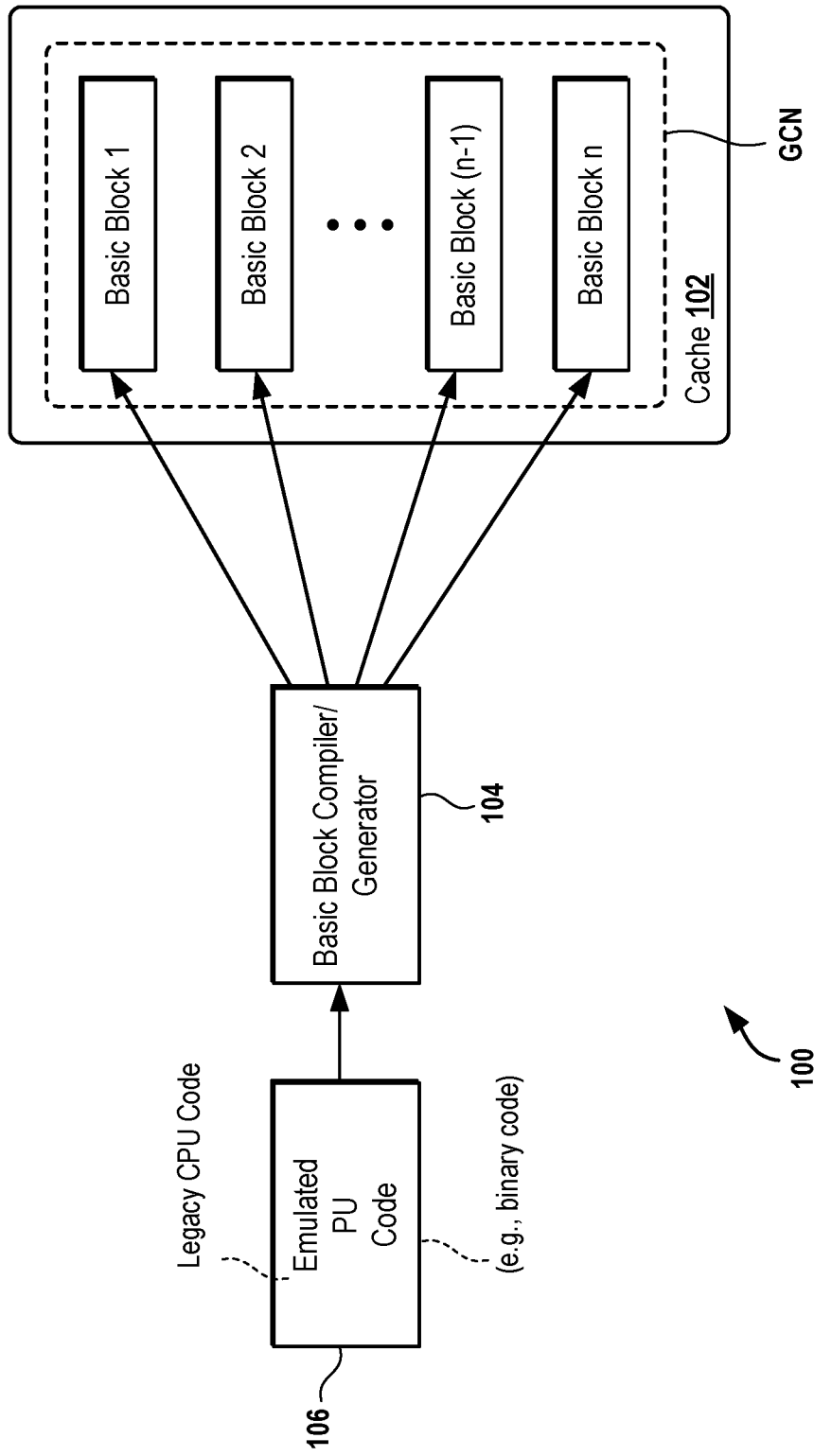
FIG. 1 is a block diagram to illustrate an embodiment of a system for generation of basic blocks of an updated code.

FIG. 1 is a block diagram to illustrate an embodiment of a system 100 for generation of basic blocks 1 through n of the updated code, where n is a positive integer. The system 100 includes a cache 102, a basic block compiler 104, and an emulated processing unit (PU) code 106 of a legacy game N having a game title GN, where N is a positive integer. As an example, a cache, as used herein, is a hardware or software component that stores data so that future requests for the data can be served faster. A cache hit occurs when requested data can be found in the cache, while a cache miss occurs when it cannot. The cache hits are served by reading data from the cache, which is faster than re-computing a result or reading from a slower data store, such as a memory device, thus, the more requests that can be served from the cache, the faster a system performs. To illustrate, a cache is a group of registers, which can be accessed faster, such as by 10 to 100 times, compared to a main memory device.

As an example, a cache has a lower number of memory addresses than the main memory device. In the example, a processor first determines whether data used in an operation is stored at a memory address in the cache and if not the processor accesses memory addresses in the main memory device to look for the data.

As an example, a basic block compiler, as used herein, is a computer program that converts the emulated PU code 106 code into a game code GCN, which is an example of the updated code. The game code GCN represents functionality of the legacy game N. The computer program is executed by one or more processors of an emulated processor system. The game code GCN is sometimes referred to herein as an intermediate code. As an example, the intermediate code is neither a source code nor a machine code. To illustrate, the intermediate code includes basic blocks that are not specific to an architecture of a central processing unit (CPU) or an architecture of a graphical processing unit (GPU) of an updated machine, examples of which are provide below. In the illustration, the intermediate code includes basic blocks that can be executed by a CPU or a GPU of the updated machine, examples of which include a Sony PlayStation™ 4 (PS4™) or a Sony PlayStation™ 5 (PS5™) or a desktop computer or a laptop computer or a smartphone or a smart television. As an example, the source code is written using a human readable programming language, which can be plain text. As an example, a basic block compiler, as used herein, is implemented using hardware or software or a combination thereof. To illustrate, functionality of the basic block compiler is implemented using a controller or a programmable logic device (PLD) or an application specific integrated circuit (ASIC).

Examples of a controller, as used herein, include a processor and a memory device. The processor is coupled to the memory device. As used herein, as an example, a processor is a microprocessor, or a CPU, or a GPU, or a microcontroller, or an ASIC, or a PLD. Examples of a memory device, as used herein, include a random access memory (RAM) and a read-only memory (ROM). To illustrate, the memory device is a flash memory device, or a hard disk, or a solid-state storage device, or a redundant array of independent disks (RAID), or a combination thereof.

An example of the emulated PU code 106 is a machine code that directs a processor, such as a CPU or a GPU, of a legacy machine to perform an operation. For example, the emulated PU code 106 includes a sequence of instructions that instruct the CPU of the legacy machine to perform a specific operation, such as load, store, jump, or an arithmetic logic unit (ALU) operation on data stored within the CPU's registers. As another example, the emulated PU code 106 is a binary code that includes a series of ones and zeros. As another example, the emulated PU code 106 includes a sequence of instructions that instruct the GPU of the legacy machine to perform a specific operation, such as load, store, jump, or an ALU operation on data stored within the GPU's registers. The GPU of the legacy machine performs an operation on a virtual object to assign a graphical parameter, such as color, or intensity, or shade, or texture, or a combination thereof, to the virtual object.

The emulated PU code 106 is specific or unique to an architecture of the CPU or the GPU of the legacy machine. For example, the emulated PU code 106 cannot be executed by a CPU or a GPU of the updated machine. As another example, the emulated PU 106 executable on Sony PlayStation™ 1 (PS1) cannot be executed on Sony PlayStation™ 2 (PS2) and vice versa.

As an example, the emulated PU code 106 is executed by the processor of the legacy machine to perform operations in the legacy game N. To illustrate, the emulated PU code 106 is executed to play legacy games on the legacy machine, such as the PS1™ or the PS2™. Examples of the legacy games include video games, such as, Warhawk™, Tango Dance Fever™, Castlevania Chronicles™, Pacman™, Resident Evil 2™, and Streetfighter Alpha 3™.

The basic block compiler 104 accesses the emulated PU code 106 for the legacy game N and converts the emulated PU code 106 into one or more basic blocks, such as the basic blocks 1 through n. As an example, each basic block 1 through n has a start identifier and an end identifier to distinguish one basic block from another. The basic block compiler 104 stores the basic blocks 1 through n in the cache 102. When the basic blocks 1 through n are executed, the legacy game N is emulated.

Figure 2:
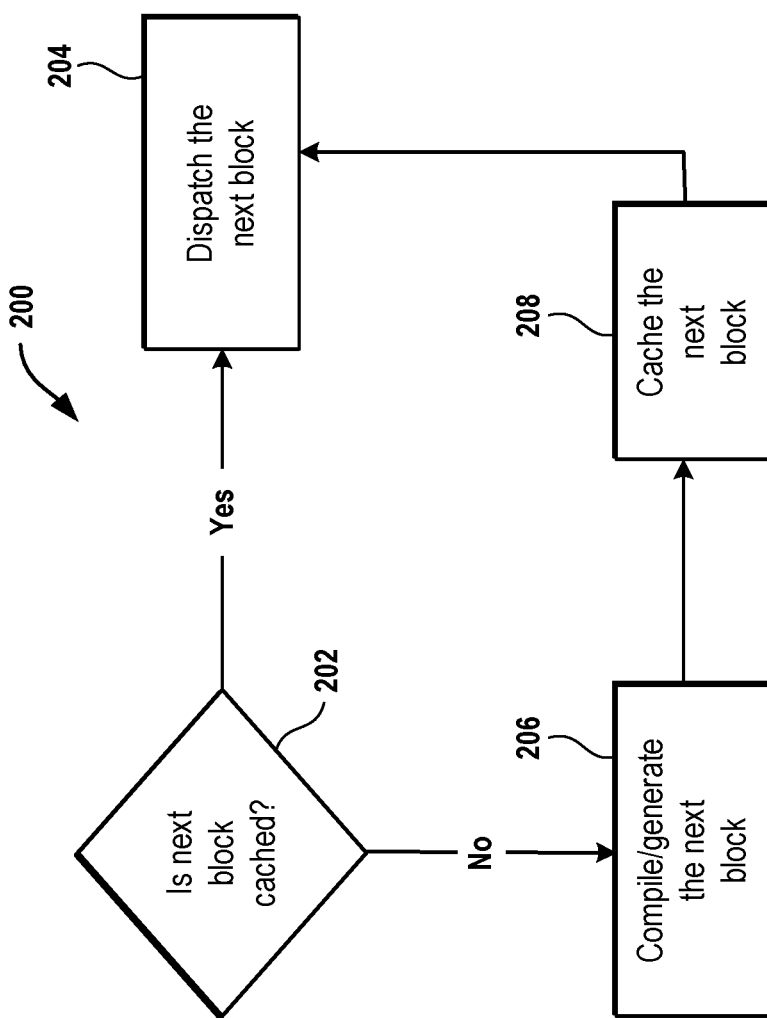
FIG. 2 is a flowchart to illustrate an embodiment of a method for compiling and executing a basic block of a game code.

FIG. 2 is a flowchart to illustrate an embodiment of a method 200 for compiling and dispatching a basic block of the game code GCN. The method 200 is executed by one or more processors of the updated machine. The method 200 includes an operation 202 of determining whether there is a cache hit, e.g., whether a basic block is stored in the cache 102. For example, the operation 202 is performed or triggered when a user input during a play of a legacy game is received. To illustrate, the user input is received to change a position or an orientation or a combination thereof of a virtual object of the legacy game N. In the illustration, upon determining that the user input is received, it is determined whether a basic block, such as one of the basic blocks 1 through n, is stored in the cache 102 (FIG. 1). In the illustration, the basic block is to be executed to change the position or the orientation or the combination thereof of the virtual object.

As another illustration, the operation 202 is performed when a user input to change the parameter, such as a look and feel, of a virtual object of a legacy game is received. In the illustration, upon determining that the user input is received, it is determined whether a basic block, such as one of the basic blocks 1 through n, is stored in the cache 102. In the illustration, the basic block is to be executed to change the parameter of the virtual object.

In response to determining that the basic block is cached, in an operation 204 of the method 200, the basic block is dispatched. For example, the basic block is executed or run in the operation 204. To illustrate, the basic block is run by the CPU of the updated machine to move a virtual object from one position to another or from one orientation to another or a combination thereof. As another illustration, the basic block is executed by the GPU of the updated machine to assign the parameter to a portion of the virtual object. An example of a portion of a virtual object includes a pixel of virtual object or a triangular portion of the virtual object or a portion of a pre-defined shape of the virtual object. To illustrate, the virtual object is divided into a pre-determined number of pixels, and each pixel is assigned a value of the parameter.

In response to determining that the basic block is not cached, an operation 206 of compiling the basic block is performed in the method 200. The operation 206 is performed by the basic block compiler 104 (FIG. 1). For example, the basic block compiler 104 parses the emulated PU code 106 (FIG. 1) for the legacy game N to identify an emulated PU code instruction that includes a function for servicing the user input received, before the operation 202, during the play of the legacy game. The user input received, before the operation 202, triggers the operation 202. To illustrate, the basic block compiler 104 traverses through each emulated code PU instruction of the emulated PU code 106 to determine whether the emulated code PU code instruction includes an operation, such as a function, to satisfy, such as generate a response to, the user input received during the play of the legacy game. In the illustration, once the function is identified, the basic block compiler 104 converts the emulated code PU code instruction to generate the basic block. In the illustration, in response to the user input received, before the operation 202, other emulated code PU code instructions, of the legacy game, that are no needed to service the user input are not compiled into basic blocks by the basic block compiler 104.

In an operation 208 of the method 200, the basic block generated in the operation 206 is stored in the cache 102 by the basic block compiler 104. The cached basic block is then executed in the operation 204 to service the user input received before the operation 202.

In one embodiment, the method 200 is executed by one or more processors of a server system. As an example, the server system includes updated machines as servers. To illustrate, each server blade is the PS4™ or the PS5™.

In an embodiment, the method 200 is not executed until a user input is received. For example, there is no determination whether a basic block, such as one of the basic blocks 1 through n, is stored in the cache 102, no compiling of the basic blocks, and no execution of the basic blocks until the user input is received.

In one embodiment, the basic block compiler 104 compiles one or more of the basic blocks 1 through n in response to a first user input during a play of the legacy game N and compiles one or more of remaining of the basic blocks 1 through n in response to a second user input during a play of the legacy game N. To illustrate, the basic block compiler 104 generates the basic blocks 1 and 2 to service the first user input and generates the basic blocks 3 through 7 to service the second user input. The second user input is received after the first user input.

Figure 3:
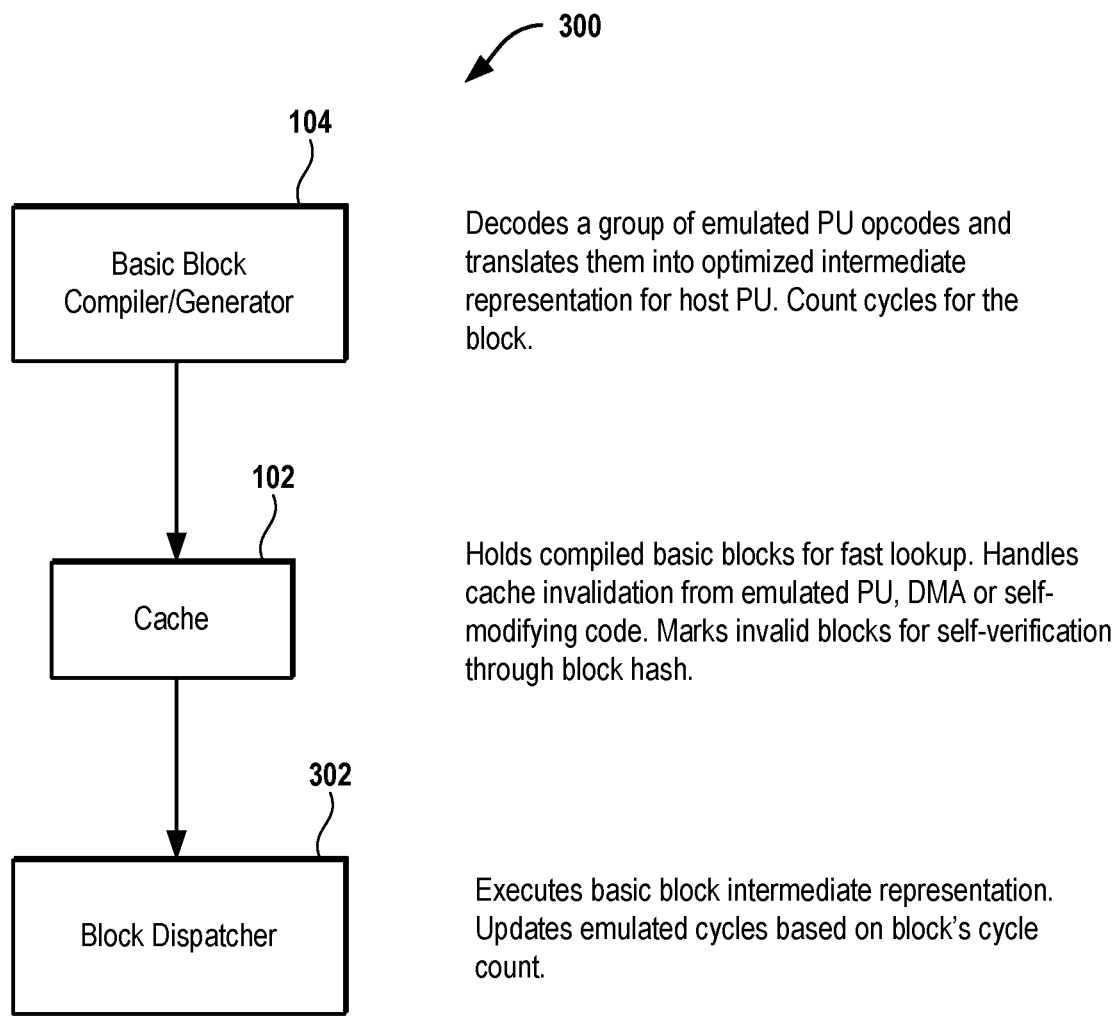
FIG. 3 is a block diagram to illustrate an embodiment of a system for compiling and executing the basic blocks.

FIG. 3 is a block diagram to illustrate an embodiment of a system 304 for compiling and dispatching basic blocks, such as the basic blocks 1 through n. The system 300 includes the basic block compiler 104, the cache 102, and a block dispatcher 302. As an example, the block dispatcher 302 is hardware or software, or a combination thereof, that carries out operations of one or more of the basic blocks 1 through n to service a user input. To illustrate, the block dispatcher 302 is a PLD or an ASIC or a controller. As another illustration, the block dispatcher 302 is a computer software. As an example, the block dispatcher 302 is the GPU or the CPU of the updated machine.

The basic block compiler 104 decodes a portion of the emulated PU code 106 (FIG. 1), such as an operational code (opcode), and translates the portion into an intermediate representation for a processing unit of the updated machine. For example, the basic block compiler 104 parses a portion, such as one or more instructions, of a CPU code of the emulated PU code 106 to determine whether the portion of the CPU code includes functionality to service a user input. Upon determining so, the basic block compiler 104 translates the portion of the CPU code into one or more basic blocks, such as the basic blocks 1 through n. As another example, the basic block compiler 104 parses a portion, such as one or more instructions, of a GPU code of the emulated PU code 106 to determine whether the portion of the GPU code includes functionality to service a user input. Upon determining so, the basic block compiler 104 translates the portion of the GPU code into one or more basic blocks, such as the basic blocks 1 through n.

Also, the basic block compiler 104 estimates a number of cycles for execution of each basic block generated from the portion of the emulated PU code 106 to generate an estimated count. For example, the basic block compiler 104 determines that the basic block 1 includes a jump operation and a jump operation takes a pre-determined amount of time. The basic block compiler 104 estimates that the jump operation of the basic block 1 takes the pre-determined amount of time. The block compiler 104 stores the estimated count in the cache 102. For example, the block compiler 104 stores the estimated count in the basic block n for which the number of cycles is estimated.

Once the basic blocks are compiled, they are stored in the cache 102 for fast lookup. For example, when another user input is received after receiving a user input in response to which the basic blocks are compiled, and the same basic blocks can be used for servicing the other user input, the basic blocks can be accessed from the cache 102 quickly and do not need to be regenerated.

In addition, one or more of the basic blocks stored in the cache 102 can be marked as invalid after compilation. The one or more of the basic blocks, marked as invalid, are later validated or invalidated during runtime of the basic blocks. When the one or more of the basic blocks are invalidated, one or more additional basic blocks are compiled. The compilation of the one or more additional basic blocks is sometimes referred to herein as recompiling of the one or more basic blocks.

Each of the one or more additional basic blocks have the same structure as that of the one or more basic blocks 1 through n. For example, each of the one or more additional basic blocks has a source register address, a destination register address, and an operation. As another example, each of the one or more additional basic blocks has a source register address, a destination register address, an operation, and a number of cycles of execution of the operation of the additional basic block. In the example, some of the one or more additional basic blocks include an invalid mark. As yet another example, each of the one or more additional basic blocks has a source register address, a destination register address, an operation, and a number of cycles of execution of the operation of the additional basic block. It should be noted that each of the additional blocks of code is executed in the same manner as each of the basic blocks 1 through n.

The block dispatcher 302 executes or runs one or more of the basic blocks 1 through n based on a user input. For example, the block dispatcher 302 executes the basic blocks 1 and 2 to service the first user input and executes the basic blocks 3 through 7 in response to the second user input. As an example, the block dispatcher 302 includes a clock source, such as a digital clock oscillator or a clock generator, that counts a number of cycles used to execute one or more of the basic blocks 1 through n based on the user input to generate a real count. The block dispatcher 302 sends the real count to the block compiler 104 to update the estimated count with the real count. For example, the real count is stored in the basic block n for which the real count is calculated. To illustrate, the real count is stored in one or more memory registers of the cache 102 assigned to the basic block n.

In one embodiment, the basic block compiler 104 does not estimate the number of cycles for execution of any basic block. In this embodiment, there is no replacement of the estimated count with the real count. Rather, in the embodiment, the real count is stored by the block compiler 104 in the basic block n for which the real count is determined.

Figure 4A:
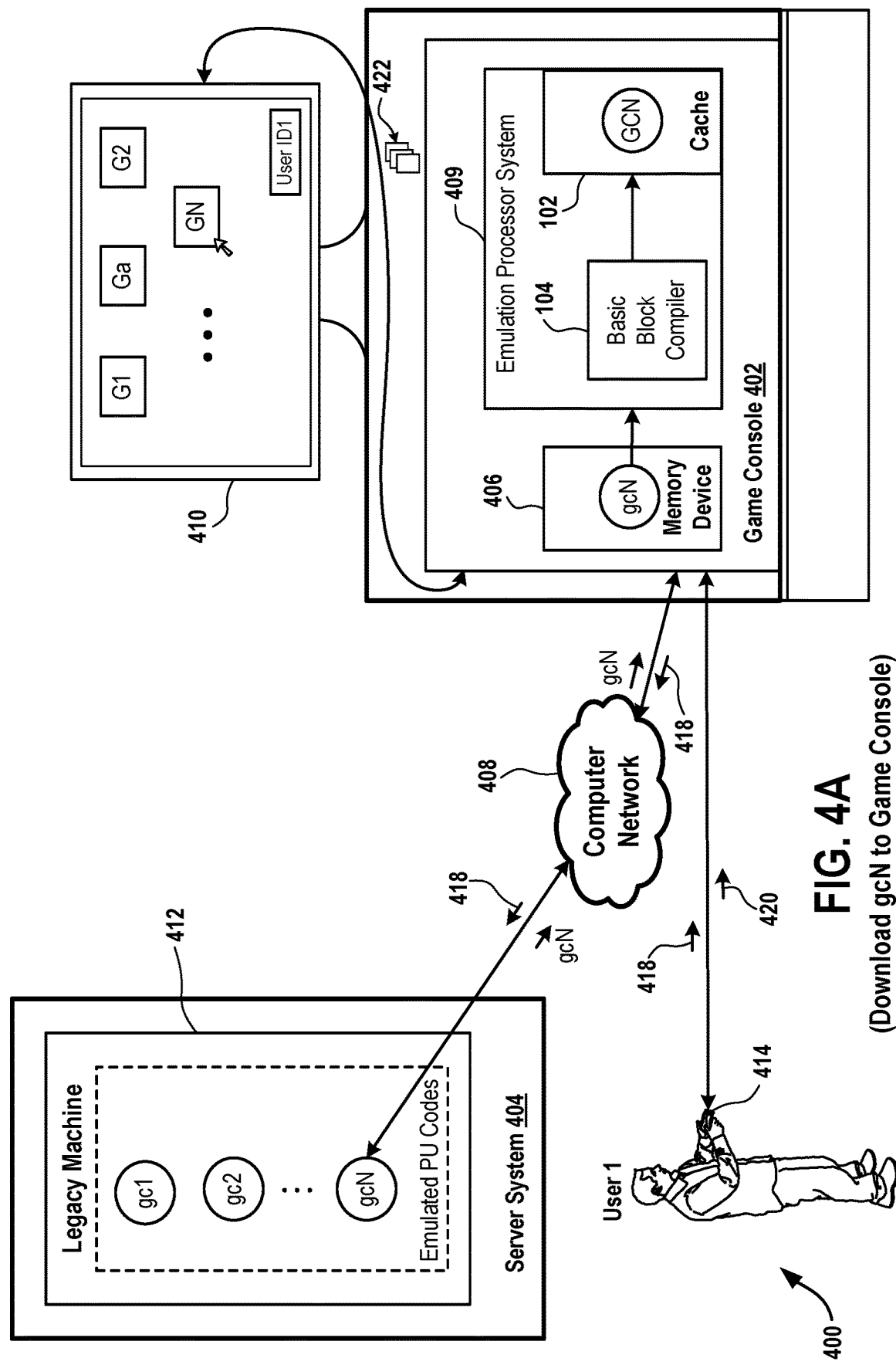
FIG. 4A is a diagram of an embodiment of a system to illustrate compiling of the basic blocks within a game console.

FIG. 4A is a diagram of an embodiment of a system 400 to illustrate compiling of the basic blocks 1 through n within a game console 402. The system 400 includes the game console 402, a server system 404, a computer network 408, and a display device 410. The server system 404 includes one or more servers. As an example, the server system 404 is located within a housing of a data center. The server system 404 includes a memory device 412, which stores emulated PU codes, such as the emulated PU code 104. For example, the memory device 412 stores a game code 1 (gc1), a game code 2 (gc2), and so on until a game code N (gcN). The game code gcN is an example of the emulated PU code 106 (FIG. 1). Each game code 1 through N is a legacy code of a legacy game. To illustrate, the game code gc1 is a machine code for play of a first legacy game and the game code gc2 is a machine code for play of a second legacy game. The second legacy game is different from the first legacy game. It should be noted that as an example, the memory device 412 is a memory device of the legacy machine.

As an example, none of the game codes gc1 through gcN can be executed in the updated machine and can be executed in the legacy machine. To illustrate, a CPU or an operating system of the updated machine cannot support execution of the game codes gc1 through gcN. On the other hand, a CPU or an operating system of the legacy machine supports execution of the game codes gc1 through gcN. Examples of a computer network, as used herein, include a wide area and at work (WAN), such as Internet, or a local area network (LAN), such as an intranet, or a combination thereof.

The game console 402 is an example of the updated machine. For example, the game console 402 is the PS4™ or the PS5™. Examples of the display device 410 include a television, a smart television, and a computer monitor. To illustrate, the display device 410 is a liquid crystal display (LCD) device, or a light emitting diode (LED) display device, or an organic light emitting diode (OLED) display device.

The system 400 further includes a hand-held controller 414, which is held in one or two hands of a user 1. Examples of a hand-held controller, as used herein, include a controller with buttons, a Move™ controller from Sony™ Corporation, and a gun-shaped controller. Examples of buttons of the hand-held controller include joysticks, buttons for moving a virtual object upwards, downwards, left, or right on the display screen 410, and other buttons for selection of various features of the legacy game N having the game title GN.

The game console 402 includes a memory device 406 and an emulation processor system 409. As an example, a processor system, as used herein, includes one or more processors that are coupled to each other. The emulation processor system 409 is coupled to the memory device 406. The emulation processor system 409 includes the basic block compiler 104 and the cache 102. The basic block compiler 104 is coupled to the cache 102.

The game console 402 is coupled to the display device 410 via a wired communication medium, such as a high definition media interface (HDMI) cable or a wireless connection. Examples of a wireless connection, as used herein, include a Wi-Fi™ connection or a Bluetooth™ connection. Also, the hand-held controller 414 is coupled to the game console 402 via a wired connection or a wireless connection. Examples of a wired connection, as used herein, include a serial transfer cable, a parallel transfer cable, and a Universal Serial Bus (USB) cable.

An example of a client device includes a combination of a hand-held controller, a game console, and a display device. Another example of the client device includes a combination of a hand-held controller and a display device.

The user 1 logs into his/her user account when a user identification (ID) and a password are authenticated by the server system 404. The user 1 is assigned a user ID1, such as a username, by the server system 1. Once the user 1 logs into his/her user account, the user 1 can access multiple game titles, such as a game title G1, a game title Ga, a game title G2, and so on until the game title GN. The game titles G1, G2 and so on until the game title GN are examples of titles of legacy games. The game title Ga is a title of a game that is not a legacy game. Rather, the game title Ga is of a current game, such as Fortnite™ that is not available for play in the legacy machine.

After logging into his/her user account, the user 1 selects one or more buttons on the hand-held controller 414 to select the game title GN to play a legacy game. Once the user 1 selects the game title GN, a user input 418 indicating the selection is sent from the hand-held controller 414 via the game console 402 and the computer network 408 to the server system 404. As an example, a user input is an input signal. Upon receiving the user input 418 indicating the selection of the game title GN, the server system 404 identifies the game code gcN based on the user input 418. For example, the server system 404 identifies that the game code gcN has the same game title as that of the game title GN, a selection of which is indicated in the user input 418.

The server system 404 sends the game code gcN via the computer network 408 to the game console 402. Upon receiving the game code gcN, the emulation processor system 409 stores the game code gcN in the memory device 406 of the game console 402.

When a user input 420 is received, via the wireless connection, from the hand-held controller 414 during a play the legacy game N having the game code gcN, the emulation processor system 409 executes the basic block compiler 104 to generate a portion of the game code GCN from a portion of the game code gcN stored in the memory device 406. The portion of the game code GCN is generated based on the user input 420. For example, when the user input 420 includes a request to move a WarHawk™ fighter jet from a position P1 to a position P2 during a play of the legacy game N, the basic block compiler 104 parses the game code gcN to identify an instruction that calculates the position P2 from the position P1. The basic block compiler 104 converts the instruction into a basic block of the game code GCN, and the basic block is then executed to change the position of the WarHawk™ fighter jet to P2 from P1. In the example, the basic block of the game code GCN is executed by the GPU of the emulation processor system 409 to generate one or more image frames 422. To illustrate, the one or more image frames 422 are displayed on the display device 410 to display a virtual environment having the WarHawk™ fighter jet at the position P2. In this manner, a majority or the entirety of the game code GCN is compiled by the basic block compiler 104 and stored in the cache 102 for execution. As an example, a virtual environment, such as a virtual scene, includes one or more virtual reality (VR) images or one or more augmented reality (AR) images.

In an embodiment, communication of data between the server system 404 and the game console 402 occurs via a network communication protocol, such as a Transmission Control Protocol over Internet Protocol (TCP/IP). For example, the server system 404 includes a network interface controller to convert data into packets. Examples of a network interface controller, as used herein, include a network interface card (NIC) and a network adapter. The network interface controller of the server system 404 is coupled to the memory device 412 to receive data from the memory device 412. Upon receiving the data from the memory device 412, the network interface controller of the server system 404 embeds the data within one or more packets by applying the network communication protocol to the data. The one or more packets are transferred from the network interface controller of the server system 404 via the computer network 408 to the game console 402. The game console 402 includes a network interface controller, which extracts the data from the one or more packets by applying the network communication protocol. The network interface controller of the game console 402 is coupled to the emulation processor system 409. The network interface controller of the game console 402 provides the data received from the computer network 408 to the emulation processor system 409. Moreover, the network interface controller of the game console 402 receives data from the emulation processor system 409 and embeds the data within one or more packets by applying the network communication protocol and sends the one or more packets via the computer network 408 to the server system 404. The network interface controller of the server system 404 applies to network communication protocol to the one or more packets received from the computer network 408 to extract the data from the one or more packets and sends the data to the memory device 412 for storage.

In one embodiment, in addition to or instead of the computer network 408, a cellular network is used to communicate data between the server system 404 and the game console 402. For example, communication between the server system 404 and the game console 402 is facilitated using wireless technologies. The wireless technologies include, for example, 4G or 5G wireless communication technologies. As used herein, 5G is the fifth generation of cellular network technology. Also, 5G networks are digital cellular networks, in which a service area covered by providers is divided into small geographical areas called cells. In 5G wireless communication technology, analog signals representing sounds and images are digitized in a telephone, converted by an analog-to-digital converter and transmitted as a stream of bits. All 5G wireless devices in a cell communicate by radio waves with a local antenna array and low power automated transceiver (transmitter and receiver) in the cell, over frequency channels assigned by the transceiver from a pool of frequencies that are reused in other cells. Local antennas are connected with the cellular network by a high bandwidth optical fiber or wireless backhaul connection. As in other cell networks, a mobile device crossing from one cell to another is automatically transferred to the new cell. It should be understood that 5G networks are just an example type of a communication network, and embodiments of the disclosure may utilize earlier generation wireless or wired communication, such as 3G or 4G, as well as later generation wired or wireless technologies that come after 5G.

In an embodiment, any of the game console 402 and the server system 404 is referred to herein as a computing device. Other examples of the computing device include a tablet, a smartphone, a laptop computer, a desktop computer, and a smart television.

In one embodiment, each of the game codes gc1 through gcN is stored in a separate memory device of the server system 404 or of a legacy machine. For example, the game code gc1 is stored in a memory device of a first legacy machine and the game code gc2 is stored in a memory device of a second legacy machine. As another example, the game code gc1 is stored in a first memory device of the server system 404 and the game code gc2 is stored in a second memory device of a server system 404.

In an embodiment, the memory device 412 or the memory device 406 is not a cache. Rather, each of the memory device 412 or the memory device 406 is a main memory, such as a RAM.

In one embodiment, the memory device 412 is coupled to a memory controller. The memory controller reads data from the memory device 412 and writes data to the memory device 412. The memory controller is coupled to the network interface controller of the server system 404. The memory controller sends data received from the network interface controller of the server system 404 to the memory device 412 for storage. The memory controller also sends data received from the memory device 412 to the network interface controller of the server system 404 for sending via the computer network 408 to the game console 402.

FIG. 4B is a diagram of an embodiment of a system 450 to illustrate that the emulation processor system 409 is located within the server system 404 and the one or more image frames 422 are sent from the server system 404 via the computer network 408 to the display device 410 for display of a virtual environment or a virtual scene. The system 450 includes the server system 404, display device 410, and the hand-held controller 414.

The server system 404 includes the memory device 412 and the emulation processor system 409. The memory device 412 is coupled to the emulation processor system 409. The display device 410 is coupled to the computer network 408 via a network interface controller of the display device 410. The display device 410 includes a processor that is coupled to the network interface controller of the display device 410. The processor of the display device 410 receives the user input 420 during a play of the legacy game having the game title GN and the game code gcN, and sends the user input 420 to the network interface controller of the display device 410. The network interface controller of the display device 410 sends the user input 420 via the computer network 408 to the emulation processor system 409 of the server system 404.

Upon receiving the user input 420, the emulation processor system 409 performs the same functions as described above with reference to FIG. 4A with respect to the game code gcN to compile the basic blocks 1 through N for generation of the one or more image frames 422. The server system 404 sends the one or more image frames 422 via the computer network 408 to the display device 410 for display of a virtual environment, such as a virtual environment 452, on a display screen of the display device 410. For example, the virtual environment 452 includes a virtual object 454, which is an example of a Warhawk™ fighter jet. In the example, the virtual environment 452 includes a virtual background, which includes one or more virtual objects, such as a virtual pyramid 455 and a virtual structure 456. In this example, the virtual object 454 is capable of shooting virtual missiles at the virtual pyramid 455 and the virtual structure 456 during a play of the legacy game N having the game code gcN.

In an embodiment, communication of data between the server system 404 and the display device 410 occurs via the network communication protocol. For example, the server system 404 includes the network interface controller to convert data into packets. The network interface controller of the server system 404 is coupled to the emulation processor system 409 to receive data from the emulation processor system and embeds the data within one or more packets by applying the network communication protocol. The packets are transferred from the network interface controller of the server system 404 via the computer network 408 to the display device 410. The network interface controller of the display device 410 extracts the data from the one or more packets by applying the network communication protocol. The network interface controller of the display device is coupled to the processor of the display device 410. The network interface controller of the display device provides the data received from the computer network 408 to the processor of the display device 410. The processor of the display device 410 renders data, such as the image frames 422, on the display screen of the display device 410. Moreover, the network interface controller of the display device 410 receives data from the processor of the display device 410 and embeds the data within one or more packets by applying the network communication protocol and sends the one or more packets via the computer network 408 to the server system 404. The network interface controller of the server system 404 applies to network communication protocol to the one or more packets received from the computer network 408 to extract the data from the one or more packets and sends the data to the emulation processor system 409.

In one embodiment, in addition to or instead of the computer network 408, a cellular network is used to communicate data between the server system 404 and the display device 410. For example, communication between the server system 404 and the display device is facilitated using the wireless technologies.

In an embodiment, instead of the display device 410, a head-mounted display (HMD) is used. The head-mounted display is worn on the user 1's head and includes a display screen, such as an LED screen or an OLED screen or an LCD screen. The HMD performs the same functions as that performed by the display device 410.

Figure 5A:
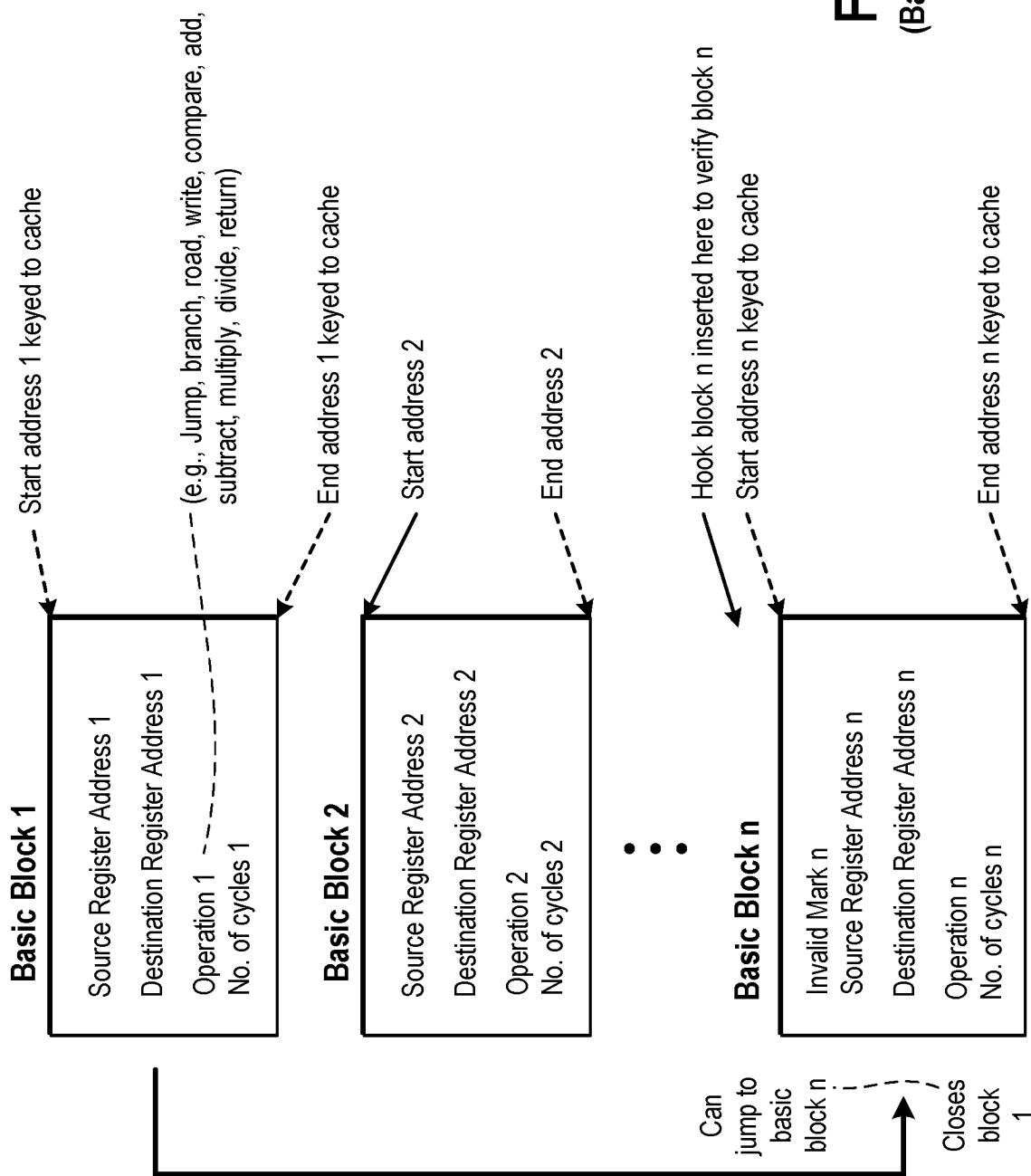
FIG. 5A is a diagram to illustrate an embodiment of a basic block.

FIG. 5A is a diagram to illustrate an embodiment of a basic block. Each basic block includes a source register address, a destination register address, and an operation. For example, the basic block 1 includes a source register address 1, a destination register address 1, and an operation 1. The basic block 2 includes a source register address 2, a destination register address 2, and an operation 2 and the basic block n includes a source register address n, a destination register address n, and an operation n. As an example, a source register address is an address of one or more source registers within the cache 102 and a destination register addresses is an address of one or more destination registers within the cache 102. Examples of an operation of a basic block include a jump operation, and branch operation, a read operation, a write operation, a compare operation, and a return operation. Further examples of an operation of a basic block include an arithmetic operation, such as an add operation, a subtract operation, a multiply operation, and a divide operation.

As an example, when the operation n is the read operation, data is read from the source register address n to execute the basic block n. As another example, when the operation n is a write operation, data is written to the destination register address n to execute the basic block n. As another example, when the operation n is a move operation, data is read from the source register address n, the operation n is performed on the data, and the data is written is to the destination register address n to execute the basic block n. As yet another example, when the operation n is the compare operation, a first value of data stored at a first source register address mentioned in the basic block n is compared with a second value of data stored at a second source register address mentioned in the basic block n to generate a comparison result and the comparison result is stored at the destination register address n to execute the basic block n. As another example, when the operation n is the add operation, a first value of data stored at the first source address mentioned within the basic block n is added to a second value of data stored at the second source address indicated within the basic block n to generate an add result and the add result is stored at the destination register address n to execute the basic block n. As yet another example, when a virtual object, described herein, is to move from the position P1 to the position P2 and the operation n is the write operation in which the position of the virtual object is to be updated from P1 to P2, the position P1 at the destination register address n is overwritten with the position P2 to execute the basic block n. In the example, the execution of the basic block n indicates to the emulation processor system 409 that the virtual object is to move from the position P1 to the position P2. Also, in the example, the user input 420 (FIG. 4A) instructs the emulation processor system 409 to move the virtual object from the position P1 to P2. Similarly, as another example, when a virtual object, described herein, is to move from an orientation O1 to an orientation O2 and the operation n is the write operation in which the orientation of the virtual object is to be updated from O1 to O2, the orientation O1 at the destination register address n is overwritten with the orientation O2 to execute the basic block n. In the example, the execution of the basic block n indicates to the emulation processor system 409 that the virtual object is to move from the orientation O1 to the orientation O2. Further, in the example, the user input 420 instructs the emulation processor system 409 to move the virtual object from the orientation O1 to O2.

As still another example, when a portion of a virtual object, described herein, is to change color from red to green and the operation n is the write operation in which the color of the virtual object is to be updated from red to green, data representing the color red at the destination register address n is overwritten with data representing the color green to execute the basic block n. In the example, the execution of the basic block n indicates to the emulation processor system 409 that the color of the portion of the virtual object is to be changed from red to green. Also, in the example, the user input 420 instructs the emulation processor system 409 to change the color of the portion of the virtual object from red to green. In a similar manner, other parameters, such as intensity and texture, can be modified based on the user input 420.

Each basic block includes a number of cycles of execution of the basic block. For example, the basic block 1 includes a number of cycles 1 of execution of the basic block 1. As another example, the basic block 2 includes a number of cycles 2 of execution of the basic block 2 and the basic block n includes a number of cycles n of execution of the basic block n. As an example, an estimated number of cycles of execution of the basic block is estimated by the basic block compiler 104 (FIG. 1) upon compiling the basic block. In the example, the estimated number of cycles is stored in the basic block. Also in the example, after the basic block is executed by the block dispatcher 302 (FIG. 3), the block dispatcher 302 updates the estimated number of cycles of execution in the manner described above with the real count and provides the real count to the block compiler 104. The estimated number of cycles is replaced by the real count in the basic block by the block compiler 104. As another example, the real count of a number of cycles of execution of the operation n is generated by the block dispatcher 302 and stored in the basic block n. In this example, there is no estimation of a number of cycles of execution of the operation n.

Moreover, as another example, one or more of the basic blocks 1 through n include an invalid mark indicating that the one or more of the basic blocks 1 through n be checked for validity. For example, the basic block n includes an invalid mark n.

It should be noted that by converting the emulated PU code 106 into the basic blocks 1 through n of the game code gcN, a hook, such as a hook block, can be inserted between any two of the basic blocks 1 through n. For example, a hook block n can be inserted between the basic blocks (n−1) and n. The hook block n has the same structure as that of the basic block n. For example, the hook block includes a source register address, a destination register address, an operation, and a number of cycles of execution of the operation of the hook block. As an example, due to security issues associated with the legacy machine, a hook, as described herein, cannot be inserted between instructions of the emulated CPU code 106 (FIG. 1) stored in the legacy machine for execution on the legacy machine.

It should further be noted that the basic blocks 1 through n are keyed into, such as fixed within, the cache 102 (FIG. 1). For example, the basic block 1 has a start memory address 1, which indicates a location of start of the basic block 1 in the cache 102. Also, the basic block 1 has an end memory address 1, which indicates a location of end of the basic block 1 in the cache 102. As another example, the end address 1 of the basic block 1 is indicated by an offset in the cache 106 from the start memory address 1. As yet another example, the basic block 2 has a start memory address 2, which indicates a location of start of the basic block 2 in the cache 102. Also, the basic block 2 has an end memory address 2, which indicates a location of end of the basic block 2 in the cache 102. As another example, the end address 2 of the basic block 2 is indicated by an offset in the cache 106 from the start memory address 2. Similarly, as another example, the basic block n has a start memory address n, which indicates a location of start of the basic block n in the cache 102. Also, the basic block n has an end memory address n, which indicates a location of end of the basic block n in the cache 102. As another example, the end address n of the basic block n is indicated by an offset in the cache 106 from the start memory address n. From the start and end memory addresses, stored in the cache 102, of the basic blocks 1 through n, the emulation processor system 409 (FIG. 4A), such as the basic block compiler 102, can identify the locations of the basic blocks 1 through n in the cache 102.

It should also be noted that in case a user input indicating that the block dispatcher 302 of the updated machine execute the basic block n immediately after executing the basic block 1, the block dispatcher 302 skips execution of the basic blocks 2 through (n−1) in the cache 102 and jumps to the basic block n from the basic block 1. In this case, execution of the basic block 1 is closed by the block dispatcher 302 when the block dispatcher 302 jumps to the basic block n. Also, in this case, a start address of a next basic block is consecutive to an end address of a preceding basic block. For example, the start address 2 is consecutive to the end address 1 and the start address n is consecutive to an end address (n−1) of the basic block (n−1).

In an embodiment, the source register addresses 1 through n are memory addresses of registers of the cache 102 and the destination register addresses 1 through n are memory addresses of registers in the cache 102.

In one embodiment, a basic block includes multiple operations. For example, the basic block n includes a first operation, a first source register address, and a first destination register address. The basic block n further includes a second operation, a second source register address, and a second destination register address.

In an embodiment, a basic block includes an operation, multiple source addresses, and a destination address.

In one embodiment, a basic block includes an operation, multiple destination addresses, and a source address.

In an embodiment, a basic block includes multiple operations, multiple source addresses, and multiple destination addresses.

In an embodiment, a basic block includes one or more operations, one or more source addresses, and one or more destination addresses.

In an embodiment, a basic block includes either a source register address or a destination register address but not both.

In one embodiment, the block compiler 102 does not estimate the number of cycles for execution of the basic block n. Rather, the block dispatcher 302 generates the real count of the number of cycles of execution of the basic block n and stores the real count in the basic block n.

Figure 5B:
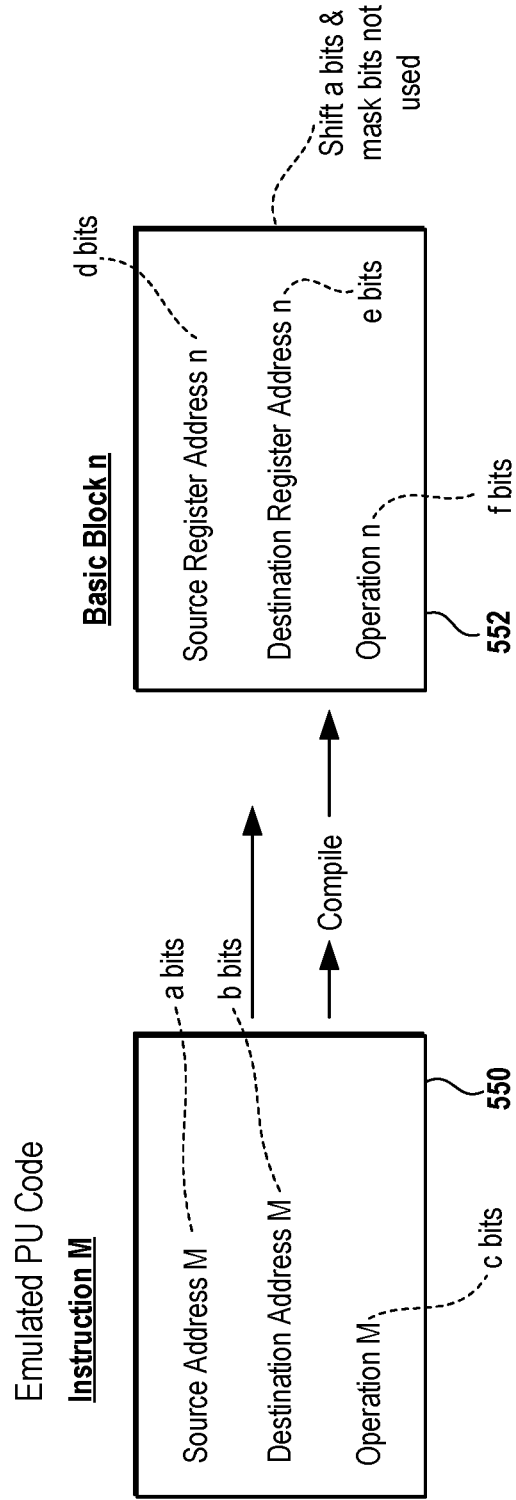
FIG. 5B is a diagram to illustrate an embodiment of a compile operation performed by a basic block compiler.

FIG. 5B is a diagram to illustrate an embodiment of a compile operation performed by the basic block compiler 104 (FIG. 1). An example of an emulated PU code instruction M is illustrated as an instruction 550 and an example of the basic block n is illustrated as a basic block 552, where M is a positive integer. The instruction 550 includes a source address M having a length of a bits, a destination address M having a length of b bits, and an operation M represented by bits of length c, where a, b, and c are positive integers. As an example, a is 4, b is 4, and c is 32. As an example, the a bits, b bits, and c bits are stored in the one or more memory devices of the legacy machine. For example, the a bits are stored in the memory device 406 or 412 (FIGS. 4A and 4B). The operation 552 includes the source register address n having a length of d bits, the destination address n having a length of e bits, and the operation n represented by bits of length f, where d, e, and f are positive integers. As an example, d is 8, e is 8, and f is 64. As an example, the d bits, e bits, and f bits are stored in the one or more registers of the updated machine. As an example, d is greater than a, e is greater than b, and f is greater than c. To illustrate, d is 8, e is 8, and f is 64 when a is 4, b is 4, and c is 32. As another example, d is 16, e is 16, and f is 128 when a is 4, b is 4, and c is 32.

To perform the compile operation, the basic block compiler 104 (FIG. 1) converts the source address M into the source register address n, the destination address M into the destination register address n, and the operation M into the operation n to generate the basic block n from the emulated PU code instruction M. For example, the basic block compiler 104 shifts 4 bits of the source address M to the right to occupy 4 memory addresses of 8 source registers in the cache 102 and masks any bits in remaining four memory addresses of the 8 source registers. The four memory addresses occupied by the 4 bits of the source address M are at the least significant positions of the 8 source registers in the cache 102 and the remaining four memory addresses in which the bits are masked are at the most significant positions of the 8 source registers in the cache 102.

As another example, the basic block compiler 104 shifts 4 bits of the destination address M to the right to occupy 4 memory addresses of 8 destination registers in the cache 102 and masks any bits in remaining four memory addresses of the 8 destination registers. The four memory addresses occupied by the 4 bits of the destination address m are at the least significant positions of the 8 destination registers in the cache 102 and the remaining four memory addresses in which the bits are masked are at the most significant positions of the 8 destination registers in the cache 102.

Similarly, as another example, the basic block compiler 104 shifts 32 bits of the operation M to the right to occupy 32 memory addresses of 64 operation registers in the cache 102 and masks any bits in remaining 32 memory addresses of the 64 operation registers. The 32 memory addresses occupied by the 32 bits of the operation M are at the least significant positions of the 32 operation registers in the cache 102 and the remaining 32 memory addresses in which the bits are masked are at the most significant positions of the 64 operation registers in the cache 102. The operation n is stored in the operation registers of the cache 102.

Figure 6A:
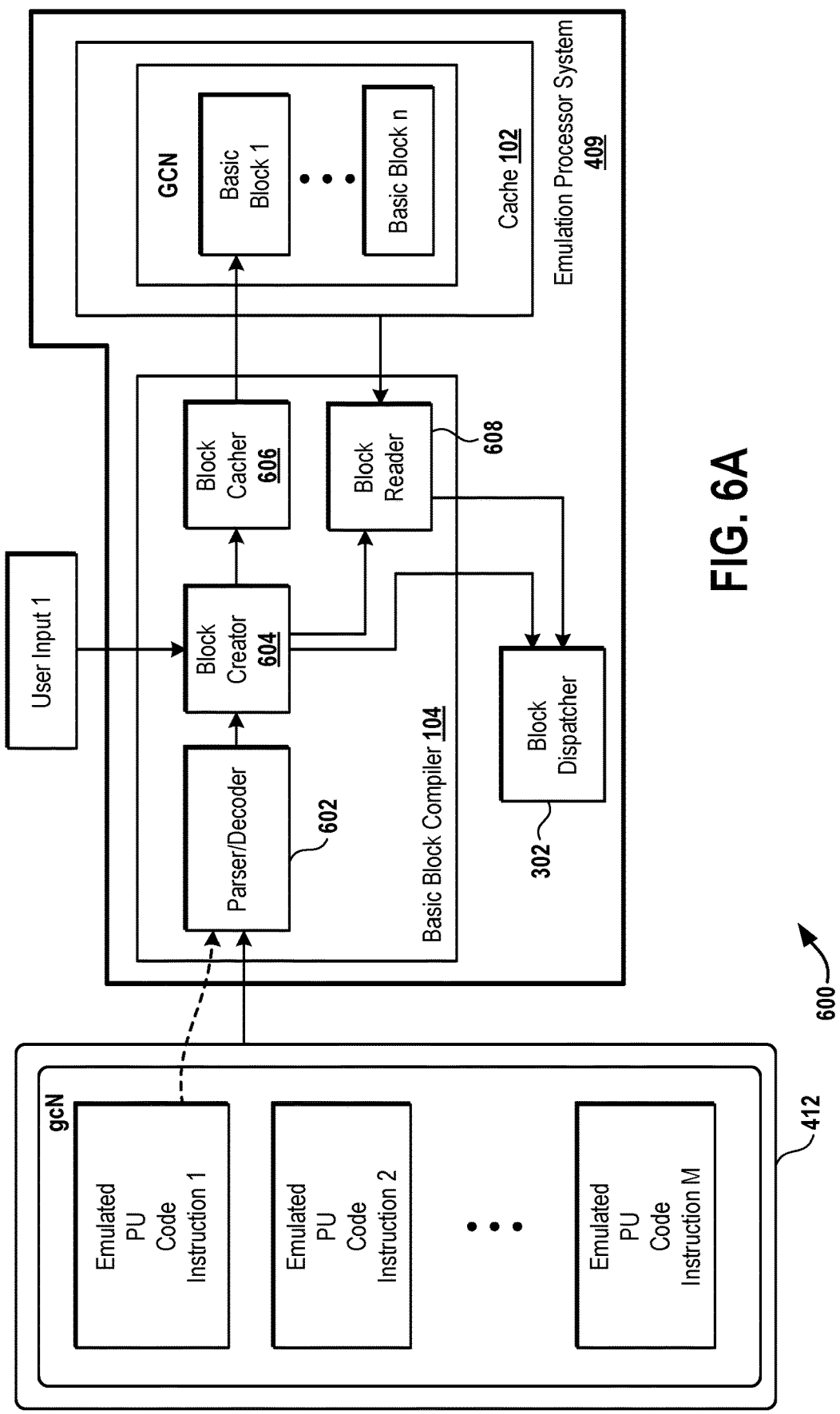
FIG. 6A is a diagram of an embodiment of a system to illustrate components of the emulation processor system.

FIG. 6A is a diagram of an embodiment of a system 600 to illustrate components of the emulation processor system 409. The system 600 includes the memory device 412 and the emulation processor system 409. The basic block compiler 104 of the emulation processor system 409 includes a parser or decoder 602. The basic block compiler 104 further includes a block creator 604, a block cacher 606A, and a block reader 608. The emulation processor system 409 includes the block dispatcher 302.

As an example, each of the parser 609, the block creator 604, the block cacher 606, the block reader 608, and the block dispatcher 302 is implemented using software, or hardware, or a combination thereof. For example, each of the parser 609, the block creator 604, the block cacher 606, the block reader 608, and the block dispatcher 302 is a separate integrated circuit, such as a PLD or an ASIC or a controller or a processor or a portion of a computer program. As another example, each of the parser 609, the block creator 604, the block cacher 606, the block reader 608, and the block dispatcher 302 is a separate computer software program.

The game code gcN includes multiple instructions, such as an emulated PU code instruction 1, an emulated PU code instruction 2 and so on until the emulated PU code instruction M. For example, each instruction of the game code gcN is a series of bits that can be executed by the processor of the legacy machine to implement a function, such as moving a virtual object from the position P1 to the position P2, or changing an orientation of the virtual object from O1 to O2, or modifying the parameter of a portion of the virtual object.

The parser 602 is coupled to the block creator 604, which is coupled to the block cacher 606 and to the block reader 608. The block cacher 606 and the block reader 608 or coupled to the cache 102. The block reader 608 is coupled to the block dispatcher 302.

Figure 6B:
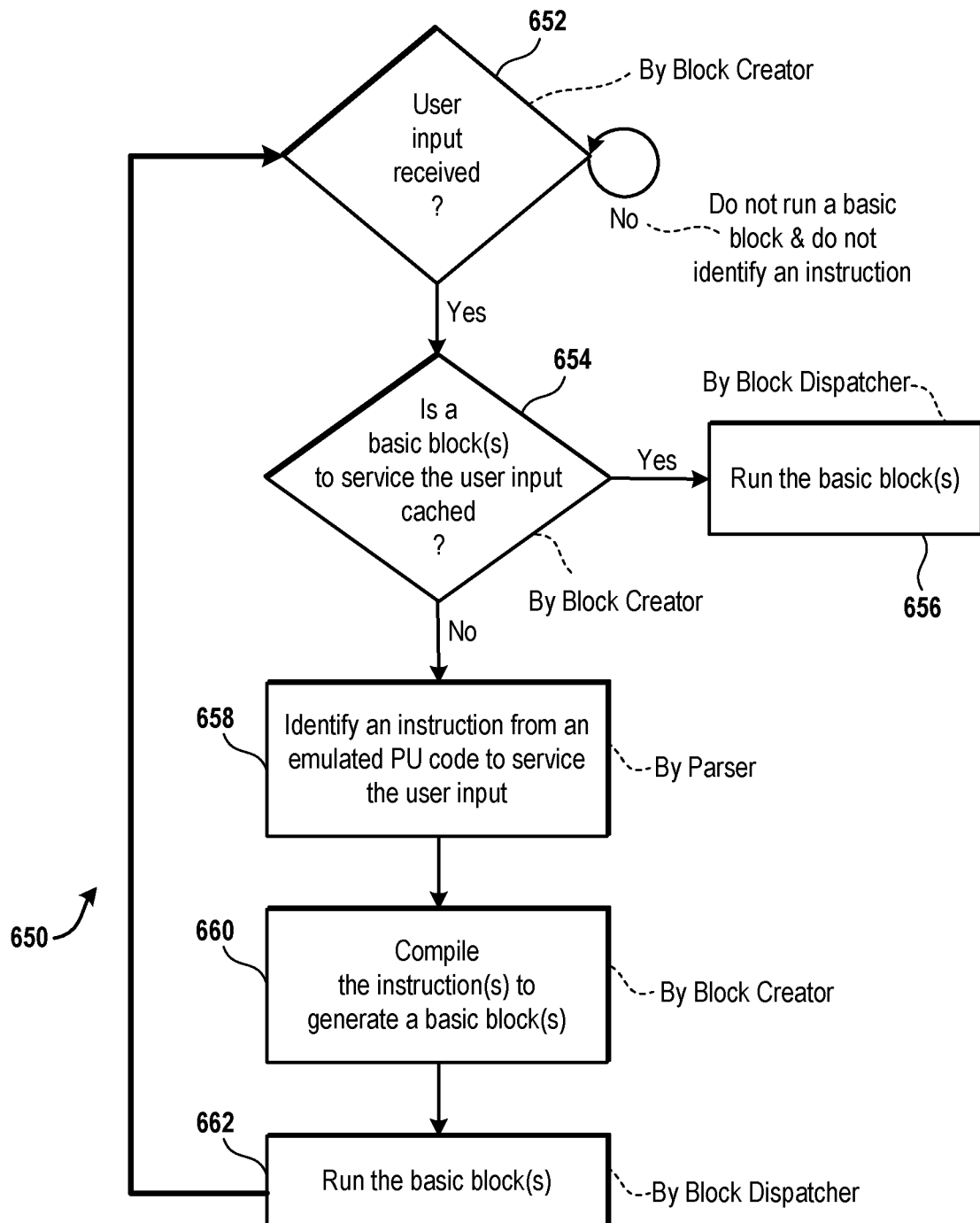
FIG. 6B is a flowchart to illustrate an embodiment of a method for compiling and executing the basic blocks.

FIG. 6B is a flowchart to illustrate an embodiment of a method 650 for compiling and executing the basic blocks 1 through n. The method 650 is illustrated using the system 600 of FIG. 6A. In an operation 652 of the method 650, the block creator 604 determines whether any user input, such as a user input 1, is received. As an example, the user input 1 is a signal that includes and one or more identifications of one or more buttons of the hand-held controller 414 (FIG. 4A) that are selected by the user 1. As another example, the user input 1 is a signal that includes a measure of movement, such as pitch, yaw, and roll, with respect to an origin of an xyz co-ordinate system centered on the hand-held controller 414. As yet another example, the user input 1 is a signal that includes a measure of movement, such as pitch, yaw, and roll, with respect to an origin of an xyz co-ordinate system of the HMD. An example of the user input 1 is the user input 420 (FIG. 4A).

The block creator 604 continues to check whether the user input is received in the operation 652 upon determining that the user input is not received. For example, the basic block compiler 104 does not run any of basic blocks (n+1) through p stored in the cache 102 (FIG. 1) and the basic block compiler 104 (FIG. 1) does not identify any of the emulated PU code instructions 1 through M (FIG. 6A) when the user input is not received in the operation 652, where p is a positive integer. It is assumed that at a time the user input is received in the operation 652, the basic blocks 1 through n are not generated and are not stored in the cache 102.

On the other hand, in response to determining that the user input is received in the operation 652, in an operation 654 of the method 650, the block creator 604 determines whether one or more of the basic blocks (n+1) through p that are stored in the cache 102 satisfy the user input. For example, the block creator 604 sends a request to the block reader 608 to access the basic blocks (n+1) through p from the cache 102. In the example, the block reader 608, upon receiving the request, reads the basic blocks (n+1) through p from the cache 102 and sends the basic blocks (n+1) through p to the block creator 604. Further, in the example, the block creator 604 determines whether functionality of one or more of the basic blocks (n+1) through p satisfies, such as services, the user input 1. To illustrate, when the user input 1 indicates to change a position of a virtual object from the position P1 to the position P2, the block creator 604 determines whether any of the basic blocks (n+1) through p include an operation of overwriting the position P1 with the position P2. Upon determining that one or more of the basic blocks (n+1) through p include the operation of overwriting the position P1 with P2, the block creator 604 determines that one or more functionalities of the one or more of the blocks (n+1) through p satisfies the user input 1. On the other hand, upon determining that none of the basic blocks (n+1) through p include the operation of overwriting the position P1 with P2, the block creator 604 determines that functionalities of the basic blocks (n+1) through p do not satisfy the user input 1.

As another illustration, when the user input 1 is to change an orientation of a virtual object from the orientation O1 to the orientation O2, the block creator 604 determines whether any of the basic blocks (n+1) through p include an operation of overwriting the orientation O1 with the orientation O2. Upon determining that one or more of the basic blocks (n+1) through p includes the operation of overwriting the orientation O1 with O2, the block creator 604 determines that one or more functionalities of the one or more of the basic blocks (n+1) through p satisfies the user input 1. On the other hand, upon determining that none of the basic blocks (n+1) through p includes the operation of overwriting the orientation O1 with O2, the block creator 604 determines that functionalities of the basic blocks (n+1) through p do not satisfy the user input 1. As yet another illustration, when the user input 1 is to change a value of the parameter of a portion of a virtual object from a first value to a second value, the block creator determines whether any of the basic blocks (n+1) through p include an operation of overwriting the first value with the second value. Upon determining that one or more of the basic blocks (n+1) through p include the operation of overwriting the first value with the second value, the block creator 604 determines that one or more functionalities of the one or more of the basic blocks (n+1) through p satisfies the user input 1. On the other hand, upon determining that none of the basic blocks (n+1) through p include the operation of overwriting the first value at the second value, the block creator 604 determines that functionalities of the basic blocks (n+1) through p do not satisfy the user input 1.

Upon determining that the functionalities of one or more of the basic blocks (n+1) through p satisfy the user input 1, in an operation 656 of the method 600, the block dispatcher 302 executes the one or more of the basic blocks (n+1) through p. For example, upon determining that the functionalities of one or more of the basic blocks (n+1) through p satisfy the user input 1, the block creator 604 sends an instruction to the block dispatcher 302 to execute the one or more of the basic blocks (n+1) through p. In the example, in response to receiving the instruction, the block dispatcher 302 sends a command to the block reader 608 to read the one or more of the basic blocks (n+1) through p from the cache 102 for satisfying the user input received in the operation 652. Also, in the example, upon receiving the one or more of the basic blocks from the cache 102 in response to the command, the block dispatcher 302 executes the one or more of the basic blocks (n+1) through p.

On the other hand, upon determining that the functionalities of the blocks (n+1) through p do not satisfy the user input 1, in an operation 658 of the method 600, the block compiler 102 identifies one or more of the emulated PU code instructions 1 through M for servicing the user input received in the operation 652. For example, upon determining that the functionalities of the blocks (n+1) through p do not satisfy the user input 1, the block creator 604 sends a request to the parser 602 to parse the game code gcN to identify and obtain one or more of the emulated PU code instructions 1 through M of the game code gcN that satisfy the functionality identified in the user input 1. In the example, in response to receiving the request, the parser 602 accesses the memory device 412 to parse the game code gcN to determine whether functionalities of one or more of the emulated PU code instructions 1 through M satisfy the user input 1 and upon determining that the functionalities of one or more of the emulated PU code instructions 1 through M satisfy the user input 1, the parser 602 provides the one or more of the emulated PU code instructions 1 through M to the block creator 604.

To illustrate, when the user input 1 is to change a position of a virtual object from the position P1 to the position P2, the parser 602 determines whether any of the emulated PU code instructions 1 through M include an operation of overwriting the position P1 with the position P2. Upon determining that one or more of the emulated PU code instructions 1 through M include the operation of overwriting the position P1 with P2, the parser 602 determines that one or more functionalities of the one or more of the emulated PU code instructions 1 through M satisfies the user input 1. On the other hand, upon determining that none of the emulated PU code instructions 1 through M includes the operation of overwriting the position P1 with P2, the parser 602 determines that functionalities of the emulated PU code instructions 1 through M do not satisfy the user input 1.

As another illustration, when the user input 1 is to change an orientation of a virtual object from the orientation O1 to the orientation O2, the parser 602 determines whether any of the emulated PU code instructions 1 through M include an operation of overwriting the orientation O1 with the orientation O2. Upon determining that one or more of the emulated PU code instructions 1 through M includes the operation of overwriting the orientation O1 with O2, the parser 602 determines that one or more functionalities of the one or more of the emulated PU code instructions 1 through M satisfies the user input 1. On the other hand, upon determining that none of the emulated PU code instructions 1 through M includes the operation of overwriting the orientation O1 with O2, the parser 602 determines that functionalities of the emulated PU code instructions 1 through M do not satisfy the user input 1. As yet another illustration, when the user input 1 is to change a value of the parameter of a portion of a virtual object from a first value to a second value, the parser 602 determines whether any of the emulated PU code instructions 1 through M include an operation of overwriting the first value with the second value. Upon determining that one or more of the emulated PU code instructions 1 through M include the operation of overwriting the first value with the second value, the parser 602 determines that one or more functionalities of the one or more of the emulated PU code instructions 1 through M satisfies the user input 1. On the other hand, upon determining that none of the emulated PU code instructions 1 through M include the operation of overwriting the first value at the second value, the parser 602 determines that functionalities of the emulated PU code instructions 1 through M do not satisfy the user input 1.

In an operation 660 of the method 600, when the one or more of the emulated PU code instructions 1 through M that satisfy the user input 1 are received from the parser 602, the block creator 604 applies the compile operation, described above, to generate one or more of the basic blocks 1 through n from the one or more of the emulated PU code instructions 1 through M. For example, the block creator 604 compiles the one or more of the basic blocks 1 through n, sends the one or more of the basic blocks 1 through n to the block cacher 606, and sends an instruction to the block dispatcher 302 to execute the one or more of the basic blocks 1 through n. Upon receiving the one or more of the basic blocks 1 through n, the block cacher 606 stores the one or more of the basic blocks 1 through n in the cache 102.

In an operation 662 of the method 600, upon receiving the instruction from the block creator 604 to execute the one or more of the basic blocks 1 through n, the block dispatcher 302 runs the one or more of the basic blocks 1 through n to service the user input received in the operation 652. For example, the block dispatcher 302 sends a request to the block reader 608 to read the one or more of the basic blocks 1 through n from the cache 102. Upon receiving the command, the block reader 608 reads the one or more of the basic blocks 1 through n from the cache 102 and provides the one or more of the basic blocks 1 through n to the block dispatcher 302. Upon receiving the one or more of the basic blocks 1 through n, the block dispatcher 302 executes the one or more of the basic blocks 1 through n to generate the virtual environment 452 (FIG. 4B). To illustrate, the block dispatcher 302 executes the one or more of the basic blocks 1 through n to generate an image frame, which includes virtual environment data, such as a position and an orientation of the virtual object 454, the parameter of the virtual object 454, positions and orientations of other virtual objects in the virtual environment 452, and the parameter of the other virtual objects in the virtual environment 452. The block dispatcher 302 provides the image frame to a GPU of the emulation processor system 409 to display, such as render, the virtual environment 452 on the display screen of the display device 410 (FIG. 4A). The method 600 repeats, when another user input, such as the user input 2, is received after the user input 1 is received in the operation 652.

Figure 6C:
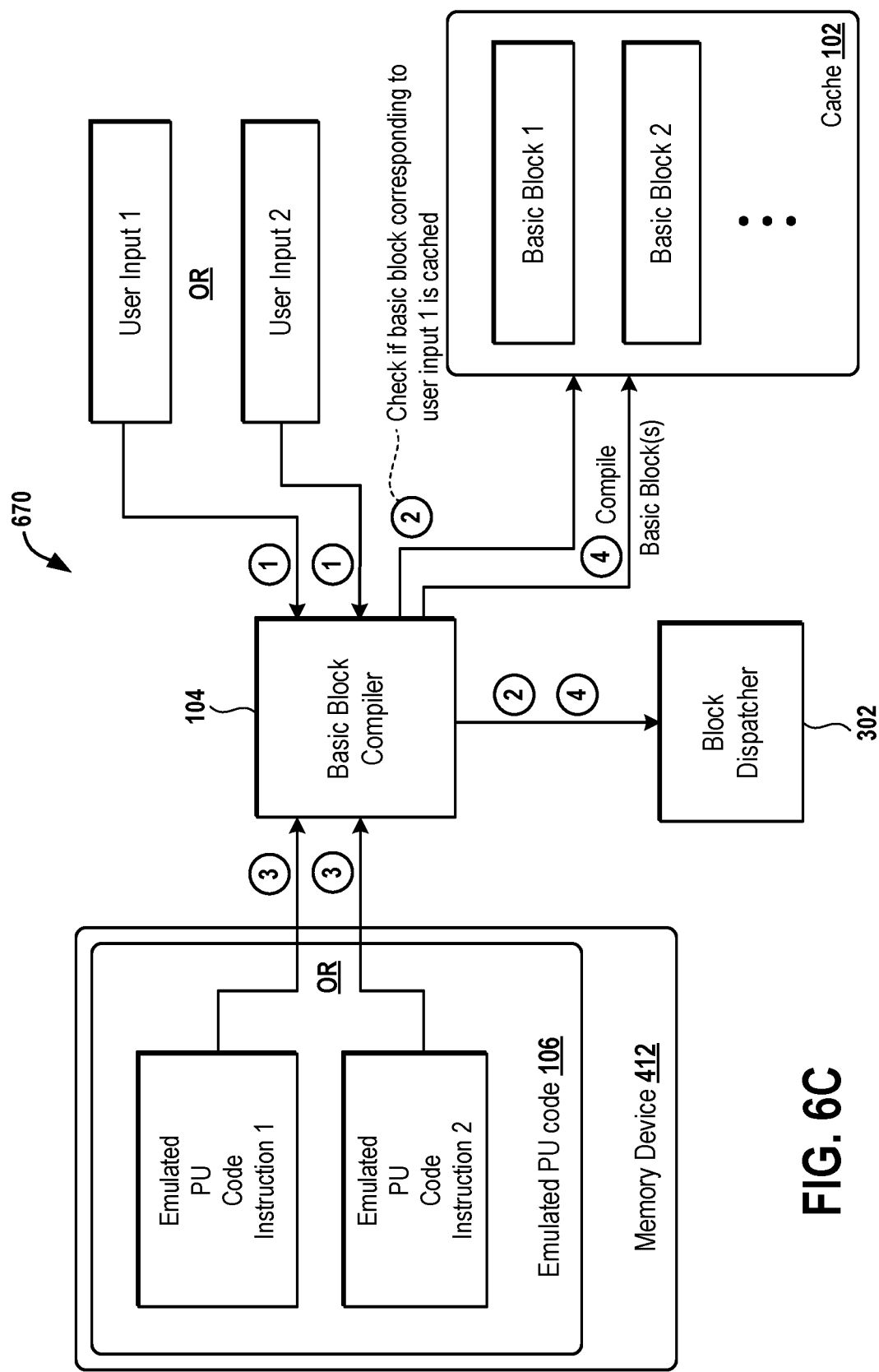
FIG. 6C is a diagram of an embodiment of a system to illustrate that for different user inputs, different basic blocks are compiled dynamically.

FIG. 6C is a diagram of an embodiment of a system 670 to illustrate that for different user inputs, different basic blocks or different sets of basic blocks are compiled dynamically. The system 670 includes the memory device 412, the basic block compiler 104, the block dispatcher 302, and the cache 102. When the user input 1 is received by the basic block compiler 104, the basic block compiler 104 determines if the basic block 1 that corresponds to the user input 1 is stored in the cache 102. For example, the basic block 1 corresponds to the user input 1 when the basic block 1 includes a function for servicing the user input 1. To illustrate, when the user input 1 is to move a virtual object from the position P1 to the position P2 and the basic block 1 includes an operation of updating the position P1 stored at the destination register address 1 with the position P2, the basic block 1 can service the user input 1. In the illustration, the user input 1 is a signal indicating a selection of a move to right button or a move to left button or a move up button or a move down button on the hand-held controller 414 (FIG. 4A). Similarly, the basic block 2 does not correspond to the user input 1 when the basic block 2 does not include a function for servicing the user input 1. To illustrate, when the user input 1 is to move a virtual object from the position P1 to the position P2 without changing an orientation of the virtual object and the basic block 2 includes an operation of updating the orientation O1 stored in the destination register 2 with the orientation O2, the basic block 2 cannot service the user input 1. Upon determining that the basic block 1 that can service the user input 1 is stored in the cache 102, the basic block compiler 104 provides the basic block 1 to the block dispatcher 302 for executing the basic block 1.

On the other hand, upon determining that the basic block 1 is not stored in the cache 102, the basic block compiler 104 parses the emulated PU code 106 stored in the memory device 412 to identify the emulated PU code instruction 1 corresponding to the user input 1. For example, the basic block compiler 104 parses the emulated PU code 106 to identify that the emulated PU code instruction 1 satisfies, such as services, the user input 1. To illustrate, when the user input 1 is to move a virtual object from the position P1 to the position P2 and the emulated PU code instruction 1 includes a function of updating the position P1 stored at the destination address 1 with the position P2, the emulated PU code instruction 1 can service the user input 1. Similarly, the emulated PU code instruction 2 does not correspond to the user input 1 when the emulated PU code instruction 2 does not include a function for servicing the user input 1. To illustrate, when the user input 1 is to move a virtual object from the position P1 to the position P2 without changing an orientation of the virtual object and the emulated PU code instruction 2 includes an operation of updating the orientation O1 stored at the destination address 2 with the orientation O2, the emulated PU code instruction 2 cannot service the user input 1.

Upon determining that the emulated PU code instruction 1 can service the user input 1 and the emulated PU code instruction 2 cannot service the user input 1, the basic block compiler 104 accesses, such as reads, the emulated PU code instruction 1 from the memory device 412 and compiles the basic block 1 from the emulated PU code instruction 1. The basic block compiler 102 does not compile the basic block 2 from the emulated PU code instruction 2 in response to receiving the user input 1. The basic block compiler 104 stores the basic block 1 in the cache 102 and sends an instruction to the block dispatcher 302 to access and execute the basic block 1. Upon receiving the instruction, block dispatcher 302 reads the basic block 1 from the cache 102 and runs the basic block 1.

Similarly, when the user input 2 is received by the basic block compiler 104, the basic block compiler 104 determines if the basic block 2 that corresponds to the user input 2 is stored in the cache 102. For example, the basic block 2 corresponds to the user input 2 when the basic block 2 includes a function for servicing the user input 2. To illustrate, when the user input 2 is to move a virtual object from the orientation O1 to the orientation O2 and the basic block 2 includes an operation of updating the orientation O1 stored at the destination register address 2 with the orientation O2, the basic block 2 can service the user input 2. In the illustration, the user input 2 is a signal indicating a selection of a rotate clockwise or a rotate counterclockwise button on the hand-held controller 414. Similarly, the basic block 1 does not correspond to the user input 2 when the basic block 1 does not include a function for servicing the user input 2. To illustrate, when the user input 2 is to move a virtual object from the orientation O1 to the orientation O2 without changing a position of the virtual object and the basic block 1 includes an operation of updating the position P1 stored in the destination register 1 with the position P2, the basic block 1 cannot service the user input 2. Upon determining that the basic block 2 can service the user input 2 is stored in the cache 102, the basic block compiler 104 provides the basic block 2 to the block dispatcher 302 for executing the basic block 2.

On the other hand, upon determining that the basic block 2 is not stored in the cache 102, the basic block compiler 104 parses the emulated PU code 106 stored in the memory device 412 to identify the emulated PU code instruction 2 corresponding to the user input 2. For example, the basic block compiler 104 parses the emulated PU code 106 to identify that the emulated PU code instruction 2 satisfies, such as services, the user input 2. To illustrate, when the user input 2 is to move a virtual object from the orientation O1 to the orientation O2 and the emulated PU code instruction 2 includes a function of updating the orientation O1 stored at the destination address 2 with the orientation O2, the emulated PU code instruction 2 can service the user input 2. Similarly, the emulated PU code instruction 1 does not correspond to the user input 2 when the emulated PU code instruction 1 does not include a function for servicing the user input 2. To illustrate, when the user input 2 is to move a virtual object from the orientation O1 to the orientation O2 without changing a position of the virtual object and the emulated PU code instruction 1 includes an operation of updating the position P1 stored in the destination address 1 with the position P2, the emulated PU code instruction 1 cannot service the user input 2.

Upon determining that the emulated PU code instruction 2 can service the user input 2 and the emulated PU code instruction 1 cannot service the user input 2, the basic block compiler 104 accesses, such as reads, the emulated PU code instruction 2 from the memory device 412 and compiles the emulated PU code instruction 2 to generate the basic block 2. The basic block compiler 102 does not compile the emulated PU code instruction 1 in response to receiving the user input 2. The basic block compiler 104 stores the basic block 2 in the cache 102 and sends an instruction to the block dispatcher 302 to access and execute the basic block 2. Upon receiving the instruction, block dispatcher 302 reads the basic block 2 from the cache 102 and runs the basic block 2.

Figure 7A:
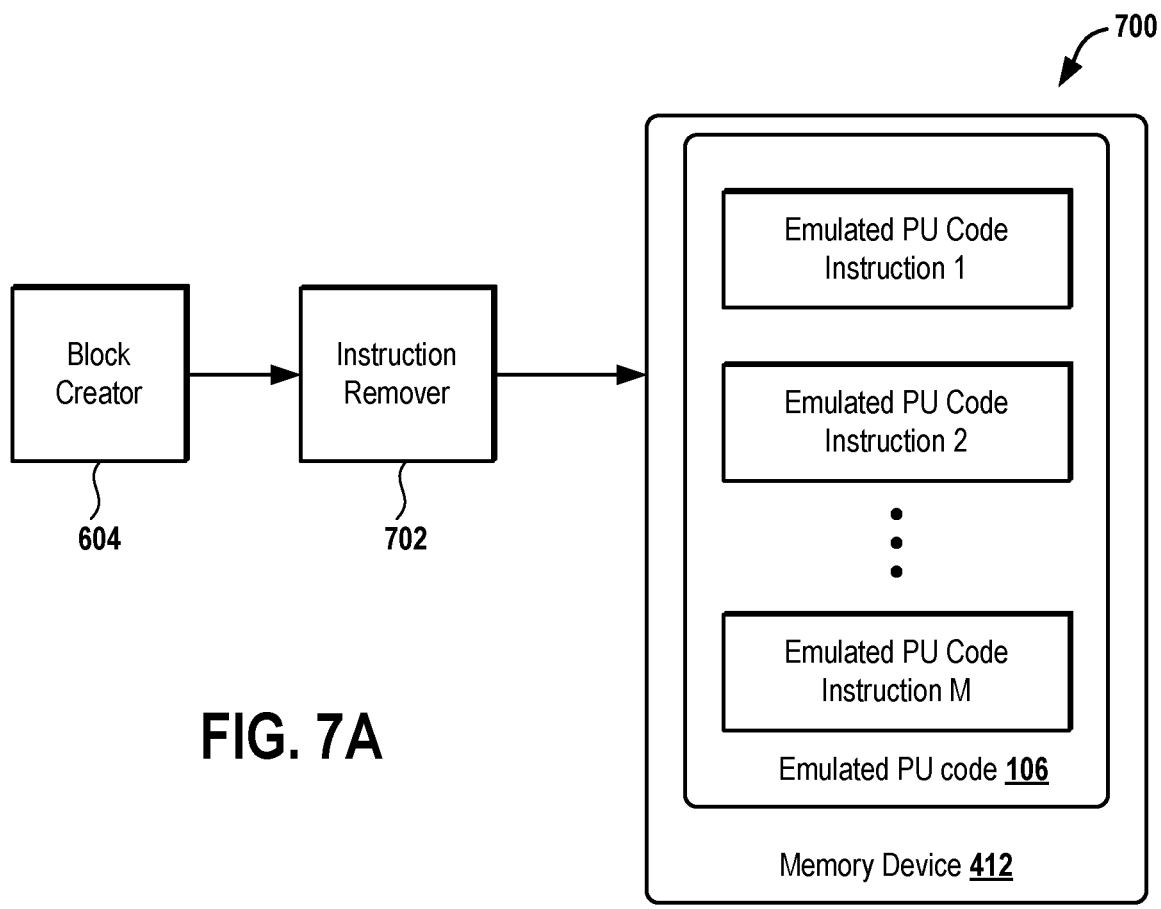
FIG. 7A is a diagram of an embodiment of a system to illustrate deletion of an emulated processing unit (PU) code from a memory device.

FIG. 7A is a diagram of an embodiment of a system 700 to illustrate deletion of the emulated PU code 106 from the memory device 412. The system 700 includes the block creator 604, an instruction remover 702, and the memory device 412. Examples of the instruction remover 702 include a processor, an ASIC, a PLD, a computer program, a portion of a computer program, and a microcontroller. The instruction remover 702 is coupled to the block creator 604 and to the memory device 412.

Figure 7B:
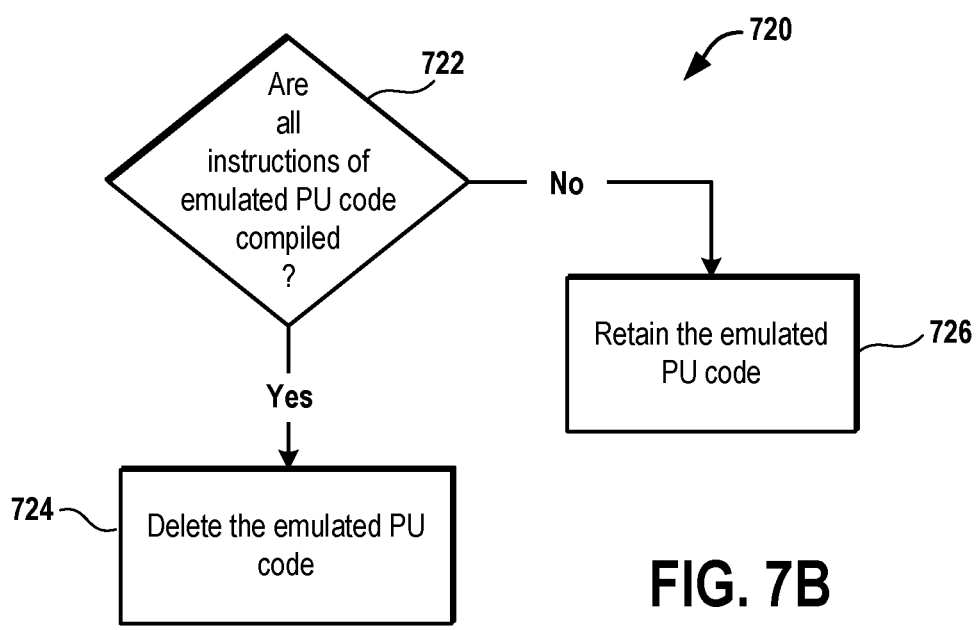
FIG. 7B is a flowchart to illustrate an embodiment of a method for deleting the emulated PU code from the memory device.

FIG. 7B is a flowchart to illustrate an embodiment of a method 720 for deleting the emulated PU code 106 (FIG. 6C) from the memory device 412 (FIG. 6C). The method 720 includes an operation 702 for determining whether all instructions of the emulated PU code 106 are compiled. For example, the block creator 604 (FIG. 7A) determines whether all of the emulated PU code instructions 1 through M of the game code gcN are compiled. To illustrate, before compiling any of the emulated PU code instructions 1 through M of the game code gcN, the block creator 604 sends a request to the processor of the legacy machine to obtain identities of all of the emulated PU code instructions 1 through M of the game code gcN. In the illustration, the block creator 604 sends an identity, such as one or more bits, of the game code gcN to the processor of the legacy machine to obtain identities of all of the emulated PU code instructions 1 through M of the game code gcN. Examples of the identities of the emulated PU code instructions 1 through M include one or more bits. To illustrate, the identity of the emulated PU code instruction M is represented by a first sequence of bits and the identity of the emulated PU code instruction M–1 is represented by a second sequence of bits, which is different from the first sequence. Upon receiving the identities of the emulated PU code instructions 1 through M from the processor of the legacy machine, the block creator 604 stores the identities in a table in the cache 102. As each of the emulated PU code instructions 1 through M is compiled, the block creator 604 updates the table to include indications that identify which of the emulated PU code instructions 1 through M are compiled. The block creator 604 determines whether all of the emulated PU code instructions 1 through M are compiled from the indications that identify which of the emulated PU code instructions 1 through M are compiled.

Upon determining that all the emulated PU code instructions 1 through M of the game code gcN are compiled, the block creator 604 sends a command to the instruction remover 702 (FIG. 7A) to delete the game code gcN from the memory device 412. Upon receiving the command, in an operation 724 of the method 720, the instruction remover 702 erases the emulated PU code instructions 1 through M from the memory device 412.

On the other hand, upon determining that one or more of the emulated PU code instructions 1 through M of the game code gcN are not compiled based on the table, in an operation 726 of the method 720, the block creator 604 does not send the command to the instruction remover 702 to delete the game code gcN from the memory device 412. Until the command to delete the game code gcN is received, the instruction remover 702 does not delete the emulated PU code instructions 1 through M from the memory device 412.

In one embodiment, the block creator 604 determines whether the game code gcN is accessed from the memory device 412 (FIG. 4A) within a pre-determined time period, which is stored in the cache 102, from the latest time the game code gcN is accessed from the memory device 412. As an example, the block creator 604 can access the Internet clock via the computer network 408 to determine the latest time and the pre-determined time period. As another example, the block creator 604 includes a clock source, such as a clock oscillator, to count the latest time and the pre-determined time period. Upon determining that the game code gcN is not accessed from the memory device 412 within the pre-determined time period, the block creator 604 sends a command to the instruction remover 702 to delete the game code gcN from the memory device 412. As an example, when the game code gcN is not accessed within the pre-determined time period, a majority of emulated CPU code instructions 1 through M are accessed by the basic block compiler 104 to compile one or more of the basic blocks 1 through n. As another example, when the game code gcN is not accessed within the pre-determined time period, a number of emulated CPU code instructions 1 through M that are frequently used during a play of the legacy game N having the game title GN are accessed by the basic block compiler 104 to compile one or more of the basic blocks 1 through n. On the other hand, upon determining that the game code gcN is accessed within the pre-determined time period, the block creator 604 does not send the command to the instruction remover 702 and the game code gcN is not deleted from the memory device 412.

Figure 8A:
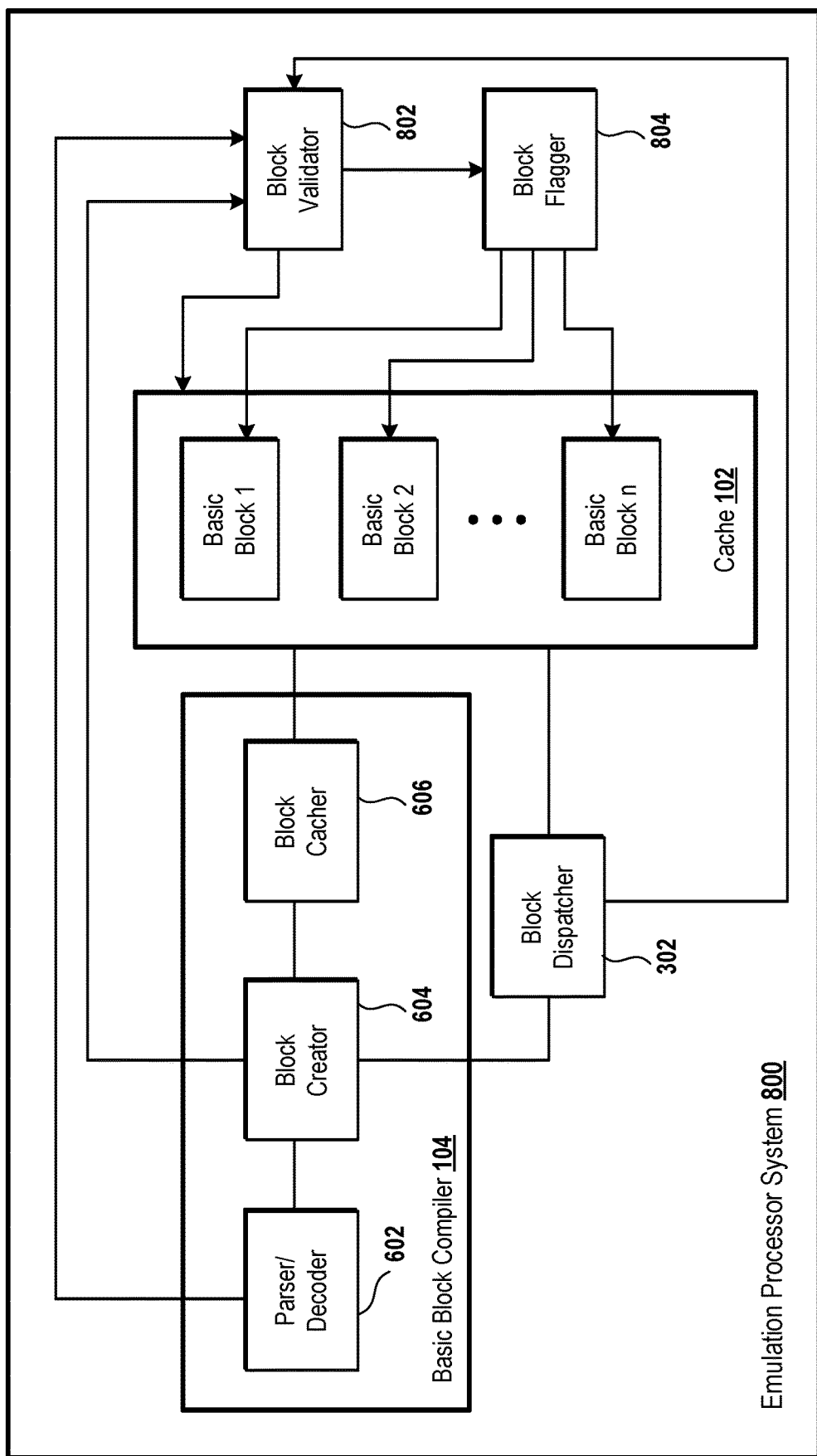
FIG. 8A is a diagram of an embodiment of an emulation processor system to illustrate validation of basic blocks.

FIG. 8A is a diagram of an embodiment of an emulation processor system 800 to illustrate validation of basic blocks. The emulation processor system 800 is an example of the emulation processor system 409 (FIG. 4B). The emulation processor system 800 includes the basic block compiler 104, the cache 102, a block validator 802 and a block flagger 804. The block validator 802 is coupled to the block creator 604, the block dispatcher 302, the parser 602, and the block flagger 804. Each of the clock validator 802 and the block flagger 804 is coupled to the cache 102.

As an example, the block validator 802 is implemented as an ASIC, or a PLD, or a microcontroller, or a processor, or a computer program, or a portion of a computer program. Also as an example, the block flagger 804 is implemented as an ASIC, or a PLD, or a microcontroller, or a processor, or a computer program, or a portion of a computer program.

In one embodiment, the terms ASIC, PLD, microcontroller, microprocessor, controller, and processor are used herein interchangeably.

Figure 8B:
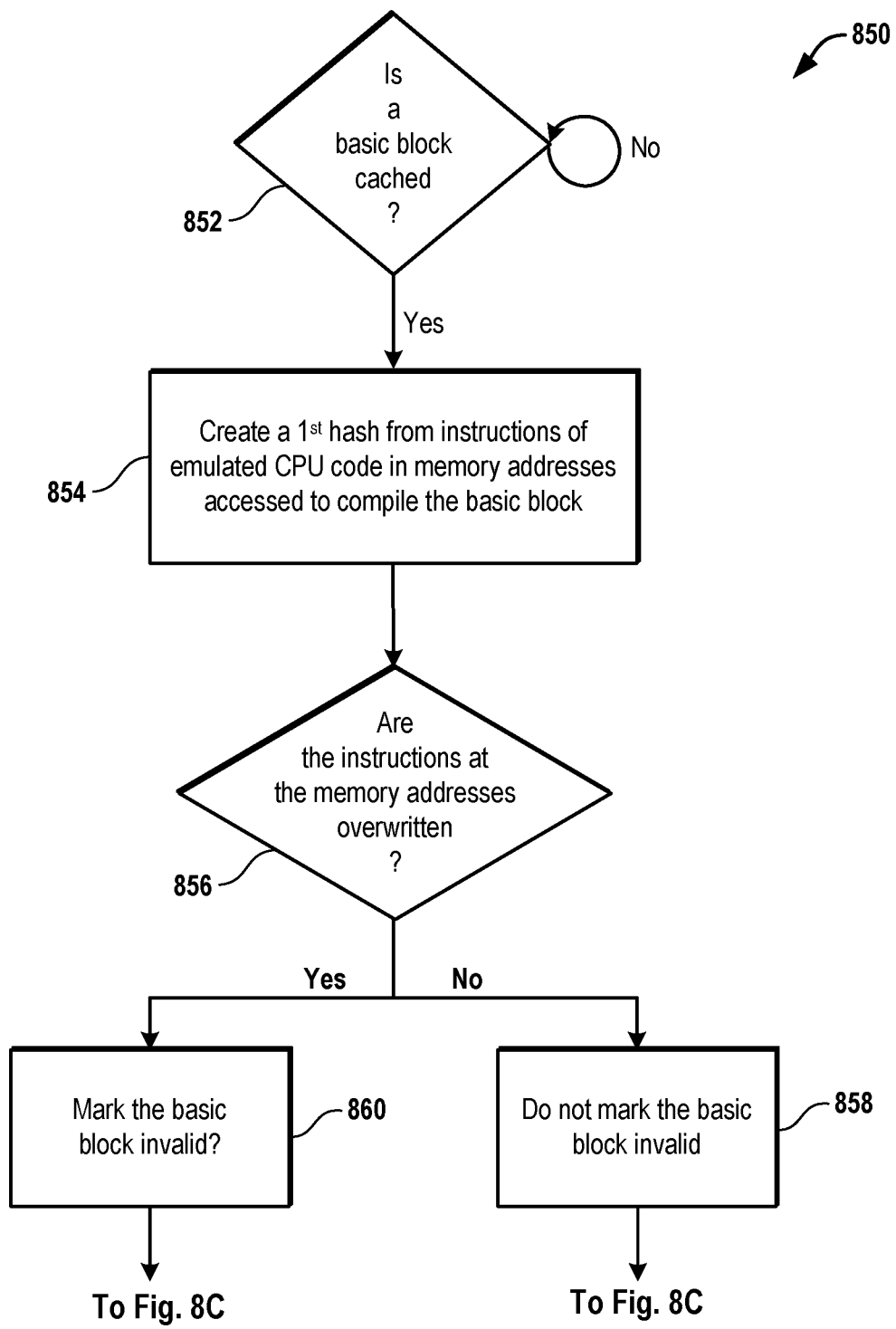
FIG. 8B is a flowchart of an embodiment of a method to illustrate a validation operation performed by the emulation processor system of FIG. 8A.

FIG. 8B is a flowchart of an embodiment of a method 850 to illustrate a validation operation performed by the emulation processor system 800 (FIG. 8A). In an operation 852 of the method 800, the block validator 802 (FIG. 8A) determines whether the basic block n is compiled. For example, the block validator 802 accesses, such as reads, the cache 102 to determine whether a new basic block, such as the basic block n, is now stored in the cache 102 compared to the basic blocks 1 through n−1 previously stored in the cache 102. The block validator 802 previously identified the basic blocks 1 through n−1 stored in the cache 102. Upon determining that the basic block n is not cached, the block validator 802 continues to access the cache 102 to determine whether the new basic block is cached. For example, the block validator 802 periodically parses the basic blocks 1 through n−1 stored in the cache 102 to determine whether the basic block n is stored in the cache 102.

Upon determining that the basic block n is cached, the block validator 802 creates, in an operation 854 of the method 800, a first hash value from the one or more of the emulated PU code instructions 1 through M from which the basic block n is compiled. For example, the block validator 802 sends a request to the parser 602 to obtain the one or more of the emulated CPU code instructions 1 through M from the memory device 412. The request includes identities of memory addresses of the basic block n in the cache 102. The identities of the memory addresses of the basic block n are received, such as obtained by request, from the block creator 604 by the block validator 602. The parser 602, upon receiving the request from the block validator 802, reads the one or more of the emulated PU code instructions 1 through M from the memory device 412 and provides the one or more of the emulated PU code instructions 1 through M to the block validator 802. To illustrate, when the one or more of the emulated PU code instructions 1 through M are provided to the basic block compiler 104 for compiling the basic block n, the parser 602 stores a one-to-one correspondence between one or more identities of one or more memory addresses occupied by the basic block n in the cache 102 and one or more identities of one or more memory addresses occupied by the one or more of the emulated PU code instructions 1 through M in the memory device 412. The parser 602 receives the identities of the memory addresses of the basic block n in the cache 102 from the block validator 802 and identifies the one or more memory addresses of the one or more of the emulated PU code instructions 1 through M in the memory device 412 from the one-to-one correspondence. The parser 602 reads the one or more of the emulated PU code instructions 1 through M from the one or more memory addresses of the memory device 412 and provides the one or more of the emulated PU code instructions 1 through M to the block validator 802.

Continuing with the example, upon receiving the one or more of the emulated PU code instructions 1 through M from the parser 602, the block validator 802 generates the first hash value from the one or more of the emulated PU code instructions 1 through M and stores the first hash value in the cache 102. To illustrate, the block validator 802 generates a digest or a checksum from the one or more of the emulated PU code instructions 1 through M corresponding to the basic block n. In the example, the first hash value is stored in one or more registers, of the cache 102, that are keyed to include the basic block n.

In an operation 856 of the method 800, the block validator 802 sends a command to the parser 602 to determine whether the one or more memory addresses, within the memory device 412, at which the one or more of the emulated PU code instructions 1 through M are stored, are overwritten. The one or more memory addresses, within the memory device 412, can be overwritten with data from a compact disc-read only memory (CD-ROM) of the legacy machine. The data can be an update to the one or more of the emulated PU code instructions 1 through M. The update to the one or more of the emulated PU code instructions 1 through M is referred to as updated instructions. Alternatively, the data can be corrupted data, which is not the updated instructions. The parser 602, upon receiving the command from the block validator 802 sends a request to the processor of the legacy machine to determine whether the one or more memory addresses, within the memory device 412, at which the one or more of the emulated PU code instructions 1 through M are stored are overwritten.

Upon receiving the request from the parser 602, the processor of the legacy machine provides a response to the request and the response indicates whether the one or more memory addresses, within the memory device 412, at which the one or more of the emulated PU code instructions 1 through M are stored are overwritten. Upon receiving the response that the one or more memory addresses, within the memory device 412, at which the one or more of the emulated PU code instructions 1 through M are stored are not overwritten, the block validator 802 sends a command to the block flagger 804 (FIG. 8A) to not mark the basic block n as invalid. Upon receiving the command, in an operation 858 of the method 800, the block flagger 804 does not mark the basic block n as invalid.

On the other hand, upon receiving the response that the one or more memory addresses, within the memory device 412, at which the one or more of the emulated PU code instructions 1 through M are stored are overwritten, in an operation 860 of the method 850, the block validator 802 sends a command to the block flagger 804 (FIG. 8A) to mark the basic block n as invalid. Upon receiving the command to mark the basic block n as invalid, the block flagger 804 marks the basic block n as invalid. For example, the block flagger 804 accesses the basic block n within the cache 102 and includes an identifier, such as the invalid mark n (FIG. 5A), within the memory addresses in the cache 102 having the basic block n to indicate that the basic block n is invalid. An example of the invalid mark n is a sequence of bits.

In one embodiment, a hash value is an example of a validation result.

Figure 8C:
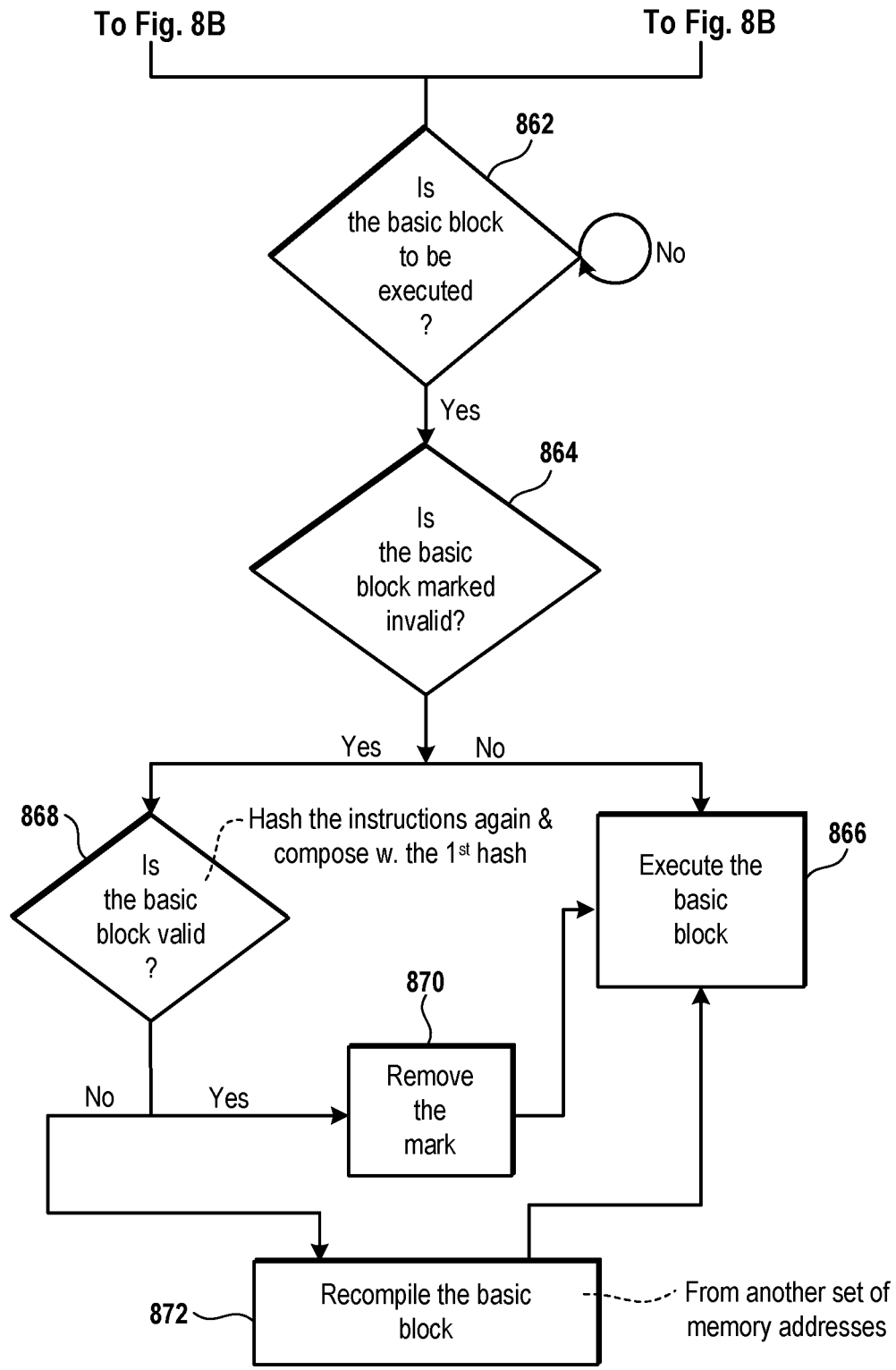
FIG. 8C is a continuation of the flowchart of the method of FIG. 8B.

FIG. 8C is a continuation of the flowchart of the method 800 of FIG. 8B. In an operation 862 of the method 800, the block validator 802 (FIG. 8A) determines whether the basic block n is to be executed. For example, the block dispatcher 302 sends an indication to the block validator 802 that the basic block n is to be executed. Upon receiving the indication from the block dispatcher 302 that the basic block n is to be executed, the block validator 802 determines that the basic block n is to be executed. Until the indication is received, the block validator 802 does not determine that the basic block n is to be validated.

Upon determining that the basic block n is to be executed, the block validator 802, in an operation 864 of the method 800, determines whether the basic block n is marked as invalid. For example, the block validator 802 sends a command to the block flagger 804 to determine whether the basic block n is flagged as invalid. Upon receiving the command, the block flagger 804 sends an indication to the block validator 802 whether the basic block n is flagged as invalid. To illustrate, the block flagger 804 accesses the basic block n to determine whether the basic block n includes the invalid mark n to generate and send the indication of invalidity to the block validator 802. As another illustration, the block flagger 804 accesses the basic block n to determine whether the basic block n does not include the invalid mark n to generate and send the indication of lack of invalidity to the block validator 802. Upon receiving the indication from the block flagger 804 that the basic block n is marked as invalid, the block validator 802 determines that the basic block n is invalid. On the other hand, upon receiving the indication from the block flagger 804 that the basic block n lacks the invalid mark n, the block validator 802 determines that the basic block n is not marked as invalid.

Upon determining that the basic block n is not marked as invalid, in an operation 866 of the method 800, the basic block n is executed. For example, the operation 866 is similar to the operation 662 (FIG. 6B). To illustrate, the block validator 802 sends a command to the block dispatcher 302 to execute the basic block n. Upon receiving the command to execute the basic block n, the block dispatcher 302 runs the basic block n. In this illustration, until the command is received from the block validator 802 for execution of the basic block n, the block dispatcher 302 does not execute the basic block n.

On the other hand, in response to determining that the basic block n is marked as invalid, in an operation 866 of the method 800, the block validator 802 determines whether the basic block n is actually valid. For example, upon determining that the basic block n is marked as invalid, the block validator 802 creates a second hash value from either the updated instructions or the corrupted data stored in the same memory addresses, within the memory device 412, at which the one or more of the emulated PU code instructions 1 through M from which the basic block n is compiled are stored. In the example, the second hash value is stored in one or more registers, of the cache 102, that are keyed to include the basic block n. To illustrate, the block validator 802 sends a request to the parser 602 to obtain the updated instructions or the corrupted data stored at the one or more memory addresses within the memory device 412. The parser 602, upon receiving the request, reads the updated instructions or the corrupted data from the one or more memory addresses from the memory device 412, and provides the updated instructions or the corrupted data to the block validator 802. In the illustration, the block validator 802 generates the second hash value from the updated instructions or the corrupted data and stores the second hash value in the cache 102. For example, the block validator 802 generates a digest or a checksum from the updated instructions or the corrupted data. In the illustration, the block validator 802 compares the second hash value with the first hash value to determine whether the basic block n is valid. Upon determining, based on the comparison, that there is a match between the first hash value and the second hash value, the block validator 802 determines that the basic block n is valid. The match occurs when the second hash value is generated from the updated instructions. On the other hand, upon determining, based on the comparison, that there is a lack of match between the first hash value and the second hash value, the block validator 802 determines that the basic block n is invalid. The lack of match occurs when the second hash value is generated from the corrupted data.

In response to determining that the basic block n is valid, in an operation 870 of the method 800, the invalid mark n is removed. For example, the block validator 802 sends a command to the block flagger 804 to remove the invalid mark n from the basic block n stored in the cache 102. Upon receiving the command from the block validator 802, the block flagger 804 accesses the basic block n from the cache 102 and erases the invalid mark n from the basic block n. To illustrate, the block flagger 804 erases the invalid mark n from one or more memory addresses of the cache 102 in which the invalid mark n is stored. Upon removing the invalid mark n, the block flagger 804 sends a command to the block dispatcher 302 to execute the basic block n, and upon receiving the command, in the operation 866, the block dispatcher 302 runs the basic block n. As an example, the block dispatcher 302 does not execute the basic block n until the command to execute the basic block n is received from the block flagger 804.

On the other hand, upon determining that the basic block n is not valid, in an operation 872 of the method 800, an additional basic block, having the same functionality or operation as the basic block n, is compiled. For example, the block validator 802 sends a command to the block dispatcher 302 to not execute the basic block n and sends an indication to the block creator 604 that the basic block n is invalid. Upon receiving the indication, the block creator 604 recompiles the basic block n. To illustrate, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within a memory device of an additional legacy machine. The additional legacy machine is different from the legacy machine that includes the memory device 412. Also, the additional set of emulated PU code instructions are of the same game title GN as that of the game code gcN. As another illustration, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within different memory addresses of the memory device 412 than memory addresses, of the memory device 412, at which the emulate PU code instructions 1 through M are stored. As yet another illustration, the block creator 604 compiles the additional basic block in the same manner as that of compiling the basic block n from one of the more of the emulated PU code instructions 1 through M stored in the memory device 412 except that the additional basic block is compiled from an additional set of emulated PU code instructions, such as one or more of the emulated PU code instructions 1 through M, stored within a different memory device than the memory device 412.

The additional basic block is sent from the block creator 604 to the block dispatcher 302 for execution. For example, the block dispatcher 302 executes the additional basic block to generate a portion of an additional virtual environment, such as the virtual environment 452 (FIG. 4B). To illustrate, the block dispatcher 302 executes the additional basic block to generate a portion of an image frame, which includes additional virtual environment data, such as a position and an orientation of the virtual object 454, the parameter of the virtual object 454, positions and orientations of other virtual objects in the virtual environment 452, and the parameter of the other virtual objects in the additional virtual environment. The block dispatcher 302 provides the image frame to the GPU of the emulation processor system 409 to display, such as render, the additional virtual environment on the display screen of the display device 410.

It should be noted that although the method 850 is illustrated with reference to the basic block n and the additional basic block, the method 850 is equally applicable to other basic blocks 1 through (n−1) and more additional basic blocks, which are generated in the same manner in which the additional basic block is generated.

In one embodiment, the set of emulated PU code instructions 1 through M are stored in a first set of one or more memory devices, located outside the legacy machine, and the additional set of emulated PU code instructions is stored in a second set of one or more memory devices, located outside the additional legacy machine.

FIG. 9A is a diagram to illustrate an embodiment of a legacy machine 900. An example of the legacy machine 900 is the PS1™ or the PS2™. The legacy machine 900 includes a legacy CPU 902, a legacy GPU 904, a memory device 906, and a CD-ROM drive 908. The memory device 906 is an example of the memory device 412 (FIG. 4A). An example of the legacy CPU 902 is a 32-bit CPU that can process at most 32 bits during one clock cycle. Also, example of the legacy GPU 904 is a 32-bit GPU that can process at most 32 bits during one clock cycle. An example of the memory device 906 is a 2 megabyte (MB) RAM.

The legacy CPU 902 and the legacy GPU 904 are coupled to the memory device 906, which is coupled to the CD-ROM drive 908. The emulated PU code 106 is stored within the memory device 906.

The legacy CPU 902 or the legacy GPU 904 access the emulated PU code 106 from the memory device 906 and processes the emulated PU code 106. The CD-ROM drive 908 receives a CD-ROM, which includes the updated instructions or the corrupted code. The updated instructions or the corrupted code can be transferred from the CD-ROM to the memory device 906 by the legacy CPU 902.

In one embodiment, the legacy machine 900 excludes a cache. In an embodiment, the legacy machine 900 includes a cache of limited capacity, such as a 4 kilobyte (KB) cache.

FIG. 9B is a diagram to illustrate an embodiment of an updated machine 920. An example of the updated machine 920 is the PS4™ or the PS5™. The updated machine 920 includes a CPU 922, a GPU 924, a memory system 926, and a cache 928, which is an example of the cache 102 (FIG. 1). The game console 402 (FIG. 4B) is an example of the updated machine 920. As an example, the CPU 922 includes two quad-core modules and each module can process 64 bits during each clock cycle. Each core has a 32 kilobyte (KB) cache. Another example of the CPU 922 is a 64-bit CPU that can process at most 64 bits during one clock cycle. As an example, the GPU 924 has 1152 cores and each core can process 64-bits during one clock cycle. As another example, the legacy GPU 924 is a 64-bit GPU that can process at most 64 bits during one clock cycle.

The CPU 922 and the GPU 924 are coupled to the memory system 906. As an example, the emulated PU code 106 is stored within the legacy memory system 906. An example of the memory system 926 includes is a hard drive that provides a storage of 500 gigabytes (GB), or 2 terabytes (TB). The CPU 922, the GPU 924, the cache 928, and the memory system 926 are coupled to each other via a bus 930.

The CPU 922 or the GPU 924 accesses the cache 928 first before accessing the memory system 926. Upon determining that the cache 928 does not data that is requested by the CPU 922 or the GPU 924, the CPU 922 or the GPU 924 accesses the memory system 926.

It should be noted that in one embodiment, the game code gcN cannot be executed by the CPU 922 or the GPU 924 but can be executed by the legacy CPU 902 or the legacy GPU 904. To illustrate, the CPU 922 or the GPU 924 is incapable of executing the game code gcN and the legacy CPU 902 or the legacy GPU 904 is capable of executing the game code gcN. Also, the basic blocks 1 through n can be executed by the CPU 922 or the GPU 924 but cannot be executed by the legacy CPU 902 or the legacy GPU 904. To illustrate, the CPU 922 or the GPU 924 is capable of executing the basic blocks 1 through n and the legacy CPU 902 or the legacy GPU 904 is incapable of executing the basic blocks 1 through n.

In one embodiment, the cache 928 is located within the CPU 922.

In an embodiment, the cache 928 is located within the GPU 924.

In one embodiment, the cache 928 is located within the CPU 922 and another cache, such as the cache 102, is located within the GPU 924.

Figure 10A:
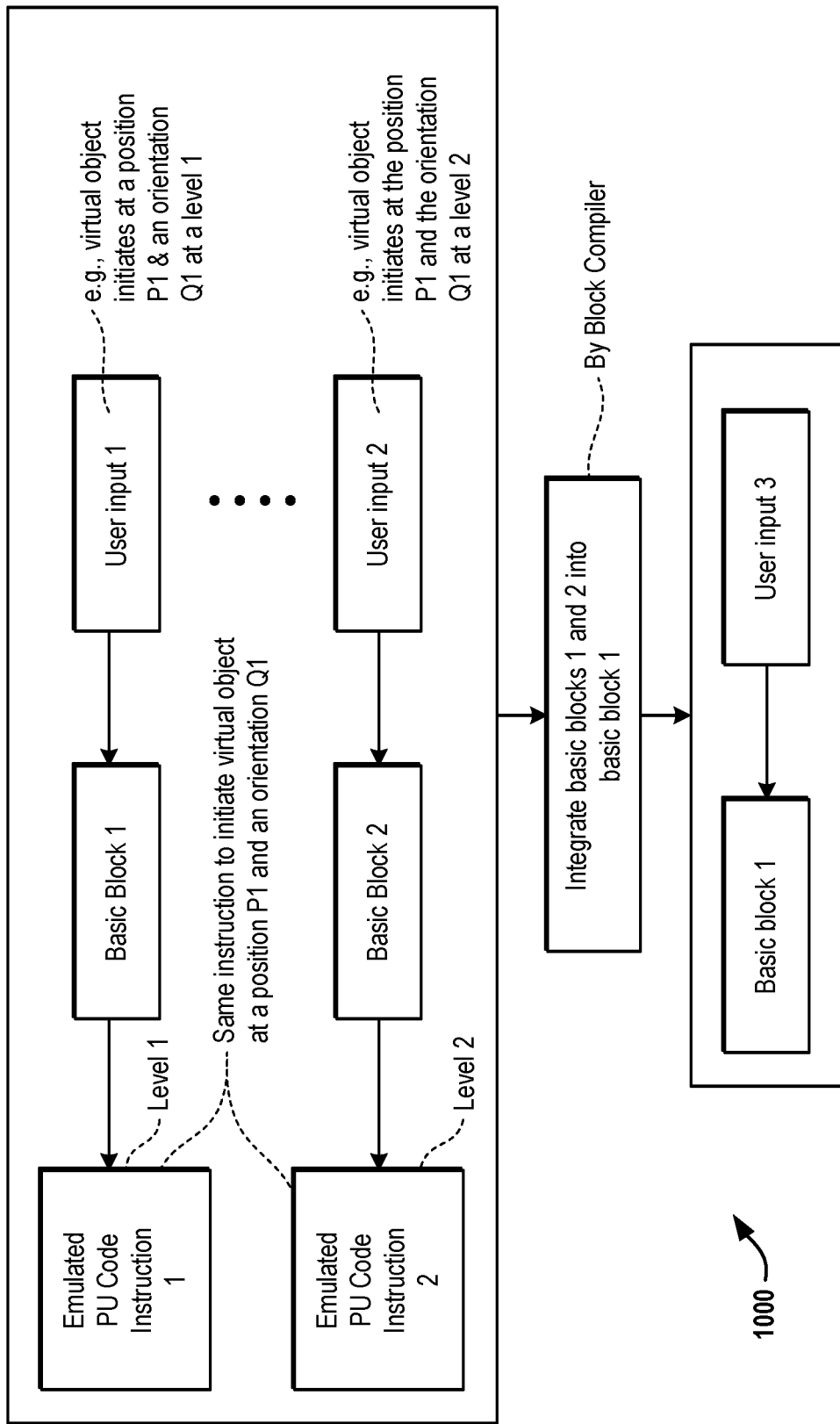
FIG. 10A is a diagram of an embodiment of a system to illustrate combining of multiple basic blocks into one basic block by a basic block compiler.

FIG. 10A is a diagram of an embodiment of a system 1000 to illustrate combining of multiple basic blocks into one basic block by the basic block compiler 104 (FIG. 1). The block creator 604 (FIG. 6A) receives the user input 1, such as a signal indicating that the virtual object 454 (FIG. 4B) be initiated at the position P1 and the orientation O1 at a level 1 of the legacy game N having the game title GN. Upon receiving the user input 1, the basic block 1 is generated by the basic block compiler 104 based on the emulated PU code instruction 1 to service the user input 1. Similarly, the block creator 604 receives the user input 2, such as a signal indicating that the virtual object 454 be initiated at the position P1 and the orientation O1 at a level 2 of the legacy game N. Upon receiving the user input 2, the basic block 2 is generated by the basic block compiler 104 based on the emulated PU code instruction 2 to service the user input 2.

When a user input 3, such as a signal indicating that the virtual object 454 be initiated at the position P1 and the orientation O1 at a level 3 of the legacy game N, is received, the block compiler 104 identifies the basic blocks 1 and 2 as servicing the user input 3. Upon identifying so, the block creator 604 integrates, such as combines, the basic blocks 1 and 2 into a single basic block, such as the basic block 1 or the basic block 2. The integration saves memory space in the cache 102 and also increases efficiency in accessing the single basic block instead of accessing the basic block 1 and the basic block 2.

The block creator 604 further generates a value in a pointer of the cache 102. An example of a pointer, as used herein, is a register. The pointer indicates to the block dispatcher 302 to execute the single basic block when a user input for servicing the basic block 1 or the basic block 2 is received. At a time the block dispatcher 302 is to execute the basic block 1 or 2, the block dispatcher 302 accesses the pointer and executes the single basic block instead of the basic block 1 or 2.

Figure 10B:
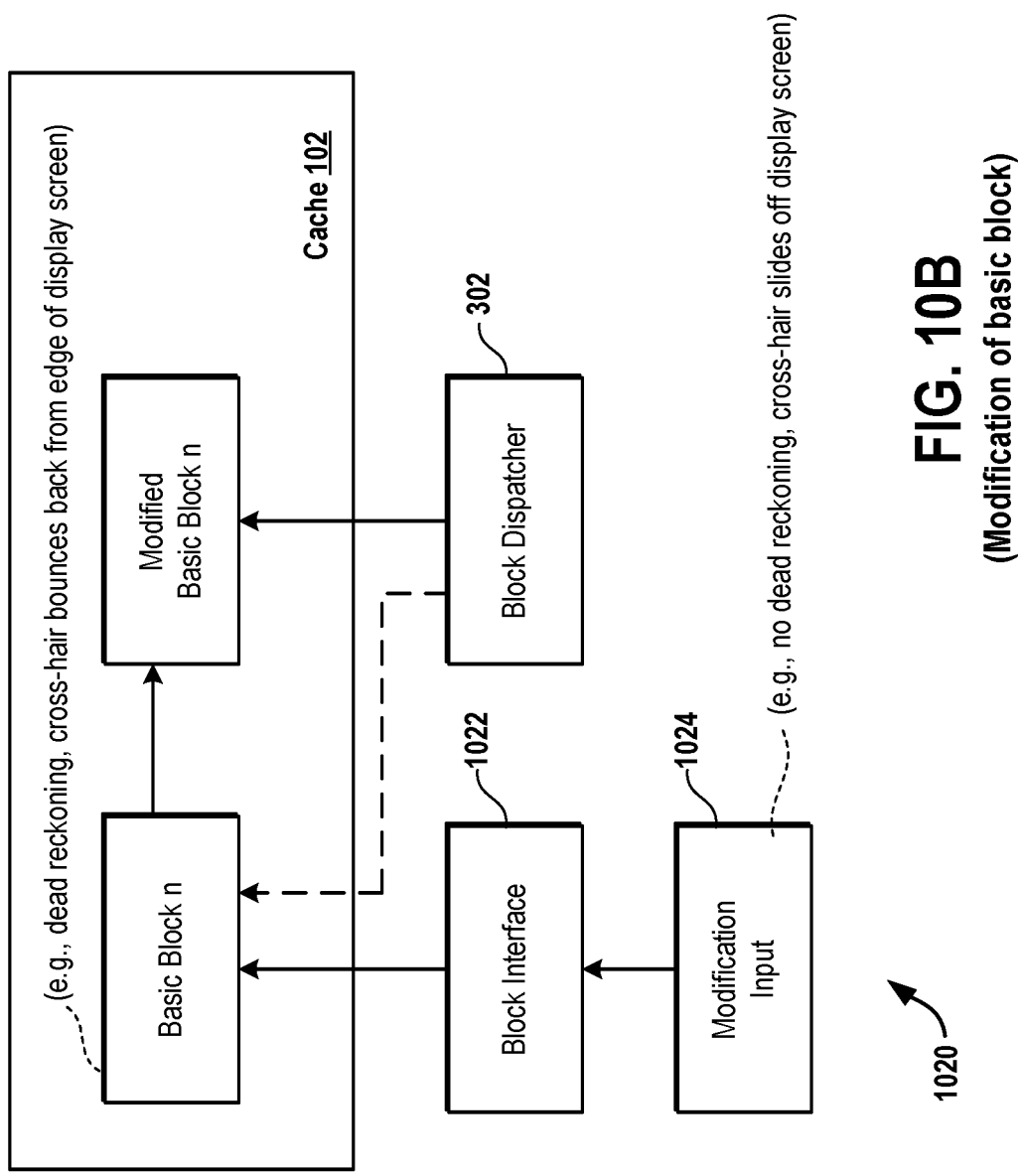
FIG. 10B is a diagram of an embodiment of a system to illustrate modification of one or more of the basic blocks.

FIG. 10B is a diagram of an embodiment of a system 1020 to illustrate modification of one or more of the basic blocks 1 through n. The system 1020 includes a block interface 1022, the cache 102, and the block dispatcher 302. As an example, the basic block n includes the operation n of dead reckoning. As another example, the basic block n includes the operation n of bouncing back a crosshair from an edge of the display screen of the display device 410 (FIG. 4B). An example of the block interface 1022 is an ASIC, or a PLD, or a microprocessor, or a microcontroller, or a computer program, or a portion of a computer program. The block interface 1022 is coupled to the cache 102.

The block interface 1022 provides access to the user to one or more of the basic blocks 1 through n stored in the cache 102. For example, the user selects one or more buttons on an input device, such as a keyboard or a mouse or a keypad, to generate a modification input 1024. As an example, the modification input 1024 includes one or more user instructions in the form of source code to modify the basic block n. To illustrate, the modification input 1024 includes a user instruction to remove the operation n of dead reckoning from the basic block n. As another example, the modification input 1024 includes an instruction to change the operation n to include that the cross hair slides off the edge of the display screen of the display device 410 and is displayed at an opposite edge of the display screen of the display device 410. The opposite edge is diagonally opposite to the edge at which the cross hair slides off.

The input device is coupled to the block interface 1022. The modification input 1024 is sent from the input device to the block interface 1022 to modify the basic block n to output a modified basic block n. As an example, the modified basic block n does not include the operation of dead reckoning. As another example, the modified basic block n includes the operation n of sliding off the crosshair from the edge to the opposite edge. As yet another example, the modified basic block n includes an operation of calculating a number of clock cycles of execution of the operation n and storing the number in the basic block n. To illustrate, the number of cycles is stored in memory addresses of the cache 102 in which the basic block 1 is stored. The operation of calculating the number of clock cycles is executed by the block dispatcher 302 (FIG. 3) in addition to executing the operation n. The block dispatcher 302 calculates the number of clock cycles upon execution of the operation n and stores the number in the basic block n.

The block creator 604 further generates a value in a pointer within the cache 102, and the pointer indicates to the block dispatcher 302 to execute the modified basic block n when a user input for servicing the basic block n is received. At a time the block dispatcher 302 is to execute the basic block n, the block dispatcher 302 accesses the pointer and executes the modified basic block n instead of the basic block n.

Figure 10C:
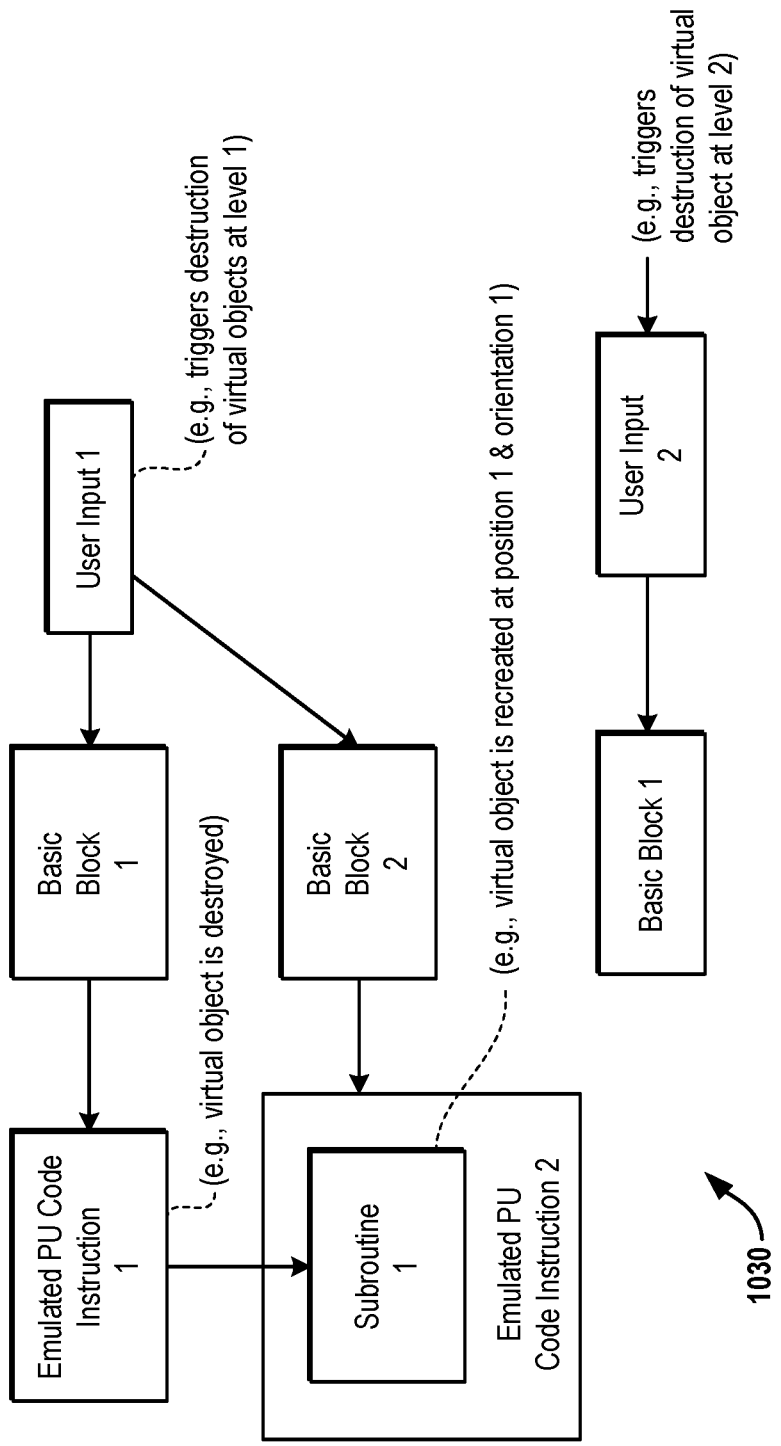
FIG. 10C is a diagram of an embodiment of the system to illustrate combining of a basic block created based on a subroutine with a basic block generated based on an emulated PU code instruction, which calls the subroutine.

FIG. 10C is a diagram of an embodiment of a system 1030 to illustrate combining of a basic block created based on a subroutine with a basic block generated based on an emulated PU code instruction, which calls the subroutine. The block creator 604 (FIG. 6A) receives the user input 1, such as a signal indicating a change in a position and/or an orientation of the virtual object 454 (FIG. 4B) that results in a destruction of the virtual object 454. Upon receiving the user input 1, the basic block 1 is generated by the basic block compiler 104 based on the emulated PU code instruction 1 to service the user input 1. The emulated PU code instruction 1 includes a function call to a subroutine 1. As such, upon receiving the user input 1, the basic block 2 is generated by the basic block compiler 104 based on the subroutine 1, which is an example of the emulated PU code instruction 2. As an example, the basic block 2 includes the operation 2 of regenerating the virtual object 454 at the position P1 and the orientation O1.

When a user input 2, such as a signal indicating a change in a position and/or an orientation of the virtual object 454 (FIG. 4B) that results in a destruction of the virtual object 454, is received, the block compiler 104 identifies the basic blocks 1 and 2 as servicing the user input 2. Upon identifying so, the block creator 604 integrates, such as combines, the basic blocks 1 and 2 into a single basic block, such as the basic block 1 or the basic block 2. For example, upon receiving the user input 2, the destruction of the virtual object 454 and the regeneration of the virtual object 454 are triggered. When the basic blocks 1 and 2 are combined, the subroutine 1 is skipped.

The block creator 604 further generates a value and stores the value in a pointer within the cache 102. The value indicates to the block dispatcher 302 to execute the single basic block when a user input for servicing the basic blocks 1 and 2 is received. At a time the block dispatcher 302 is to execute the basic blocks 1 and 2, the block dispatcher 302 accesses the pointer and executes the single basic block instead of the basic block 1.

FIG. 10D is a diagram of an embodiment of a system 1040 to illustrate an insertion of a basic block between two basic blocks. The system 1040 includes the block interface 1022 and the cache 102. After the basic blocks 1 and 2 are stored in the cache 102, a modification input 1042 is received from the user via the input device. As an example, the modification input 1042 is a signal including a source code that defines a basic block 1.1, which includes a source register address 1.1 within the cache 102, a destination register address 1.1 within the cache 102, and an operation 1.1 to be performed on data stored within the source register address 1.1, or on the destination register address 1.1, or both the source and destination register addresses 1.1. Examples of the operation 1.1 include jump, store, load, branch, and an arithmetic operation.

The modification input 1042 further includes an indication of a location of the basic block 1.1 and an association of the basic block 1.1 with the basic block 1 or 2. For example, the modification input 1042 includes a signal indicating that the basic block 1.1 is to be inserted between the basic blocks 1 and 2 in the cache 102 and a signal indicating that the basic block 1.1 is to be linked to the basic blocks 1 and/or 2. To illustrate, the basic block 1.1 is inserted to include a location, such as one or more register addresses, in the cache 102, for receiving an invalid mark 2 of the basic block 2. As another illustration, the basic block 1.1 is inserted to include a location, such as one or more register addresses in the cache 102, for receiving a number of cycles of execution of the basic block 2. In the illustration, the block interface 1022 receives the modification input 1042, identifies, from the modification input 1042 that the basic block 1.1 is to be inserted between the basic blocks 1 and 2, and inserts the basic block 1.1 between the basic blocks 1 and 2. As another illustration, the block interface 1022 determines that the basic block 1.1 includes an operation for unlocking a level in the legacy game N having the game title GN. The level is between a first level identified in an operation of the basic block 1 and a second level identified in an operation of the basic block 2. The first and second levels are in the legacy game N having the game title GN. The level inserted between the first and second levels is not a part of the game code gcN but is a new level of the legacy game N. An example of the level inserted between the first and second levels is a level in which the virtual object 454 shoots a laser gun instead of missiles.

In addition, the block interface 1022 identifies from the modification input 1042 a value of a pointer and stores the value the cache 102. As an example, the value of the pointer indicates that execution of the basic block 1.1 occur immediately before execution of the basic block 2. When the block dispatcher 302 is to execute the basic block 2, the block dispatcher 302 identifies the value within the pointer to point the basic block 1.1, and executes the basic block 1.1 immediately before executing the basic block 2. As another example, the value of the pointer indicates that execution of the basic block 1.1 occur immediately after execution of the basic block 2. After the block dispatcher 302 executes the basic block 2, the block dispatcher 302 identifies the value within the pointer to point the basic block 1.1, and executes the basic block 1.1 immediately after executing the basic block 2.

Figure 10E:
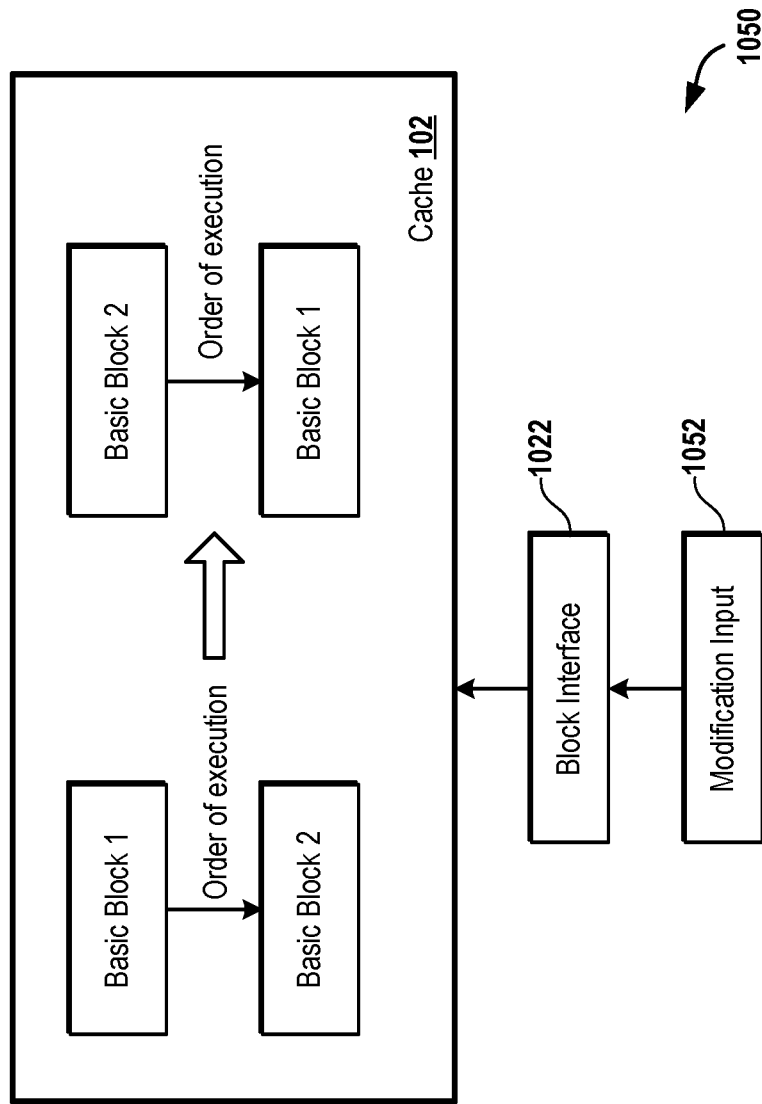
FIG. 10E is a diagram of an embodiment of a system to illustrate a switch in an order of execution of basic blocks.

FIG. 10E is a diagram of an embodiment of a system 1050 to illustrate a switch in order of execution of basic blocks. The system 1050 includes the cache 102 and the block interface 1022. The cache 102 includes a value within a pointer of the cache 102 and the value indicates that the basic block 2 be executed after executing the basic block 1. The user uses the input device to provide a modification input 1052, which includes a signal indicating that an order of execution of the basic blocks 1 and 2 be switched. Upon receiving the signal, the block interface 1022 changes a value of the pointer in the cache 102 to indicate that the basic block 1 be executed after executing the basic block 2.

Figure 11A:
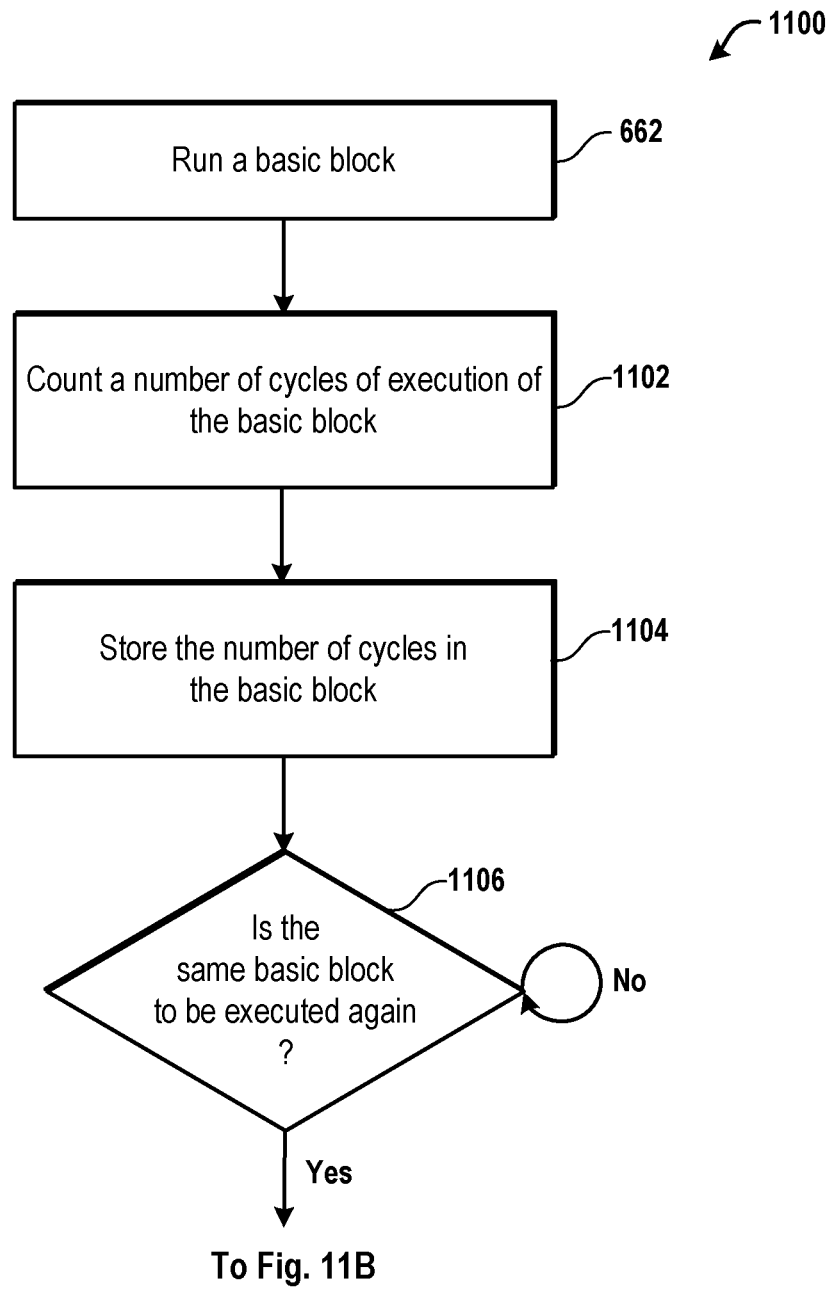
FIG. 11A is a flowchart of an embodiment of a method to illustrate use of a count of a number of cycles stored in the basic block n.

FIG. 11A is a flowchart of an embodiment of a method 1100 to illustrate use of the real count of the number of cycles stored in the basic block n. The method 1100 includes the operation 662 of executing the basic block n. In an operation 1102 of the method 1100, the block dispatcher 302 (FIG. 3) counts the number of cycles of execution, in the operation 662, of the basic block n to generate a first count. The block dispatcher 302, in an operation 1104 of the method 1100, stores the first count in the basic block n. For example, the block dispatcher 302 writes the real count to a register having one of register addresses, within the cache 102, that are assigned to the basic block n.

In an operation 1106 of the method 1100, the block creator 604 (FIG. 6A) determines whether the same basic block n is to be executed again. For example, the block creator 604 determines whether a user input for servicing the same basic block n is received from the client device. The block creator 604 continues to determine whether the user input for servicing the same basic block n is received until the user input is received.

Figure 11B:
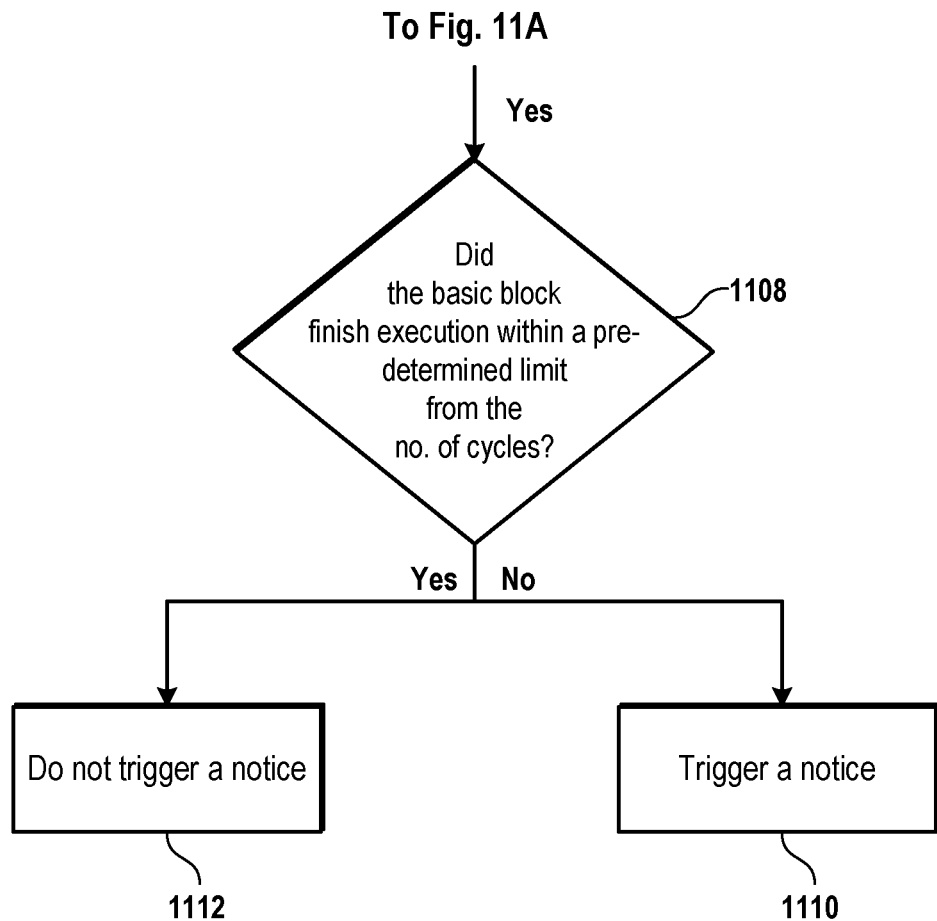
FIG. 11B is a continuation of the flowchart of the method of FIG. 11A.

FIG. 11B is a continuation of the flowchart of the method 1100 of FIG. 11A. Upon determining that the user input for servicing the basic block n is received again, the basic block n is executed again by the block dispatcher 304. In an operation 1108 of the method 1100, the block dispatcher 304 counts a number of cycles of execution, in the operation 1106, of the basic block n, to calculate a second count.

The block dispatcher 304 determines whether the second count is within a pre-determined limit from the first count in an operation 1108 of the method 1100. The pre-determined limit is stored in the cache 102. In response to determining that the second count is not within the pre-determined limit from the first count, in an operation 1110 of the method 1100, the block dispatcher 304 generates a notice. For example, when the block dispatcher 304 is located within the game console 402 (FIG. 4A), the GPU 924 (FIG. 9B) of the game console 402 displays a representation of the notice on the display device 410 (FIG. 4A) of the client device and sends the notice and via the computer network 408 to the server system 404 to notify the server system 404. As another example, when the block dispatcher 304 is located within the server system 404 (FIG. 4B), the block dispatcher 304 generates the notice and a GPU of the server system 404 displays the representation of the notice on a display device that is coupled to the server system 404. On the other hand, determining that the second count is within the pre-determined limit from the first count, in an operation 1112 of the method 1100, the block dispatcher 304 does not trigger the notice.

Figure 12:
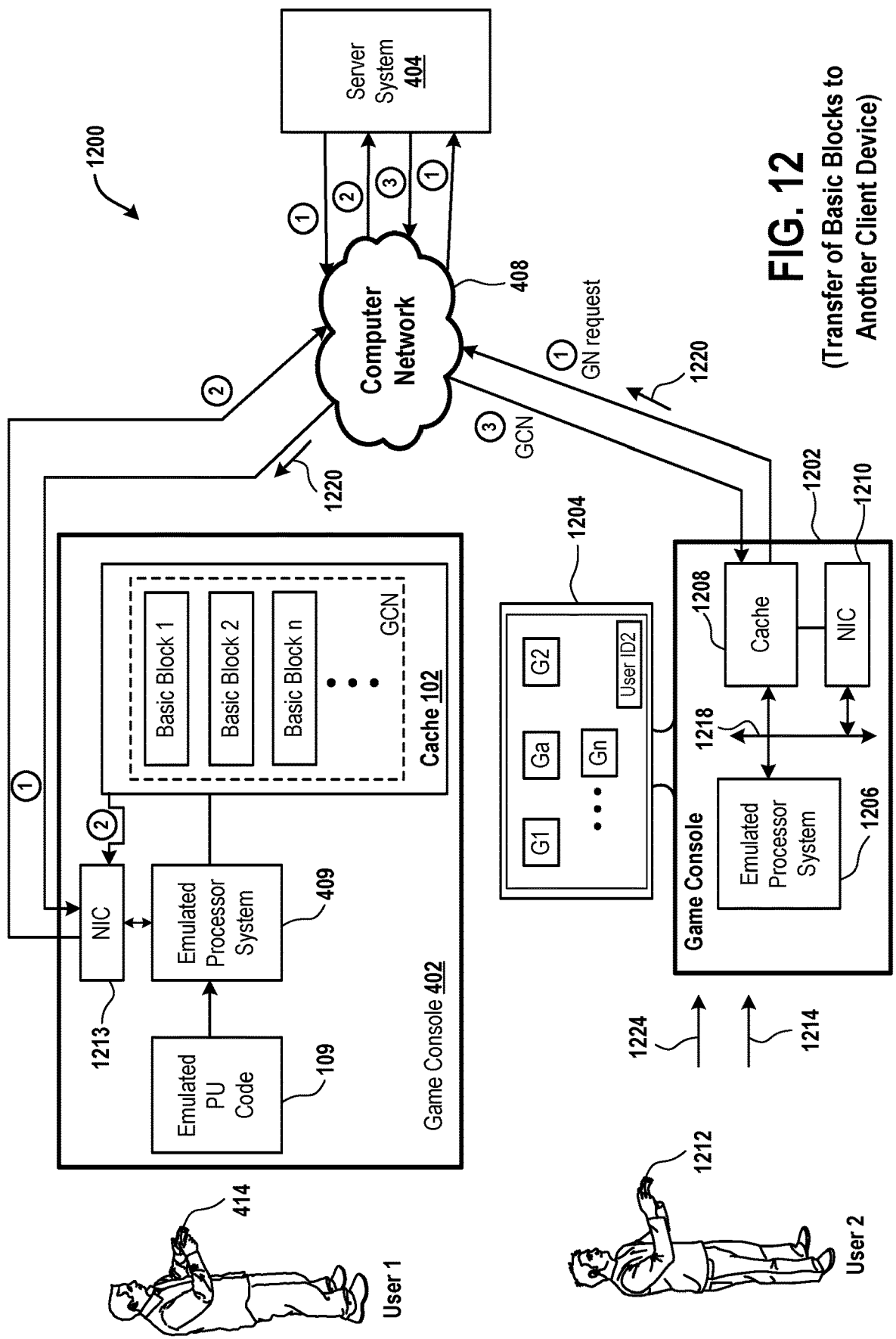
FIG. 12 is a diagram of an embodiment of a system to illustrate a transfer of the basic blocks from a first client device to a second client device.

FIG. 12 is a diagram of an embodiment of a system 1200 to illustrate a transfer of the basic blocks 1 through n from a first client device to a second client device. The system 1200 includes the game console 402, the computer network 408, the server system 404, a game console 1202, and a display device 1204. The game console 1202 is similar to the game console 402. For example, both the game consoles 402 and 1202 are PS4s™, or both the game consoles 402 and 1202 are PS5s™, or the game console 402 is a PS4™ and the game console 1202 is a PS5™, or the game console 402 is a PS5™ and the game console 1202 is a PS4™. As another example, the game console 1202 is not a legacy machine. Also, the display device 1204 is similar to the display device 410 of FIG. 4A. For example, the display device 410 is an HMD or a television or a smart television or a computer monitor.

The game console 402 includes a network interface controller 1213. The game console 1202 includes an emulated processor system 1206, a cache 1208, and a network interface controller 1210. The emulated processor system 1206 has the same structure and same functionality as that of the emulated processor system 409. Also, the cache 1208 has the same structure and the same functionality as that of the cache 102. The emulated processor system 1206, the cache 1208, and the network interface controller 1210 are coupled to each other via a bus 1218.

Once the basic blocks 1 through n are stored in the cache 102, the basic block compiler 104 of the emulated processor system 409 sends the basic blocks 1 through n to the network interface controller 1213. The network interface controller 1213 applies the network communication protocol to the basic blocks 1 through n to generate one or more packets embedding the basic blocks 1 through n and sends the one or more packets via the computer network 408 to the server system 404. Upon receiving the one or more packets, the network interface controller of the server system 404 applies the network communication protocol to the one or more packets to extract the basic blocks 1 through n for the legacy game N having the game title GN and stores the basic blocks 1 through n in one or more memory devices of the server system 404.

A user 2 uses a hand-held controller 1212 to select one or more buttons on the hand-held controller 1212 to log into his/her user account that is assigned to the user 2 by the server system 404. The user 2 logs into his/her user account when a user ID2, such as a username, and a password are authenticated by the server system 404. Once the user 2 logs into his/her user account, the user 2 can access multiple game titles, such as the game title G1, the game title Ga, the game title G2, and so on until the game title GN.

Upon logging into the user account 2, the user 2 uses the hand-held controller 1212 to select one or more buttons on the hand-held controller 1212 to generate a user input 1214. The user input 1214 is generated upon selection of the legacy game N having the title GN displayed on the display device 1204. When the user input 1214 is generated, the cache 1208 does not include the basic blocks 1 through n. For example, upon receiving the user input 1214, a basic block compiler of the emulated processor system 1206 checks the cache 102 to determine whether the cache 102 includes one or more of the basic blocks 1 through n of the game code GCN for servicing the user input 1214. Upon determining that the cache 102 does not include the one or more of the basic blocks 1 through n for servicing the user input 1214, the emulated processor system 1206 generates a request 1220 for the one or more of the basic blocks 1 through n and sends the request 1220 to the network interface controller 1210.

Upon receiving the request 1220, the network interface controller 1210 generates one or more packets embedding the request 1220 by applying the network communication protocol to the request 1220, and sends the one or more packets via the computer network 408 to the server system 404. The network interface controller of the server system 404 receives the one or more packets and applies the network communication protocol to extract the request 1220 from the one or more packets. A processor of the server system 404 analyzes the request 1220 to identify that the basic blocks 1 through n are requested.

In response to determining that the basic blocks 1 through n are requested, the server system 404 accesses the basic blocks 1 through n stored in the one or more memory devices of the server system 404 and provides the basic blocks 1 through n to the network interface controller of the server system 404. The network interface controller of the server system 404 applies the network communication protocol to generate one or more packets embedding the basic blocks 1 through n and sends the one or more packets via the computer network 408 to the game console 1202.

The network interface controller 1210 of the game console 1202 receives the one or more packets having the basic blocks 1 through n, applies the network communication protocol to extract the basic blocks 1 through n from the one or more packets, and sends the basic blocks 1 through n to the emulated processor system 1206. The basic block compiler of the emulated processor system 1206 stores the basic blocks 1 through n in the cache 1208.

When a user input 1224 is received from the hand-held controller 1212 during a play of the game having the game title GN, the basic block compiler of the emulated processor system 1206 identifies one or more of the basic blocks 1 through n within the cache 1208 for servicing the user input 1224. A block dispatcher of the emulated processor system 1206 executes the one or more of the basic blocks 1 through n for servicing the user input 1224. In this manner, once the basic blocks 1 through n are compiled by the emulated processor system 409, the basic blocks 1 through n do not need to be compiled by the emulated processor system 1206 but can be accessed by the emulated processor system 1206 from the server system 404.

Figure 13:
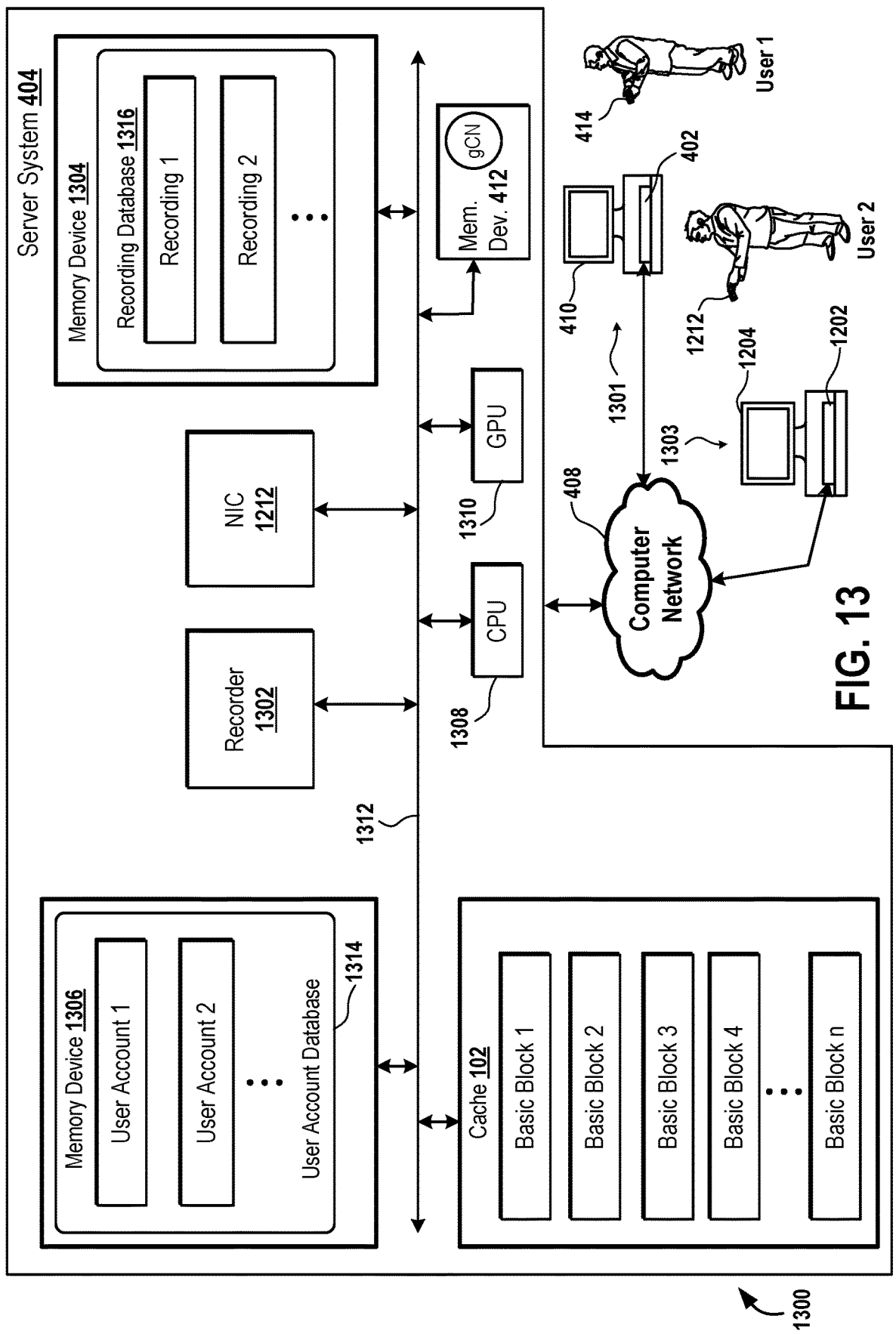
FIG. 13 is a diagram of an embodiment of a system to illustrate generation of a meta-game from one or more mini games, such as challenges, which are played upon execution of multiple sets of the basic blocks 1 through n.

FIG. 13 is a diagram of an embodiment of a system 1300 to illustrate generation of a meta-game from one or more mini games, such as challenges, which are played upon execution of multiple sets of the basic blocks 1 through n. The system 1300 includes the server system 404, the computer network 408, the game console 402, the display device 410, the game console 1202, and the display device 1204. The server system 404 is coupled to the game consoles 402 and 1202 via the computer network 408. It should be noted that a combination of the game console 402, the display device 410, and the hand-held controller 414 is referred to herein as a client device 1301. It should further be noted that a combination of the game console 1202, the display device 1204, and the hand-held controller 1212 is referred to herein as a client device 1303.

The server system 404 includes the cache 102, a recorder 1302, the network interface controller 1213, a memory device 1304, and a memory device 1306. The server system 404 further includes a CPU 1308, a GPU 1310, and the memory device 412. The CPU 1308, the GPU 1310, the memory device 412, the cache 102, the memory device 1306, the recorder 1302, the network interface controller 1213, and the memory device 1304 are coupled to each other via a bus 1312. As an example, the CPU 1308 and the GPU 1310 are components of the emulation processor system 409 (FIG. 4B). For example, the CPU 1308 executes the basic block compiler 104 and the block dispatcher 302 (FIG. 3). The CPU 922 (FIG. 9) is an example of the CPU 1308. The GPU 924 (FIG. 9) is an example of the GPU 1310.

An example of the recorder 1302 includes a CPU, a PLD, an ASIC, a controller, a portion of a computer program, or a computer program. To illustrate, the recorder 1302 is a computer program executed by the CPU 1308.

The memory device 1306 includes a user account database 1314, which stores multiple user accounts, such as a user account 1 and a user account 2. The user account 1 is assigned to the user 1 by the CPU 1308 and the user account 2 is assigned to the user 2 by the CPU 1308. Also, the memory device 1304 includes a recording database 1316, which includes multiple recordings, such as a recording 1 and a recording 2.

The recording 1 is a recording of a challenge 1 that is undertaken by the user 1 via the user account 1 during a play of the legacy game N and the recording 2 is recording of a challenge 2 that is undertaken by the user 1 via the user account 1 during a play of the legacy game N. For example, during a game level 1 of the legacy game N, the user 1 pauses the legacy game N and selects a button on the hand-held controller 114 to generate a user input. In the example, the user input is a signal generated by the hand-held controller 414 and sent via the game console 402 (FIG. 13) and the computer network 408 (FIG. 13) to the server system 404. Also, in the example, the server system 404 determines, based on the user input, that the user 1 wishes to pause the legacy game N, and pauses the legacy game N. To illustrate, the CPU 1308 and the GPU 1310 stop executing one or more of the basic blocks 1 through n to stop generating one or more image frames of the legacy game N for sending to the game console 402 via the computer network 408. In the illustration, the CPU 1308 generates a value identifying one of the basic blocks 1 through N at which the play of the legacy game N pauses and stores the value in a pointer in the cache 102.

Continuing with the example, the user 1 starts playing the challenge 1 after the legacy game N is paused. In the example, upon receiving a user input indicating that the user 1 wishes to play the challenge 1 via the user account 1, the CPU 1308 accesses the pointer from the cache 102 to identify which of the one or more basic blocks 1 through n to finish execution, and continues execution of the one of more basic blocks 1 through n. The user input indicating that the user 1 wishes to play the challenge 1 is generated as a signal when the user 1 selects one or more buttons on the hand-held controller 414 (FIG. 13). Further, in the example, at the time the user 1 starts playing the challenge 1, the recorder 1302 starts recording the play of the challenge 1 by the user 1 via the user account 1 to generate the recording 1 and stores the recording 1 in the recording database 1316. Similarly, in the example, during a game level Z of the legacy game N, the user 1 pauses the legacy game N and selects one or more buttons on the hand-held controller 114 to select the challenge 2, where Z is a positive integer. At a time the user 1 starts playing the challenge 2, the recorder 1302 starts recording the play of the challenge 2 to generate the recording 2 and stores the recording 2 in the recording database 1316.

As an example, each recording includes game states. To illustrate, the recording 1 includes game states of one or more virtual objects displayed during the challenge 1 of the legacy game N and the recording 2 includes game states of one or more virtual objects displayed during the challenge 2 of the legacy game N. Examples of a game state include positions and orientations of virtual objects. As another example, each recording also includes a rendering factor, such as color, or intensity, or texture, or shape, or a combination thereof, of a virtual object. To illustrate, the recording 1 includes rendering factors of virtual objects that are displayed during the challenge 1 upon execution of one or more of the basic blocks 1 through n. In the illustration, the recording 2 includes rendering factors of virtual objects that are displayed during the challenge 2 upon execution of one or more of the basic blocks 1 through n.

As another example, each recording includes a video of play of a challenge by the user 1 and a video of the user 1 playing the challenge. For example, the recording 1 includes a video of movements of virtual objects during a play of the challenge 1 and a video of the user 1 describing one or more of the movements during the challenge 1. Also, in the example, the recording 2 includes a video of movements of virtual objects during a play of the challenge 2 and a video of the user 1 describing one or more of the movements during the challenge 2.

As yet another example, each recording includes a video of play of a challenge by the user 1 without including a video of the user 1 playing the challenge. For example, the recording 1 includes a video of movements of virtual objects during a play of the challenge 1 and excludes a video of the user 1 describing one or more of the movements during the challenge 1. Also, in the example, the recording 2 includes a video of movements of virtual objects during a play of the challenge 2 and excludes a video of the user 1 describing one or more of the movements during the challenge 2.

In one embodiment, in addition to the CPU 1308, the server system 404 includes multiple CPUs, and each CPU is implemented with a separate server, such as a server blade or an updated machine, of the server system 404. Similarly, in addition to the GPU 1310, the server system 404 includes multiple GPUs, and each GPU is implemented with a separate server, such as a server blade or an updated machine, of the server system 404.

In an embodiment, the user account database 1314 and the recording database 1316 are stored within the same memory device.

In one embodiment, instead of the challenge 2 being a portion of the legacy game N, the challenge 2 is a portion of another legacy game, such as the legacy game (N−1), which is different from the legacy game N.

In an embodiment, the basic blocks 1 through n stored in the cache 102 are distributed among multiple caches of the server system 404.

Figure 14A:
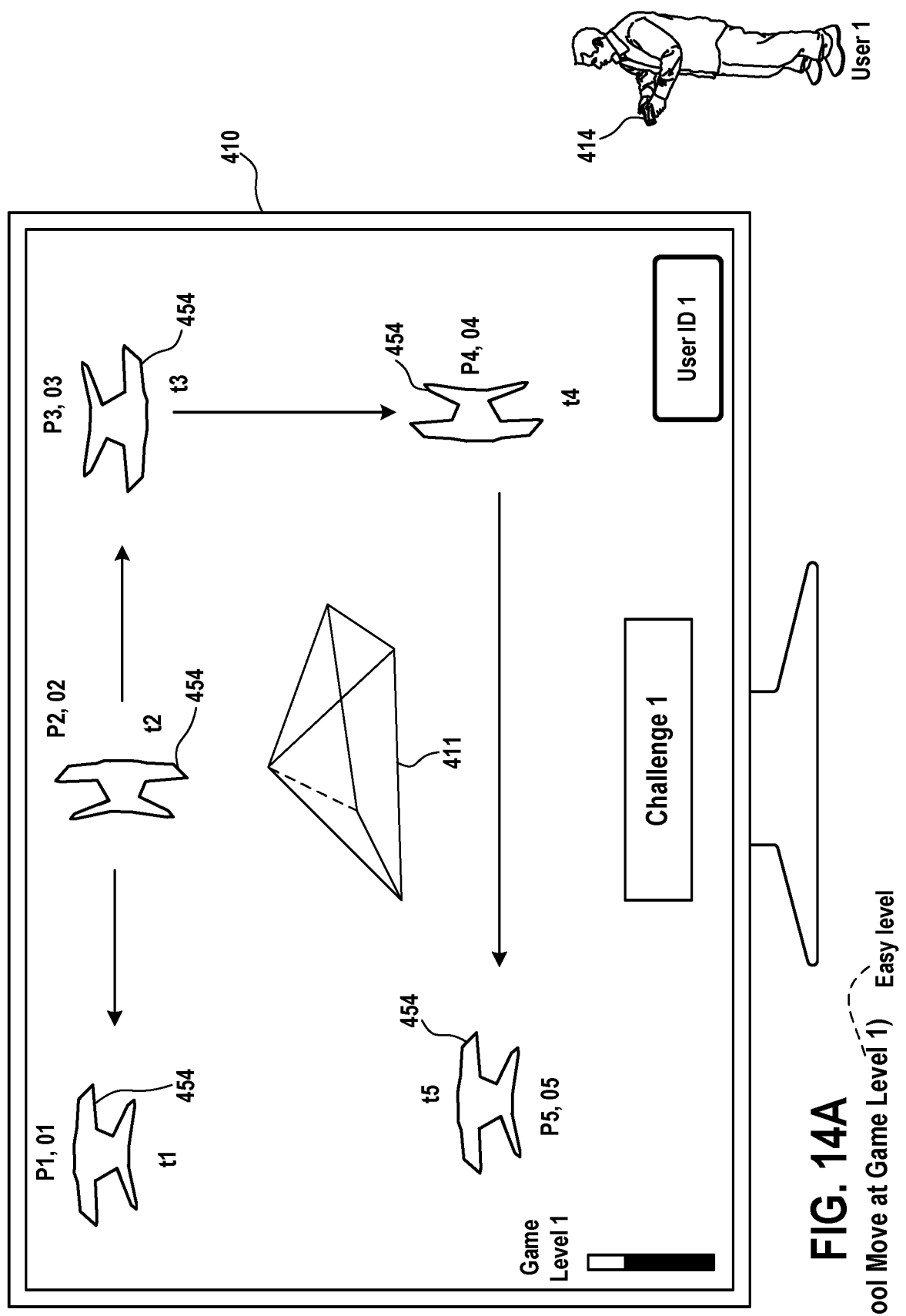
FIG. 14A is a diagram of an embodiment of a first display device to illustrate an example of a first challenge.

FIG. 14A is a diagram of an embodiment of the display device 410 to illustrate an example of the challenge 1. After logging into the user account 1, the user 1 plays the game level 1 of the legacy game N. During a play of the game level 1 of the legacy game N, the user 1 selects one or more buttons on the hand-held controller 414 to generate a user input to pause the legacy game N. Once the legacy game N is paused, the user 1 further selects one or more buttons on the hand-held controller 414 to generate another user input for playing the challenge 1. The challenge 1 includes a stunt, such as a cool move, in which the virtual object 454 is flipped upside down and then downside up. For example, during a play of the challenge 1, the virtual object 454 is at the position P1 and the orientation O1 at a time t1. The user 1 controls the hand-held controller 414 to move the virtual object 454 from the position P1 and the orientation O1 to the position P2 and the orientation O2 at a time t2. Further, the user 1 controls the hand-held controller 414 to move the virtual object 454 from the position P2 and the orientation O2 to a position P3 and an orientation O3 at a time t3. At the time t3, the virtual object 454 is flipped upside down. Also, the user 1 controls the hand-held controller 414 to move the virtual object 454 from the position P3 and the orientation O3 to a position P4 and an orientation O4 at a time t4. The user 1 further controls the hand-held controller 414 to move the virtual object 454 from the position P4 and the orientation O4 to a position P5 and the orientation O5 at a time t5. At the time t5, the virtual object 454 is flipped downside up.

It should be noted that the virtual object 454 moves around a virtual pyramid 411. For example, the virtual object 454 moves from the position P1 via the positions P2 through P4 to the position P5 to circle around the virtual pyramid 411.

Figure 14B:
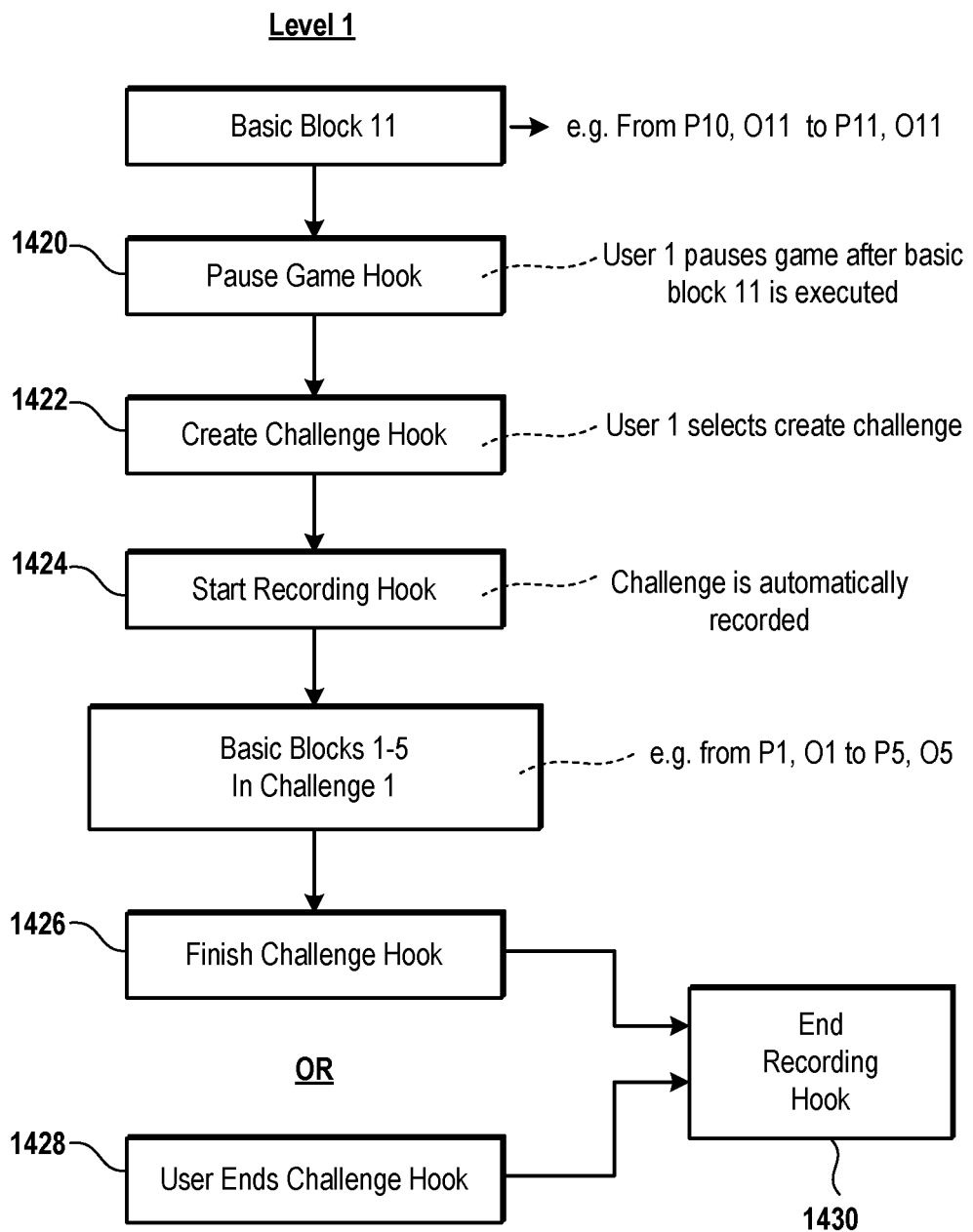
FIG. 14B is a diagram to illustrate a hook that is inserted between any two of the basic blocks 1 through n for a first game level of a legacy game.

FIG. 14B is a diagram to illustrate a hook that is inserted between any two of the basic blocks 1 through n for the game level 1 of the legacy game N. As an example, a hook, as used herein is one or more hook blocks, which are inserted by a programmer of the user 1, to change functionality of the legacy game N. To illustrate, the hook is inserted between any two consecutive ones of the basic blocks 1 through n stored in the cache 102. As such, the hook is stored in the cache 102. As another illustration, a structure of a hook block is the same as a structure of a basic block. To further illustrate, a hook includes a hook block that includes a source register address of a source register in the cache 102, a destination register address of a destination register in the cache 102, and an operation that is to be performed on data stored at the source register address, or data stored at the destination register address, or the data stored at both the source and destination register addresses. As another illustration, a hook includes a hook block that includes one or more source register addresses of one or more source registers in the cache 102, one or more destination register addresses of one or more destination registers in the cache 102, and one or more operations that are to be performed on data stored at the one or more source register addresses, or data stored at the one or more destination register addresses, or the data stored at the one or more source register addresses and at the one or more destination register addresses. As another illustration, a hook is inserted by the programmer or the user 1 via the input device that is coupled to the cache 102.

A pause game hook 1420 is inserted after the basic block 11. The basic block 11 is executed during the game level 1 of the legacy game N. The basic block 11 is executed by the block dispatcher 302 (FIG. 3) to move the virtual object 454 from a position P10 and an orientation O10 to a position P11 and an orientation O11. The pause game hook 1420 is inserted in the cache 102 by the programmer via the input device to allow the user 1 to pause the legacy game N after the basic block 11 is executed. The pause game hook 1420 is inserted in the cache 102 after one or more memory addresses at which the basic block 11 is stored in the cache 102. For example, a value that points to the pause game hook 1420 is inserted in the basic block 11 to enable the legacy game N to receive a request for pausing the legacy game N from the user 1 during the game level 1 of the legacy game N. The pause game hook 1420 is executed by the block dispatcher 302.

Also, a create challenge hook 1422 is inserted in the cache 102 by the programmer via the input device to create the challenge 1 from one or more of the basic blocks 1 through n, such as the basic blocks 1 through 5, of the legacy game N. For example, a value that points to the create challenge hook 1422 is inserted in the pause game hook 1420 to enable the legacy game N to receive a request from the user 1 for initiating the challenge 1. When the request for initiating the challenge 1 is received, the basic blocks 1 through 5 that are included as a part of the challenge 1 are executed by the block dispatcher 302 based on a user input received during the challenge 1. To illustrate, when a first user input is received during the challenge 1, the basic block 1 is executed to service the first user input and when a second user input is received during the challenge 1, the basic block 2 is executed to service the second user input. As another illustration, when a first user input is received during the challenge 1, the basic blocks 1 and 2 are executed to service the first user input and when a second user input is received during the challenge 1, the basic blocks 3 and 5 are executed to service the second user input. As yet another illustration, when a first user input is received during the challenge 1, the basic block 2 is executed to move the virtual object 454 from the position P1 and the orientation O1 to the position P2 and the orientation O2. Also, in the illustration, when a second user input is received during the challenge 1, the basic block 3 is executed to move the virtual object 454 from the position P2 and the orientation O2 to the position P3 and the orientation O3. Further, in the illustration, when a third user input is received during the challenge 1, the basic block 4 is executed to move the virtual object 454 from the position P3 and the orientation O3 to the position P4 and the orientation O4. In the illustration, when a fourth user input is received during the challenge 1, the basic block 5 is executed to move the virtual object 454 from the position P4 and the orienta-tion O4 to the position P5 and the orientation O5. The create challenge hook 1422 is executed by the block dispatcher 302.

Moreover, a start recording hook 1424 is inserted in the cache 102 by the programmer via the input device to record the challenge 1 as soon as the pause game hook 1422 is executed. For example, a value that points to the start recording hook 1424 is inserted in the create challenge hook 1422 to start recording of the challenge 1 upon initiation of execution of the one or more of the basic blocks 1 through n of the challenge 1 by the block dispatcher 302. The recording of the challenge 1 is stored as the recording 1 in the memory device 1304 (FIG. 13). When the start recording hook 1424 is executed, the CPU 1308 sends an instruction to the recorder 1302 to start recording. Upon receiving the instruction, the recorder 1302 records frames, such as image frames and audio frames, regarding the play of the challenge 1 by the user 1 and stores the recording 1 in the memory device 1304. The start recording hook 1424 is executed by the block dispatcher 302.

In addition, a finish challenge hook 1426 is inserted in the cache 102 by the programmer via the input device to end the challenge 1 generated from one or more of the basic blocks 1 through n of the legacy game N. For example, a value that points to the finish challenge hook 1426 is inserted in each of the basic blocks 1-5 to end the challenge 1 upon execution of the basic block. To illustrate, once all the basic blocks 1 through 5 of the challenge 1 are executed to move the virtual object 454, the finish challenge hook 1426 is executed. As another example, the CPU 1308 (FIG. 13) includes a clock source, such as a clock oscillator or a timer, to count an amount of time since the start of execution of one or more of the basic blocks 1 through n of the challenge 1. The CPU 1309 determines whether the count exceeds a pre-determined threshold. Upon determining that the count exceeds the pre-determined threshold, the CPU 1308 ends execution of the one or more of the basic blocks 1 through n of the challenge 1. On the other hand, upon determining that the count does not exceed the pre-determined threshold, the CPU 1308 does not end execution of the one or more of the basic blocks 1 through n of the challenge 1. The finish challenge hook 1426 is executed by the block dispatcher 302.

Also, a user end challenge hook 1428 is inserted in the cache 102 by the programmer via the input device to enable the user 1 to end the challenge 1 generated from one or more of the basic blocks 1 through n of the legacy game N at any time during a play of the challenge 1. For example, the user end challenge hook 1428 is inserted in each of the one or more of the basic blocks 1 through n. To illustrate, a value that points to the user end challenge hook 1428 is inserted in each of the basic blocks 1 through 5 to allow the user 1 to end the challenge 1 via the user account 1 at any point during execution of one or more of the basic blocks 1 through 5 of the challenge 1. The user end challenge hook 1428 is executed by the block dispatcher 302.

Further, an end recording hook 1430 is inserted in the cache 102 by the programmer via the input device to end the recording of the challenge 1 when the challenge 1 finishes or when the user 1 ends the challenge 1. As an example, a value that points to the end recording hook 1430 is inserted in the finish challenge hook 1426 to end the recording of the challenge 1 upon execution of the finish challenge hook 1426. As another example, a value that points to the end recording hook 1430 is inserted in the user end challenge hook 1428 to end the recording of the challenge 1 upon execution of the user end challenge hook 1428. The end recording hook 1430 is executed by the block dispatcher 302. When the end recording hook 1430 is executed, the CPU 1308 sends an instruction to the recorder 1302 to stop recording the challenge 1.

In one embodiment, the block dispatcher 302 is a part of the CPU 1308, or the GPU 1310, or both the CPU 1308 and the GPU 1310.

Figure 14C:
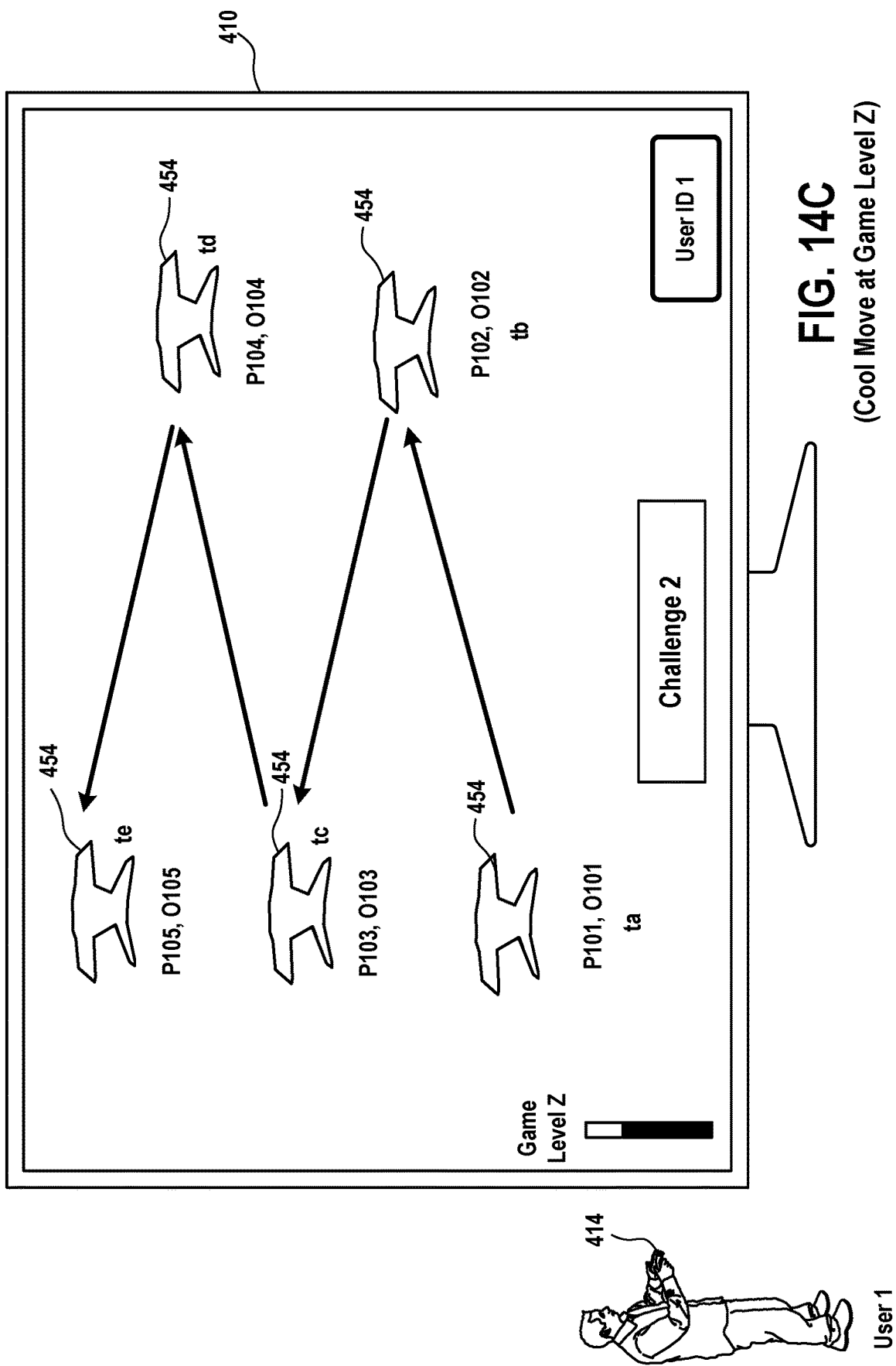
FIG. 14C is a diagram of an embodiment of the first display device to illustrate an example of a second challenge.

FIG. 14C is a diagram of an embodiment of the display device 410 to illustrate an example of the challenge 2. After logging into the user account 1, the user 1 plays the game level Z of the legacy game N. During a play of the game level Z of the legacy game N, the user 1 selects one or more buttons on the hand-held controller 414 to generate a user input to pause the legacy game N. Once the legacy game N is paused, the user 1 further selects one or more buttons on the hand-held controller 414 to generate another user input for playing the challenge 2. The challenge 2 includes a stunt, such as a cool move, in which the virtual object 454 is moves along a zigzag path. For example, during a play of the challenge 1, the virtual object 454 is at a position P101 and an orientation O101 at a time ta. The user 1 controls the hand-held controller 414 to move the virtual object 454 from the position P101 and the orientation O101 to a position P102 and an orientation O102 at a time tb. Further, the user 1 controls the hand-held controller 414 to move the virtual object 454 from the position P102 and the orientation O102 to a position P103 and an orientation O103 at a time tc. Also, the user 1 controls the hand-held controller 414 to move the virtual object 454 from the position P103 and the orientation O103 to a position P104 and an orientation O104 at a time td. The user 1 further controls the hand-held controller 414 to move the virtual object 454 from the position P104 and the orientation O104 to a position P105 and an orientation O105 at a time te.

Figure 14D:
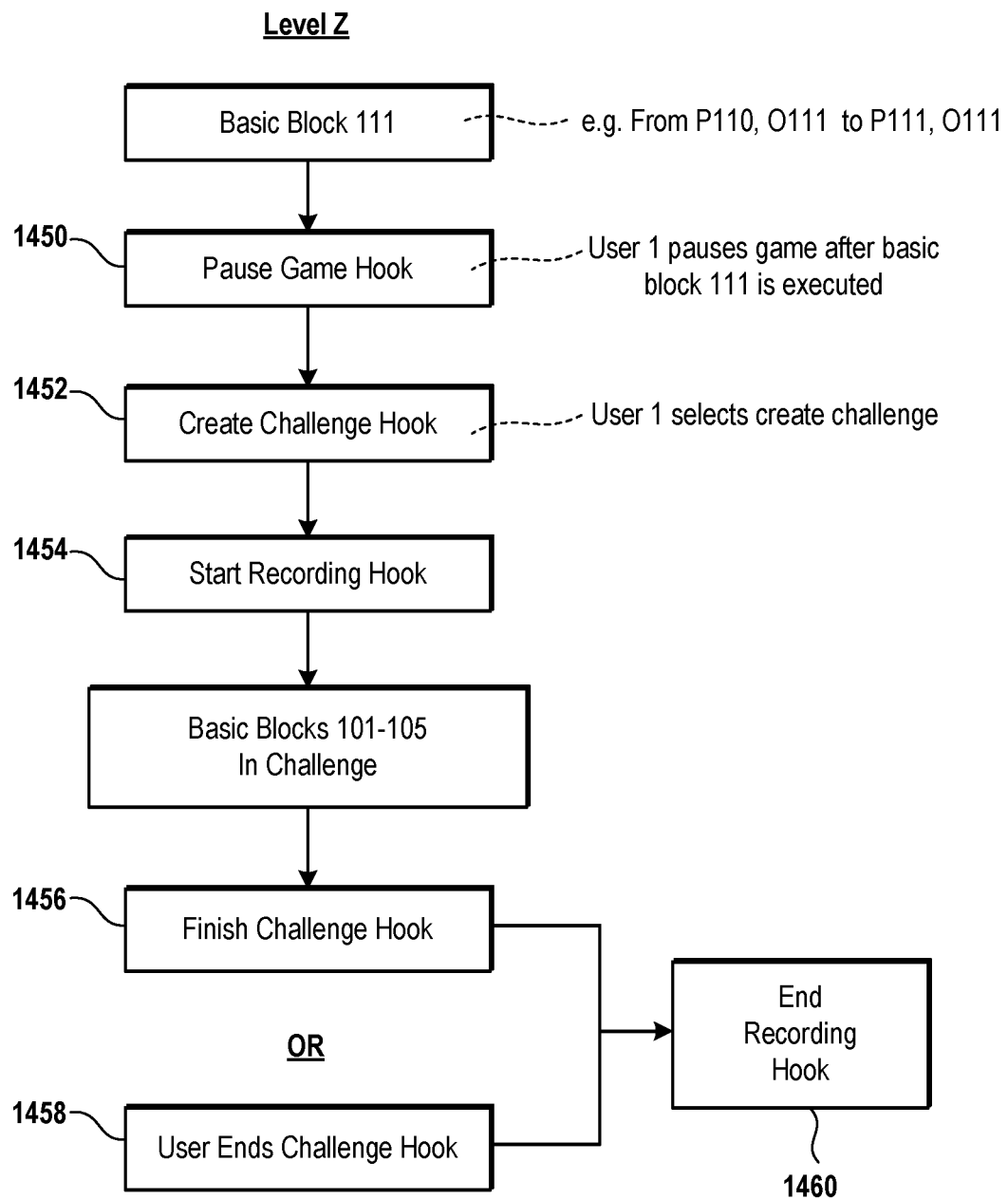
FIG. 14D is a diagram to illustrate a hook that is inserted between any two of the basic blocks 1 through n for a second game level of the legacy game.

FIG. 14D is a diagram to illustrate a hook that is inserted between any two of the basic blocks 1 through n for the game level Z of the legacy game N. A pause game hook 1450 is inserted after the basic block 111. The basic block 111 is executed during the game level Z of the legacy game N. The basic block 111 is executed by the block dispatcher 302 (FIG. 3) to move the virtual object 454 from the position P110 and the orientation O110 to the position P111 and the orientation O111. The pause game hook 1450 is inserted in the cache 102 by the programmer via the input device to allow the user 1 to pause the legacy game N after the basic block 111 is executed. The pause game hook 1450 is inserted in the cache 102 after one or more memory addresses at which the basic block 111 is stored in the cache 102. For example, a value that points to the pause game hook 1450 is inserted in the basic block 111 to enable the legacy game N to receive a request for pausing the legacy game N from the user 1 during the game level Z of the legacy game N. The pause game hook 1450 is executed by the block dispatcher 302.

Also, a create challenge hook 1452 is inserted in the cache 102 by the programmer via the input device to create the challenge 2 from one or more of the basic blocks 1 through n, such as the basic blocks 101 through 105, of the legacy game N. For example, a value that points to the challenge game hook 1452 is inserted in the pause game hook 1450 to enable the legacy game N to receive a request from the user 1 for initiating the challenge 2. When the request for initiating the challenge 2 is received, the basic blocks 101 through 105 that are included as a part of the challenge 2 are executed by the block dispatcher 302 based on a user input received during the challenge 2. To illustrate, when a first user input is received during the challenge 2, the basic block 101 is executed to service the first user input and when a second user input is received during the challenge 2, the basic block 102 is executed to service the second user input. As another illustration, when a first user input is received during the challenge 2, the basic blocks 101 and 102 are executed to service the first user input and when a second user input is received during the challenge 2, the basic blocks 103 and 105 are executed to service the second user input. As yet another illustration, when a first user input is received during the challenge 2, the basic block 102 is executed to move the virtual object 454 from the position P101 and the orientation O101 to the position P102 and the orientation O102. Also, in the illustration, when a second user input is received during the challenge 2, the basic block 103 is executed to move the virtual object 454 from the position P102 and the orientation O102 to the position P103 and the orientation O103. Further, in the illustration, when a third user input is received during the challenge 2, the basic block 104 is executed to move the virtual object 454 from the position P103 and the orientation O103 to the position P104 and the orientation O104. In the illustration, when a fourth user input is received during the challenge 2, the basic block 102 is executed to move the virtual object 454 from the position P104 and the orientation O104 to the position P105 and the orientation O105. The create challenge hook 1452 is executed by the block dispatcher 302.

Moreover, a start recording hook 1454 is inserted in the cache 102 by the programmer via the input device to record the challenge 2 as soon as the pause game hook 1452 is executed. For example, a value that points to the start recording hook 1454 is inserted in the create challenge hook 1452 to start recording of the challenge 2 upon initiation of execution of the one or more of the basic blocks 1 through n of the challenge 2 by the block dispatcher 302. The recording of the challenge 2 is stored as the recording 2 in the memory device 1304 (FIG. 13). When the start recording hook 1454 is executed, the CPU 1308 sends an instruction to the recorder 1302 to start recording. Upon receiving the instruction, the recorder 1302 records frames, such as image frames and audio frames, regarding the play of the challenge 2 by the user 1 and stores the recording 2 in the memory device 1304. The start recording hook 1454 is executed by the block dispatcher 302.

In addition, a finish challenge hook 1456 is inserted in the cache 102 by the programmer via the input device to end the challenge 2 generated from one or more of the basic blocks 1 through n of the legacy game N. For example, a value that points to the finish challenge hook 1456 is inserted each of the basic blocks 101-105 to end the challenge 2 upon execution of the basic block. To illustrate, once the basic blocks 101-105 are executed to move the virtual object 454 during the challenge 2, the finish challenge hook 1456 is executed. As another example, the CPU 1308 (FIG. 13) includes a clock source, such as a clock oscillator or a timer, to count an amount of time since the start of execution of one or more of the basic blocks 1 through n of the challenge 2. The CPU 1309 determines whether the count exceeds a pre-set threshold. Upon determining that the count exceeds the pre-set threshold, the CPU 1308 ends execution of the one or more of the basic blocks 1 through n of the challenge 2. On the other hand, upon determining that the count does not exceed the pre-set threshold, the CPU 1308 does not end execution of the one or more of the basic blocks 1 through n of the challenge 2. The finish challenge hook 1456 is executed by the block dispatcher 302.

Also, a user end challenge hook 1458 is inserted in the cache 102 by the programmer via the input device to enable the user 1 to end the challenge 2 generated from one or more of the basic blocks 1 through n of the legacy game N. For example, the user end challenge hook 1458 is inserted in each of the one or more of the basic blocks 1 through n. To illustrate, a value that points to the user end challenge hook 1458 is inserted in each of the basic blocks 101 through 105 to allow the user 1 to end the challenge 2 via the user account 1 at any point during execution of one or more of the basic blocks 1 through 5 of the challenge 2. The user end challenge hook 1458 is executed by the block dispatcher 302.

Further, an end recording hook 1460 is inserted in the cache 102 by the programmer via the input device to end the recording of the challenge 2 when the challenge 2 finishes or when the user ends the challenge 2. As an example, a value that points to the end recording hook 1460 is inserted in the finish challenge hook 1456 to end the recording of the challenge 2 upon execution of the finish challenge hook 1456. As another example, a value that points to the end recording hook 1450 is inserted in the user end challenge hook 1458 to end the recording of the challenge 2 upon execution of the user end challenge hook 1458. The end recording hook 1460 is executed by the block dispatcher 302. When the end recording hook 1460 is executed, the CPU 1308 sends an instruction to the recorder 1302 to stop recording the challenge 2.

In one embodiment, instead of the game level Z, the basic blocks 101 through 105 belong to the same game level 1 to which the basic blocks 1-5 belong. For example, the basic blocks 101-105 are executed within the same game level as that in which the basic blocks 1-5 are executed.

In an embodiment, instead of the game level Z of the same legacy game N, the basic blocks 101 through 105 belong to a different legacy game, such as a legacy game (N−1), than the legacy game N to which the basic blocks 1 through 5 belong. For example, the basic blocks 101-105 are executed during a play of the legacy game (N−1) and the basic blocks 1-5 are executed during a play of the legacy game N.

Figure 15A:
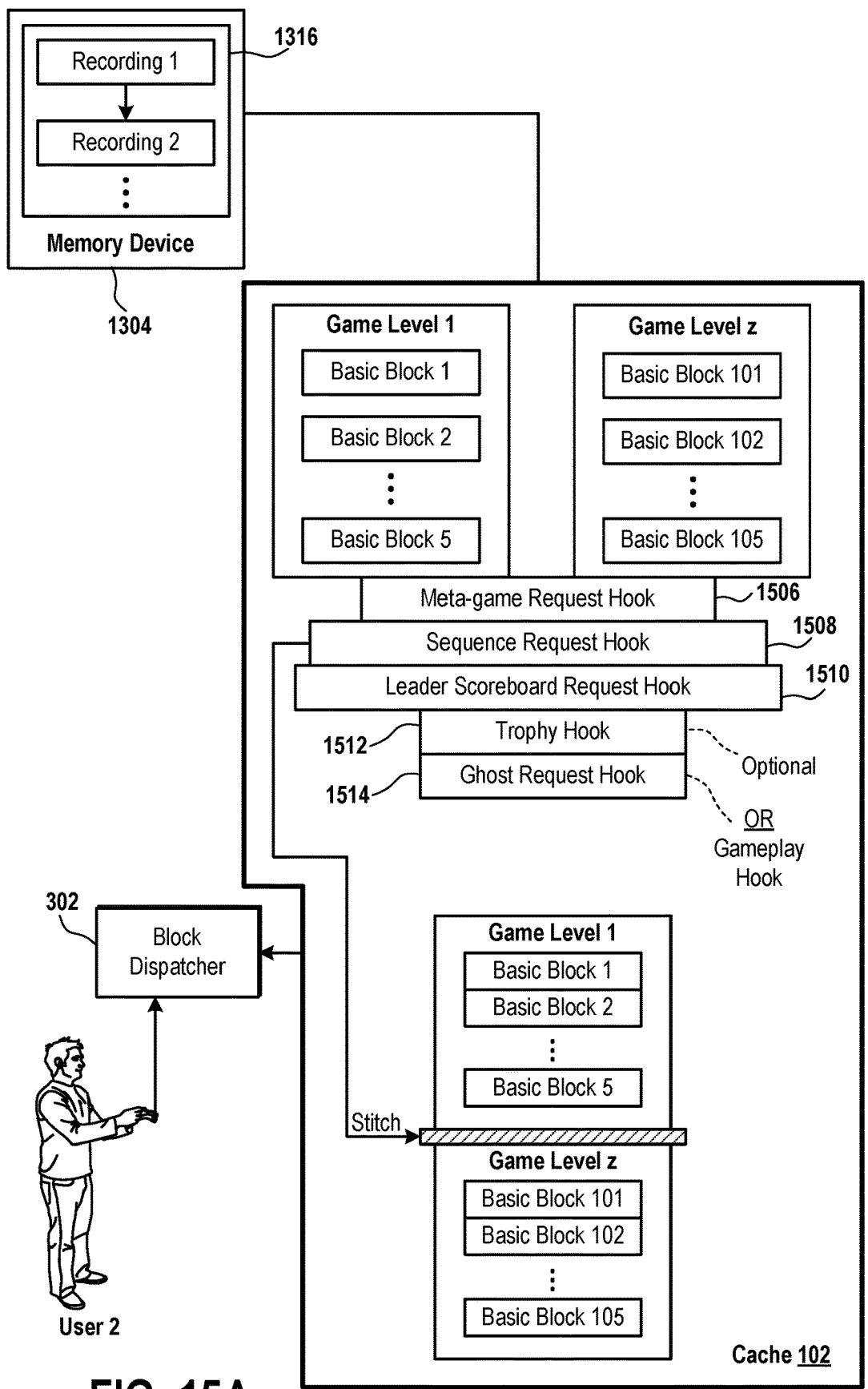
FIG. 15A is a diagram of an embodiment of a system.

FIG. 15A is a diagram of an embodiment of a system 1500. The system 1500 includes the memory device 1304, the cache 102, and the block dispatcher 302. The programmer adds a meta-game request hook 1506 to the cache 102. For example, after one or more of the basic blocks 1-5 and one or more of the basic blocks 101-105 are executed by the block dispatcher 302 during a play of the challenges 1 and 2 via the user account 1, the block dispatcher 302 executes the meta-game request hook 1506 to search for a user input, via the user account 1, requesting generation of the meta-game based on the challenges 1 and 2. In the example, once the user input requesting generation of the meta-game is received via the user account 1, the block dispatcher 302 executes the meta-game request hook 1506 to identify, from the recordings 1 and 2 of the challenges 1 and 2, the basic blocks 1-5 and 101-105 executed during the play of the challenges 1 and 2 by the user 1. To illustrate, in case the user ends challenge hook 1428 (FIG. 14B) receives a user input, via the user account 1, ending the challenge 1, one or more but not all of the basic blocks 1-5 are executed during execution of the challenge 1. In the illustration, the block dispatcher 302 executes the meta-game request hook 1506 to identify the one or more but not all of the basic blocks 1-5 and includes the one or more but not all of the basic blocks 1-5 to generate the meta-game. As another illustration, in case the finish challenge hook 1426 (FIG. 14B) is executed by the dispatcher 302 to end the challenge 1, all of the basic blocks 1-5 are included within the meta-game. In the illustration, the block dispatcher 302 executes the meta-game request hook 1506 to identify all of the basic blocks 1-5 and includes all of the basic blocks 1-5 during another play of the meta-game.

As still another illustration, in case the user ends challenge hook 1458 (FIG. 14D) receives a user input, via the user account 1, ending the challenge 2, one or more but not all of the basic blocks 101-105 are executed during execution of the challenge 2. In the illustration, the block dispatcher 302 executes the meta-game request hook 1506 to identify the one or more but not all of the basic blocks 101-105 and includes the one or more but not all of the basic blocks 101-105 to generate the meta-game. As yet another illustration, in case the finish challenge hook 1456 (FIG. 14D) is executed by the dispatcher 302 to end the challenge 2, all of the basic blocks 101-105 are included within the meta-game. In the illustration, the block dispatcher 302 executes the meta-game request hook 1506 to identify all of the basic blocks 101-105 and includes all of the basic blocks 101-105 during another play of the meta-game.

Further, the programmer adds a sequence request hook 1508 to the cache 102. For example, the block dispatcher 302 executes the sequence request hook 1508 to search for a user input, via the user account 1, requesting a sequence of execution of the basic blocks 1-5 and 101-105. Once the user input is received via the user account 1, the block dispatcher 302 executes the sequence request hook 1508 to stitch, such as generate an order of execution of, one or more of the basic blocks 1-5 and one or more of 101-105 for the meta-game. To illustrate, one or more of the basic blocks 1-5 are executed before one or more of the basic blocks 101-105 during a play of the meta-game by the user 2 via the user account 2. When the one or more of the basic blocks 1-5 are executed before one or more of the basic blocks 101-105, a play of the challenge 1 is facilitated before a play of the challenge 2. In the illustration, the one or more of the basic blocks 101-105 are not executed before execution of the one or more of the basic blocks 1-5 is complete. As another illustration, one or more of the basic blocks 101-105 are executed before one or more of the basic blocks 1-5 during a play of the meta-game by the user 2 via the user account 2. When the one or more of the basic blocks 101-105 are executed before the one or more of the basic blocks 1-5 are executed, a play of the challenge 2 is facilitated before a play of the challenge 1. In the illustration, the one or more of the basic blocks 1-5 are not executed before execution of the one or more of the basic blocks 101-105 is complete.

Moreover, the programmer adds a leadership scoreboard request hook 1508 to the cache 102. For example, the block dispatcher 302 executes the leadership scoreboard request hook 1508 to search for a user input, via the user account 1, requesting that a leadership scoreboard be added to the meta-game. Upon receiving the user input via the user account 1, the block dispatcher 302 executes the leadership scoreboard request hook 1508 to add the leadership scoreboard to the meta-game. Use of the leadership scoreboard is further described below.

Also, the programmer adds a trophy hook 1512 to the meta-game. For example, the block dispatcher 302 executes the trophy hook 1512 during a play of the meta-game. Further details of the trophy hook 1512 are described below.

Furthermore, the programmer adds a ghost request hook 1514 to the again. The block dispatcher 302 executes the ghost request hook 1514 to generate one or more ghosts of corresponding one or more virtual objects, such as the virtual object 454, that are used to play the challenges 1 and 2. The ghost request hook 1514 further includes a manner of attaching a ghost to a corresponding virtual object. For example, the ghost request hook 1514 specifies whether the ghost is to be overlaid on the corresponding virtual object or to be presented under the corresponding virtual object. In the example, the ghost represents the corresponding virtual object and is to be displayed in a different manner than the corresponding virtual object. To illustrate, the ghost is to be displayed as being more transparent compared to the corresponding virtual object. As another example, the ghost request hook 1514 indicates that a first ghost is to be attached to a first virtual object of the challenge 1 and a second ghost is to be attached to a second virtual object of the challenge 2. The first ghost has a similar shape or the same shape as that of the first virtual object, and the second ghost has a similar shape or the same shape as that of the second virtual object. Further details of the ghost request hook 1514 are provided below.

During a play of the meta-game by the user 2 via the user account 2, the block dispatcher 302 executes one or more of the basic blocks 1-5 and one or more of the basic blocks 101-105 in the sequence, such as an order, received from the user 1 via the user account 1 upon execution of the sequence request hook 1510. For example, when a user input received from the user 1 via the user account 1 indicates that the basic blocks 1-5 are to be executed after executing the basic blocks 101-105, the block dispatcher 302 executes the basic blocks 101-105 first and then executes the basic blocks 1-5. In the example, the challenge 2 is played before playing the challenge 1 according to the order.

In one embodiment, one or more of the sequence request hook 1508, the leadership scoreboard hook 1510, the trophy hook 1512, and the ghost request hook 1514 is optional. For example, the cache 102 includes the leadership scoreboard hook 1510 but excludes the sequence request hook 1508, the trophy hook 1512, and the ghost request hook 1514.

In an embodiment, each of the meta-game request hook 1506, the sequence request hook 1508, or the leadership scoreboard hook 1510, the trophy hook 1512, and the ghost request hook 1514 is executed by the block dispatcher 302.

In one embodiment, instead of or in addition to the ghost request hook 1514, a gameplay hook is included in the cache 102 by the programmer. The gameplay hook is executed by the block dispatcher 302. Further details of the gameplay hook are provided below.

Figure 15B:
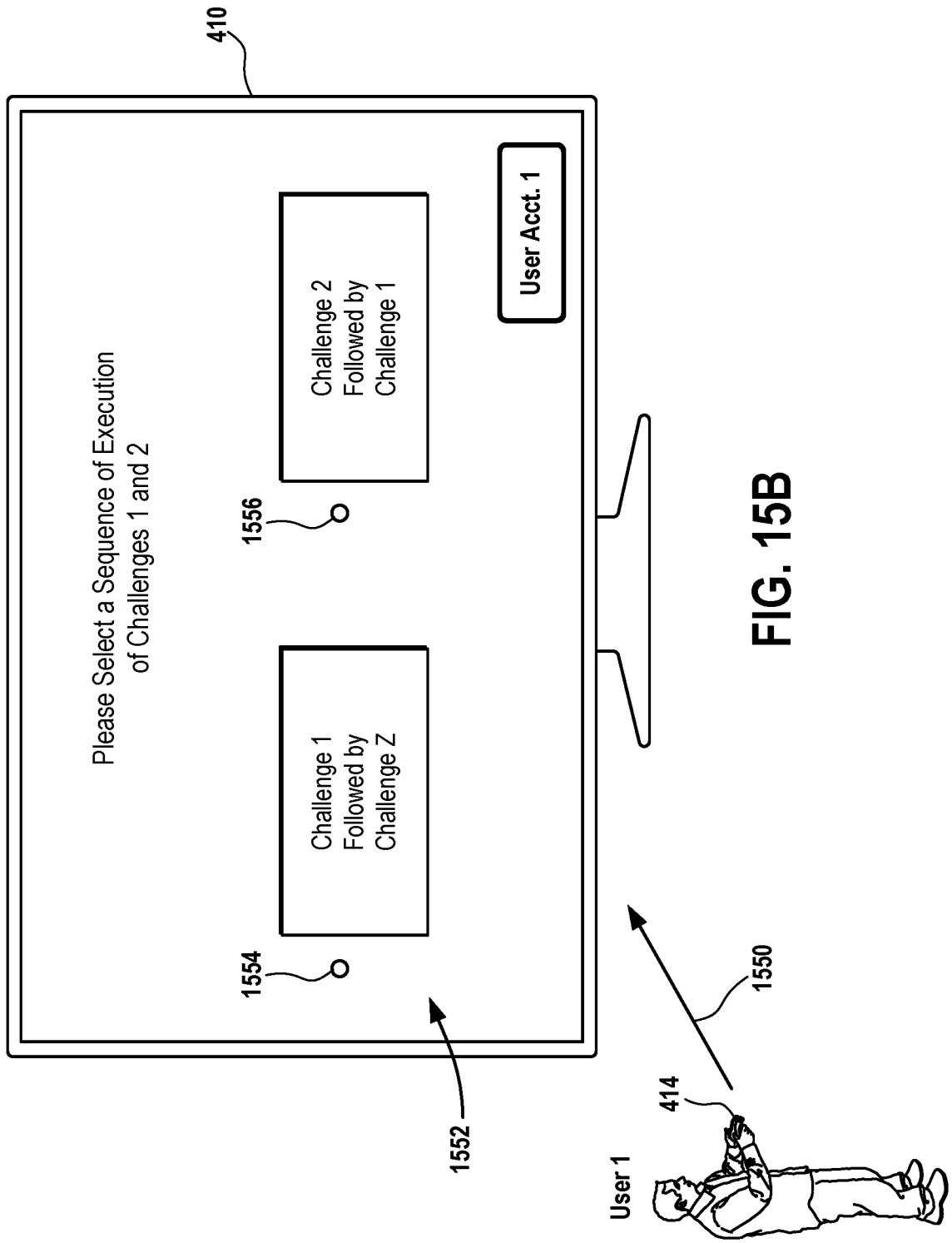
FIG. 15B is a diagram of the first display device to illustrate a selection of order of execution of the challenges by a user via a user account.

FIG. 15B is a diagram of the display device 410 to illustrate a selection of order of execution of the challenges 1 and 2 by the user 1 via the user account 1. The user 1 selects one or more buttons on the hand-held controller 414 to generate a user input 1550, which is a signal that includes the request to generate the meta-game. The signal is generated by the hand-held controller 414. Upon receiving the user input 1550 via the user account 1, the block dispatcher 302 (FIG. 3) executes the meta-game request hook 1506 (FIG. 15A) to identify one or more of the basic blocks 1-5 and one or more of the basic blocks 101-105 for generating the meta-game. Further, after identifying one or more of the basic blocks 1-5 and one or more of the basic blocks 101-105, the block dispatcher 302 executes the sequence request hook 1508 (FIG. 15A) to generate image data for an image 1552, and sends the image data via the user account 1 and the computer network 408 (FIG. 13) to display the image 1552 on the display device 410. The image 1552 includes a notification for selection of an order of execution of the challenges 1 and 2. In addition, the image 1552 includes a graphical button 1554 that can be selected by the user 1 via selection of a button on the hand-held controller 414. The image 1552 further includes a graphical button 1556 that can be selected by the user 1 via a selection of a button on the hand-held controller 414.

Upon receiving a user input indicating a selection of the graphical button 1554 via the computer network 408, the block dispatcher 302 executes the sequence request hook 1508 to generate a first sequence in which one or more of the blocks 1-5 of the challenge 1 will be executed before execution of one or more of the blocks 101-105 of the challenge 2. On the other hand, upon receiving a user input indicating a selection of the graphical button 1556 via the computer network 408, the block dispatcher 302 executes the sequence request hook 1508 to generate a second sequence in which one or more of the blocks 101-105 of the challenge 2 will be executed before execution of one or more of the blocks 1-5 of the challenge 1.

Figure 16A:
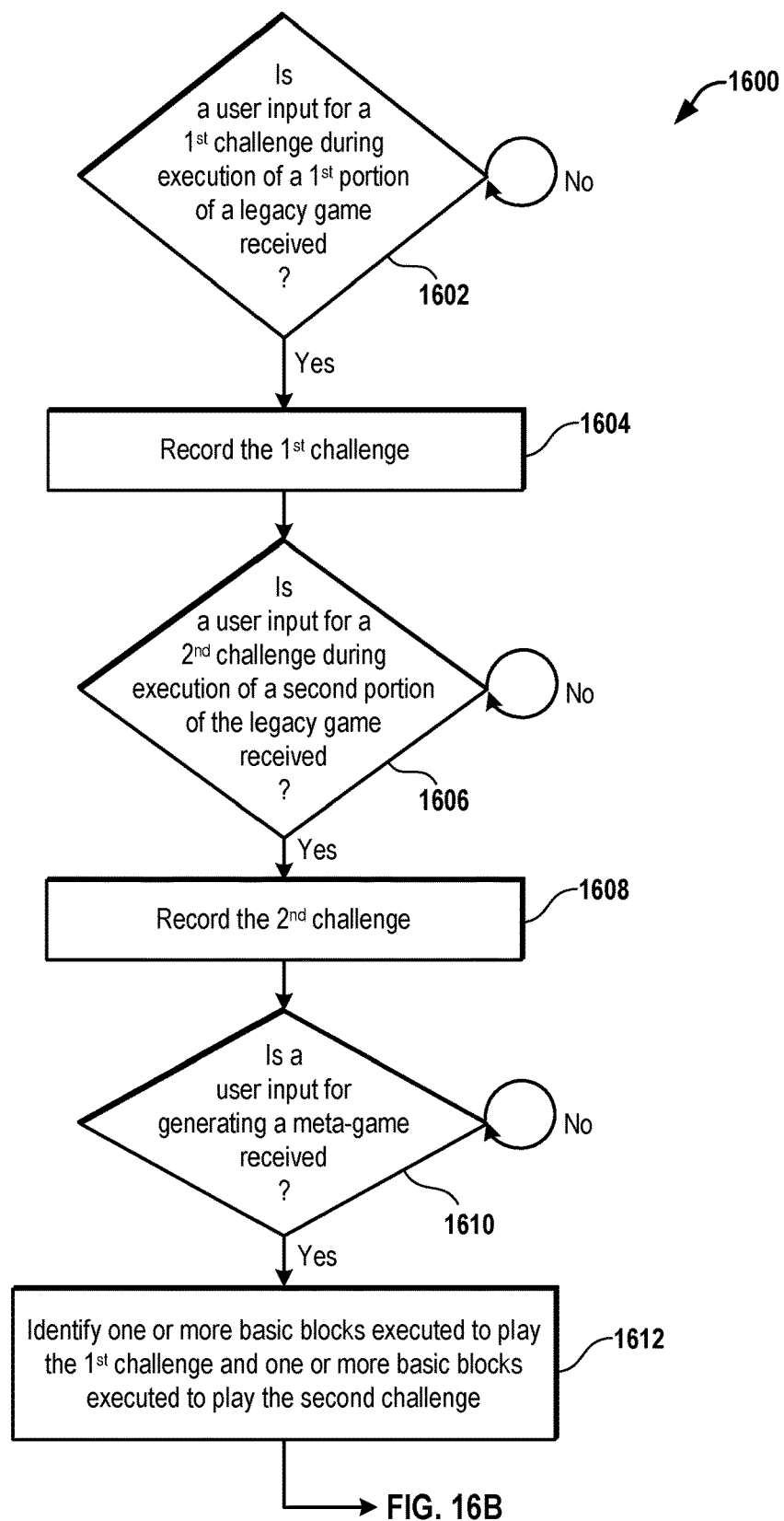
FIG. 16A is a flowchart of an embodiment of a method to illustrate generation of the meta-game.

FIG. 16A is a flowchart of an embodiment of a method 1600 to illustrate generation of the meta-game. In an operation 1602 of the method 1600, it is determined whether a user input for a first challenge, such as the challenge 1, during execution of a first portion of the legacy game N is received. For example, the block dispatcher 302 determines whether a user input including a request to pause the legacy game N at the game level 1 is received via the computer network 408 (FIG. 13) and the user account 1. In the example, the user input is a signal that is generated when the user 1 selects one or more buttons on the hand-held controller 414 (FIG. 13). The signal is generated by the hand-held controller 414. Upon determining so in the example, the block dispatcher 302 executes the pause game hook 1422 (FIG. 14B) to pause the legacy game N at the game level 1. Also, in the example, the block dispatcher 302 executes the create challenge hook 1422 (FIG. 14B) to generate image frames, such as an image frame including a create challenge 1 button, for initiating the challenge 1 and sends the image frames via the user account 1 and the computer network 408 to the display device 410 for display. Continuing with the example, the user 1 selects, via the hand-held controller 412, the create challenge 1 button, and an indication of the selection is sent via the game console 402 and the computer network 408 to the server system 404. Further, in the example, upon receiving the indication of the selection, the block dispatcher 302 executes one or more of the basic blocks 1 through n to continue play of the legacy game N from a time the legacy game N is paused to generate the challenge 1 and allows the user 1 to play the challenge 1. The block dispatcher 302 continues to determine whether the user input is received in the operation 1602 until the user input is received.

In an operation 1604 of the method 1600, a play of the first challenge is recorded as the recording 1 by the recorder 1302 (FIG. 13). For example, the block dispatcher 302 executes the start recording hook 1424 (FIG. 14B) to send a signal to the recorder 1302 to start recording a play of the challenge 1 by the user 1 via the user account 1. Upon receiving the signal to record, the recorder 1302 initiates recording of the play of the challenge 1 by the user 1 via the user account 1. Once the recording starts, during a play of the challenge 1, the user 1 selects one or more buttons on the hand-held controller 414 (FIG. 14A) during the challenge 1 to generate one or more user inputs. Upon receiving the one or more user inputs via the user account 1, the block dispatcher 302 executes one or more of the basic blocks 1-5 to service the one or more user inputs during the play of the challenge 1. The recording 1 is stored by the recorder 1302 in the memory device 1304 (FIG. 13).

In an operation 1606 of the method 1600, it is determined whether a user input for a second challenge, such as the challenge 2, during execution of a second portion of the legacy game N is received. For example, the block dispatcher 302 determines whether a user input, such as a signal, including a request to pause the legacy game N at the game level Z is received at the user account 1 via the computer network 408. In the example, the user input is generated by the hand-held controller 414 when the user 1 selects one or more buttons on the hand-held controller 414 (FIG. 13). Continuing with the example, upon determining so, the block dispatcher 302 executes the pause game hook 1450 (FIG. 14D) to pause the legacy game N at the game level Z. Also, in the example, the block dispatcher 302 executes the create challenge hook 1452 (FIG. 14D) to generate image frames, such as an image frame including a create challenge 2 button, for initiating the challenge 2 and sends the image frames via the user account 1 and the computer network 408 to the display device 410 for display. In the example, the user 1 selects via the hand-held controller 412 the create challenge 2 button and an indication of the selection is sent via the game console 402 and the computer network 408 to the server system 404. Further in the example, upon receiving the indication of the selection, the block dispatcher 302 executes one or more of the basic blocks 1 through n to continue play of the legacy game N from a time the legacy game N is paused to generate the challenge 2 and allow the user 1 to play the challenge 2. The block dispatcher 302 continues to determine whether the user input is received in the operation 1606 until the user input is received.

In an operation 1608 of the method 1600, a play of the second challenge is recorded as the recording 2 by the recorder 1302. For example, the block dispatcher 302 executes the start recording hook 1454 (FIG. 14D) to send a signal to the recorder 1302 to start recording a play of the challenge 2 by the user 1 via the user account 1. In the example, upon receiving the signal to record, the recorder 1302 initiates recording of the play of the challenge 2 by the user 1 via the user account 1. Further, in the example, after the recording starts, during a play of the challenge 2, the user 1 selects one or more buttons on the hand-held controller 414 during the challenge 2 to generate one or more user inputs. In the example upon receiving the one or more user inputs via the user account 1, the block dispatcher 302 executes one or more of the basic blocks 101-105 to service the one or more user inputs during the play of the challenge 2. The recording 2 is stored by the recorder 1302 in the memory device 1304.

In an operation 1610 of the method 1600, it is determined whether a user input for generating the meta-game is received. For example, the block dispatcher 302 determines whether a user input, which is a signal including a request for generating the meta-game from the challenges 1 and 2 is received at the user account 1. In the example, the user input is generated by the user 1 by selecting one or more buttons on the hand-held controller 414 (FIG. 13). To illustrate, the block dispatcher 302 executes the meta-game request hook 1506 (FIG. 15A) to determine whether the user input received at the user account 1 includes the request to generate the meta-game. The block dispatcher 302 continues to determine whether the user input to generate the meta-game is received until the user input is received.

Upon determining that the user input to generate the meta-game is received, an operation 1612 is executed. The operation 1612 includes identifying one or more of the basic blocks 1 through n, such as the basic blocks 1-5, executed during a play of the challenge 1 via the user account 1 and one or more of the basic blocks 1 through n, such as the basic blocks 101-105, executed during a play of the challenge 2 via the user account 1. For example, the block dispatcher 302 executes the meta-game request hook 1506 to identify, from the recording 1, one or more of the basic blocks 1-5 executed during the play, via the user account 1, of the challenge 1. In the example, the block dispatcher 302 executes the meta-game request hook 1506 to identify, from the recording 2, one or more of the basic blocks 101-105 executed during the play, via the user account 1, of the challenge 2. To illustrate, the block dispatcher 302 sends a request to the recorder 1302 to access the recordings 1 and 2 from the memory device 1304. In the illustration, upon receiving the request, the recorder 1302, upon obtaining the request from the block dispatcher 302, accesses the recordings 1 and 2 from the memory device 1304 and provides the recordings to the block dispatcher 302. Further, in the illustration, the block dispatcher 302 parses the recordings 1 and 2 to identify from the recording 1, one or more of the basic blocks 1 through 5 executed to generate the recording 1, and to identify from the recording 2, one or more of the basic blocks 101-105 executed to generate the recording 2.

Figure 16B:
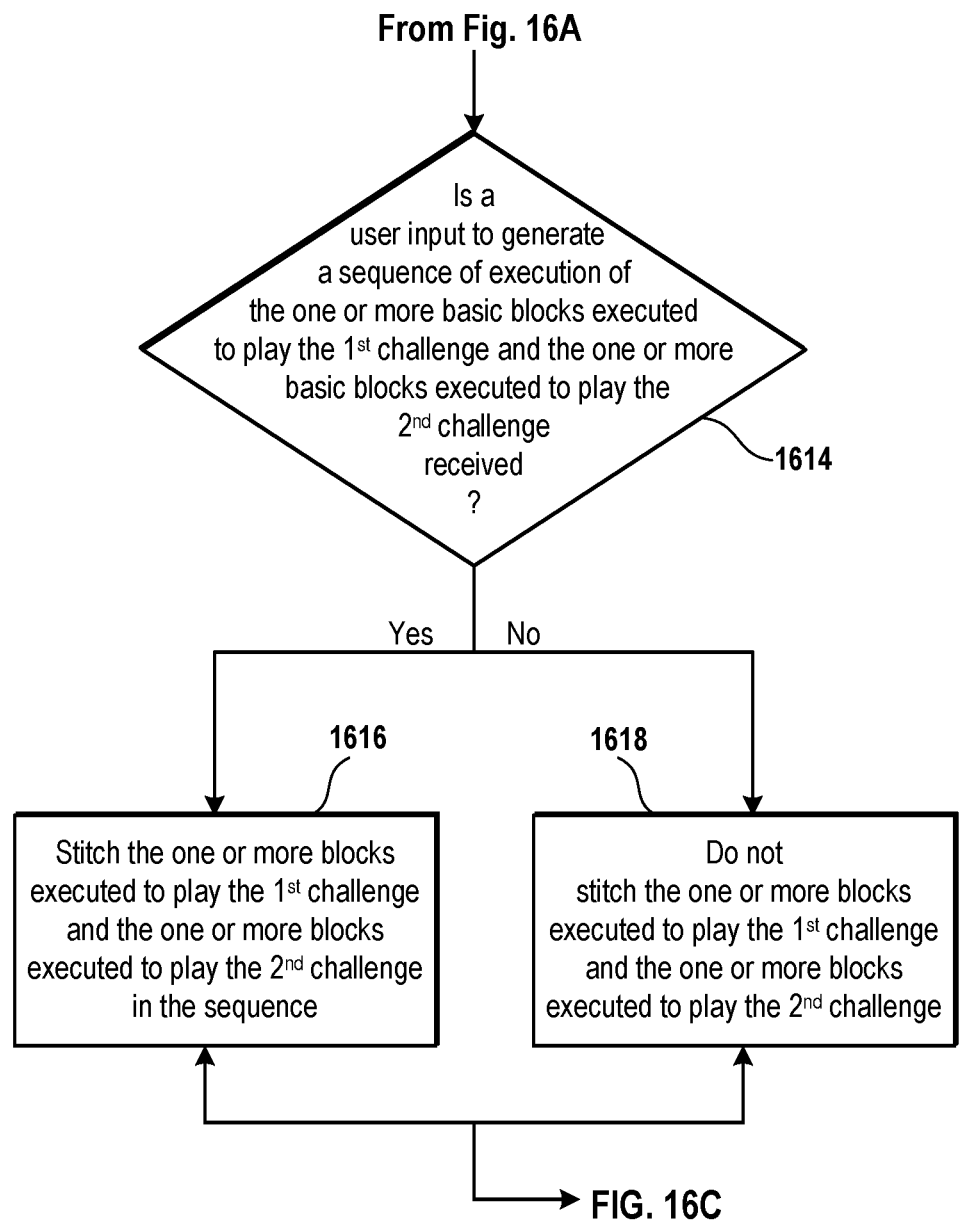
FIG. 16B is a continuation of the flowchart of FIG. 16A to illustrate the method of FIG. 16A for stitching one or more basic blocks of the first challenge with one or more of the basic blocks of the second challenge.

FIG. 16B is a continuation of the flowchart of FIG. 16A to illustrate the method 1600 for stitching one or more of the basic blocks 1-5 of the challenge 1 with one or more of the basic blocks 101-105 of the challenge 2. In an operation 1614 of the method 1600, it is determined whether a user input to generate a sequence of execution of the one or more of the basic blocks 1 through n, such as the basic blocks 1-5, identified in the operation 1612 and the one or more of the basic blocks 1 through n, such as the basic blocks 101-105, identified in the operation 1612 is received. For example, the block dispatcher 302 (FIG. 3) executes the sequence request hook 1508 (FIG. 15A) to generate image data of the image 1552 (FIG. 15B) for the user account 1 and sends the image data via the computer network 408 (FIG. 13) to display the image 1552 on the display device 410 (FIG. 13). In the example, the block dispatcher 302 executes the sequence request hook 1508 to determine whether, in response to displaying the image 1552, a user input including a selection of the graphical button 1554 (FIG. 15B) or a user input including a selection of the graphical button 1556 (FIG. 15B) is received at the user account 1 of the server system 404 (FIG. 13) via the computer network 408.

In an operation 1616 of the method 1600, one or more of the basic blocks 1 through n, such as the basic blocks 1-5, for facilitating a play of the challenge 1 are stitched with one or more of the basic blocks 1 through n, such as the basic blocks 101-105, for facilitating a play of the challenge 2 in response to determining that the user input is received in the operation 1614. For example, upon determining that the user input including the selection of the graphical button 1554 is received, the block dispatcher 302 executes the sequence request hook 1508 (FIG. 15A) to stitch the basic blocks 1-5 executed during the play of the challenge 1 via the user account 1 with the basic blocks 101-105 executed during the play of the challenge 2 via the user account 1. In the example, the basic blocks 1-5 are stitched with the basic blocks 101-105 to enable execution of the basic blocks 1-5 before execution of the basic blocks 101-105. To illustrate, the CPU 1308 generates a pointer pointing to memory locations, such as addresses, with the cache 102 at which the basic blocks 101-105 are stored. The CPU 1308 provides access to the pointer immediately after all of the basic blocks 1-5 are executed. As such, immediately after execution of all of the basic blocks 1-5, the pointer points to the memory locations of the basic blocks 101-105 for execution of the basic blocks 101-105.

In the example, on the other hand, upon determining that the user input including the selection of the graphical button 1556 is received, the block dispatcher 302 executes the sequence request hook 1508 to stitch one or more of the basic blocks 1 through n, such as the basic blocks 101-105, executed during the play of the challenge 2 via the user account 1 with one or more of the basic blocks 1 through n, such as the basic blocks 1-5, executed during the play of the challenge 1 via the user account 1. In the example, the one or more basic block 101-105 are stitched with the one or more basic blocks 1-5 to enable execution of the one or more basic blocks 101-105 before execution of the one or more basic blocks 1-5. To illustrate, the CPU 1308 generates a pointer pointing to memory locations, such as addresses, with the cache 102 at which the basic blocks 1-5 are stored. The CPU 1308 provides access to the pointer immediately after all of the basic blocks 101-105 are executed. As such, immediately after execution of all of the basic blocks 101-105, the pointer points to the memory locations of the basic blocks 1-5 for execution of the basic blocks 1-5.

In an operation 1618 of the method 1600, one or more of the basic blocks 1-5 are not stitched with one or more of the basic blocks 101-105 in response to determining that the user input is not received in the operation 1614. For example, upon determining that neither the user input including the selection of the graphical button 1554 nor the user input including the selection of the graphical button 1556 is received, the block dispatcher 302 does not execute the sequence request hook 1508 to stitch the one or more basic blocks 1-5 executed during the play of the challenge 1 via the user account 1 with the one or more basic blocks 101-105 executed during the play of the challenge 2 via the user account 1. In the example, without the stitching, the basic blocks 1-5 and 101-105 are later executed in the same sequence in which the basic blocks 1-5 and 101-105 are executed during the play of the meta-game by the user 1 via the user account 1.

Figure 16C:
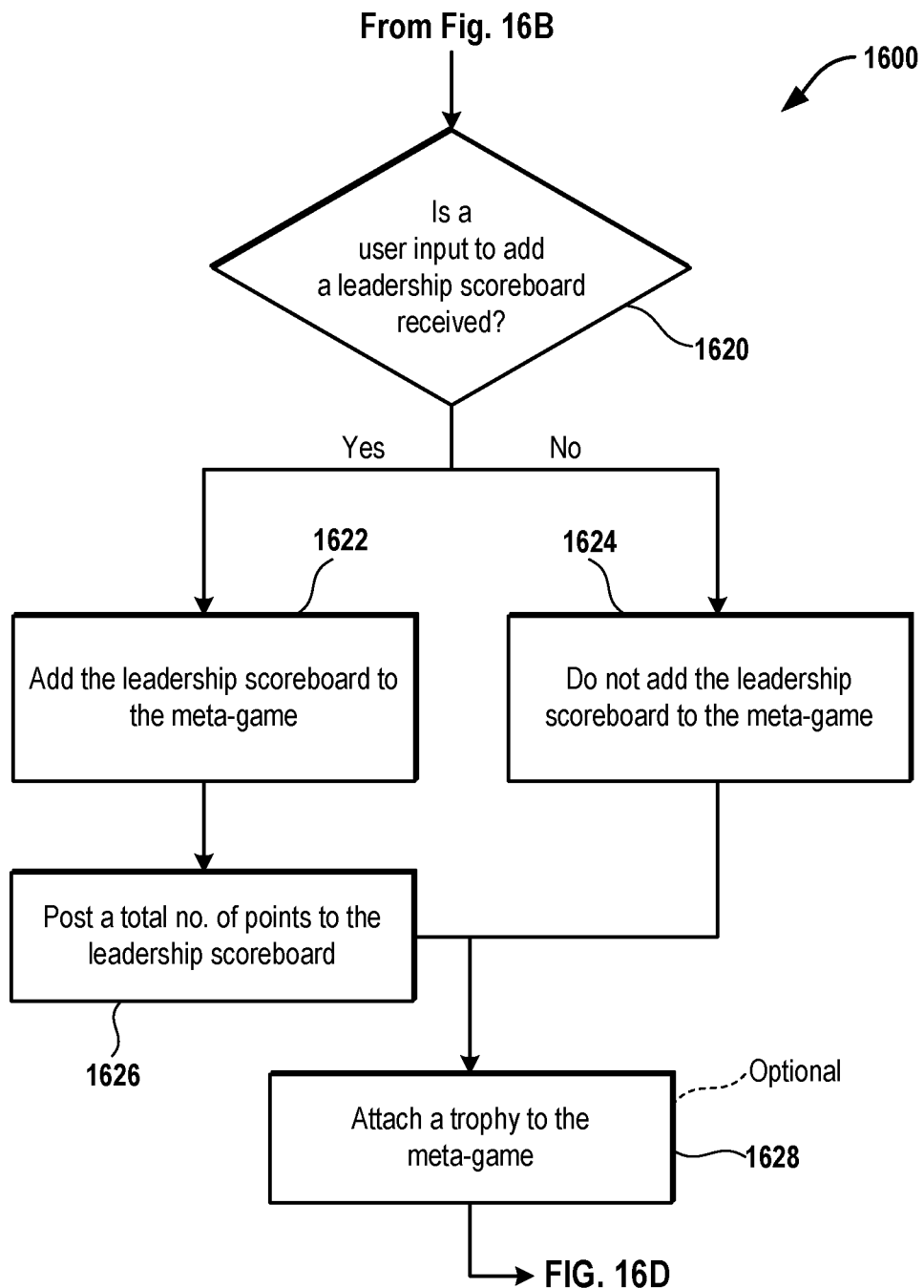
FIG. 16C is a continuation of the flowchart of FIG. 16B to illustrate an addition of a leadership scoreboard within the meta-game and attachment of a trophy to the meta-game.

FIG. 16C is a continuation of the flowchart of FIG. 16B to illustrate an addition of the leadership scoreboard within the meta-game and attachment of the trophy to the meta-game. In an operation 1620 of the method 1600, it is determined whether a user input to add the leadership scoreboard is received. For example, the CPU 1308 determines whether the user input indicating that the leadership scoreboard be added to the meta-game is received via the computer network 408 (FIG. 13) and the user account 1 from the client device 1301 (FIG. 13). The user input is a signal generated by the hand-held controller 414 (FIG. 13) when the user 1 selects one or more buttons on the hand-held controller 414.

In an operation 1622 of the method 1600, upon determining that the user input for adding the leadership scoreboard is received, the CPU 1308 adds the leadership scoreboard to the meta-game. For example, the CPU 1308 executes the leadership scoreboard request hook 1508 (FIG. 15A) to combine the leadership scoreboard to the meta-game. On the other hand, in an operation 1624 of the method 1600, in response to determining that the user input for adding the leadership scoreboard is not received, the CPU 1308 does not include or add the leadership scoreboard within the meta-game.

Continuing with the method 1600, in an operation 1626 of the method 1600, the CPU 1308 posts a total number of points, such as virtual points, to the leadership scoreboard. For example, the CPU 1308 adds a number of points accumulated by the user 1 via the user account 1 during a play of the challenge 1 and a number of points accumulated by the user 1 via the user account 1 during a play of the challenge 2 to determine the total number of points. The CPU 1308 publishes the total number of points on the leadership scoreboard. When the user 2 accesses the leadership scoreboard from the server system 404 (FIG. 13) via the user account 2 and the computer network 408, the leadership scoreboard is displayed on the display device 1204 (FIG. 13).

In an operation 1628 of the method 1600, the CPU 1308 determines to attach a trophy to the meta-game. For example, the CPU 1308 executes the trophy hook 1512 to include the trophy within the meta-game. To illustrate, the trophy hook includes a criteria for providing a virtual reward to the user 2 via the user account 2. When the criteria, such as a pre-determined limit, is achieved during execution of the meta-game, the virtual reward is awarded to the user account 2. Examples of the criteria include achieving greater than a pre-determined number of points in the meta-game or passing a pre-determined level within the meta-game or a combination thereof.

In one embodiment, the method 1600 does not include the operation 1628.

In an embodiment, instead of calculating and publishing the total number of points in the operation 1626 within the meta-game, another type of virtual measure of play of the meta-game can be used. For example, instead of the total number of points, a total number of virtual levels passed or a total number of gold coins accumulated can be used.

Figure 16D:
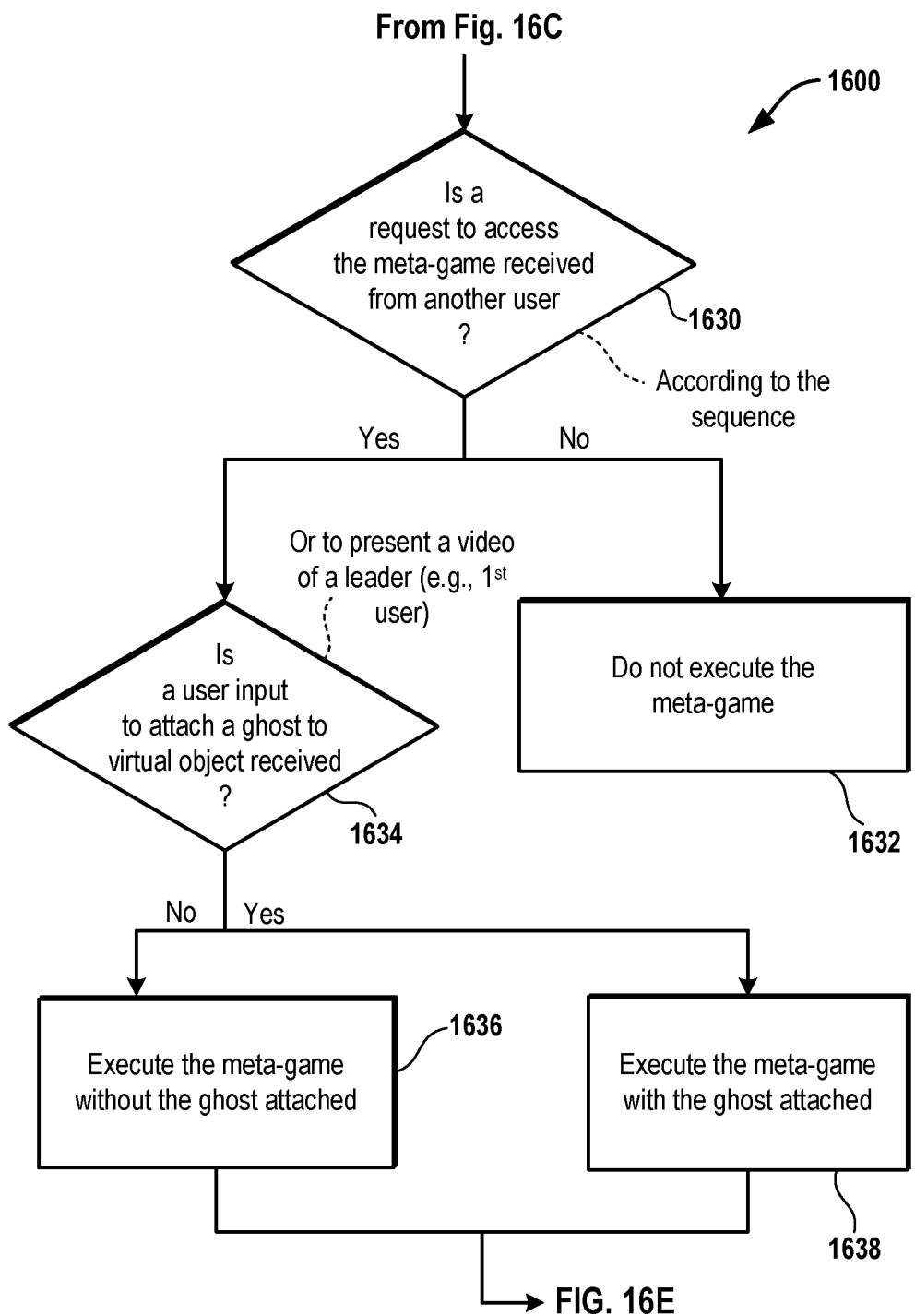
FIG. 16D is a continuation of the flowchart of FIG. 16C.

FIG. 16D is a continuation of the flowchart of FIG. 16C. In an operation 1630 of the method 1600, the CPU 1308 (FIG. 13) determines whether a request to access the meta-game is received from the user 2. For example, the CPU 1308 determines whether the request to access the meta-game is received from the client device 1303 (FIG. 13) via the user account 2 and the computer network 408 (FIG. 13). In the example, the request to access the meta-game is also a request to execute the meta-game. Further, in the example, the user 2 selects one or more buttons on the hand-held controller 1212 (FIG. 13) to generate a signal including the request to access the meta-game. The signal is generated by the hand-held controller 1212.

In response to determining that the request to access the meta-game is not received, in an operation 1632, the CPU 1308 does not execute the meta-game. On the other hand, upon determining that the request to access the meta-game is received, in an operation 1634 of the method 1600, the CPU 1308 determines whether a user input to attach one or more ghosts to corresponding one or more virtual objects is received. As an example of the operation 1634, it is determined whether the user input to overlay the ghost is received from the client device 1303 via the user account 2 and the computer network 408. In the example, the user input is a signal that is generated by the hand-held controller 1212 when the user 2 selects one or more buttons on the hand-held controller 1212. As another example, the one or more ghosts include a first ghost and a second ghost, and the corresponding one or more virtual objects include a first virtual object and the second virtual object. The first ghost is attached to the first virtual object and the second ghost is attached to the second virtual object. The first virtual object is controlled by each user 1 and 2 via their corresponding hand-held controller 414 and 1212 during a play of the challenge 1. The second virtual object is controlled by each user 1 and 2 via their corresponding hand-held controller 414 and 1212 during a play of the challenge 2. An illustration of a ghost includes an overlay virtual object, such as an overlay virtual character. Moreover, in the illustration, a display of the ghost is more transparent compared to a display of a virtual object on which the ghost is overlaid. Also, in the illustration, the ghost has a similar shape or the same shape as that of the virtual object. As another illustration, a ghost is an underlay virtual object, such as an underlay virtual character. In the illustration, a display of the ghost is more transparent compared to a display of a virtual object on which the ghost is overlaid. Also, in the illustration, the ghost has a similar shape or the same shape as that of the virtual object.

In an operation 1636 of the method 1600, upon determining that the user input to attach one or more ghosts to corresponding one or more virtual objects is not received, the CPU 1308 executes the meta-game without attaching the one or more ghosts to the corresponding one or more virtual objects. For example, in response to determining that the user input for the overlay is not received, the CPU 1308 does not overlay the first ghost on the first virtual object and does not overlay the second ghost on the second virtual object.

On the other hand, during an operation 1638 of the method, in response to determining that the user input for attaching one or more ghosts on corresponding one or more virtual objects is received, the CPU 1308 attaches the one or ghosts on the corresponding one or more virtual objects during a play of the meta-game by the user 2.

As an example, the CPU 1308 executes the ghost request hook 1514, to access the recordings 1 and 2 from the memory device 1314 (FIG. 13) and parses the recordings 1 and 2. The recordings 1 and 2 are parsed to identify one or more virtual objects, such as a first virtual object and a second virtual object, that are controlled by the user 1 via the user account 1 and the hand-held controller 414 (FIG. 13) during a play of the challenges 1 and 2. The CPU 1308 generates a first ghost that has a similar or the same shape as that of the first virtual object controlled by the user 1 via the user account 1 during a play of the challenge 1 and generates a second ghost that has a similar or the same shape as that of the second virtual object controlled by the user 1 via the user account 1 during a play of the challenge 2. As an illustration, the first and second virtual objects in the preceding example are the same. To further illustrate, each of the first and second virtual object is a virtual fighter jet or a virtual character. As another illustration, the first and second virtual objects in the preceding example are different. To further illustrate, the first virtual object is a virtual fighter jet and the second virtual object is a virtual character.

As another example, the CPU 1308 executes the ghost request hook 1514 to access the recording 1 from the memory device 1304 (FIG. 13) and determine, from the recording 1, times at which a virtual object is at various positions and orientations. An illustration of the times includes the time t1, the time t2, the time t3, the time t4, and the time t5. Continuing with the example, the CPU 1308 calculates the times from a start of execution of a portion of the legacy game N by the CPU 1308 for facilitating a play of the challenge 1 and stores the times within the recording 1. The portion is executed to facilitate the play, which is stored as the recording 1. As such, the times from the start of execution of the portion are the same as times from a start of the recording 1. The CPU 1308 executes the ghost request hook 1514 (FIG. 15A) to represent the virtual object as a ghost and move the ghost based on the times corresponding to the challenge 1. In the example, when the portion of the legacy game N is accessed via the user account 2 for facilitating a play of the challenge 1, the GPU 1310 (FIG. 13) displays a virtual object and the ghost at the same position and orientation at the time t1 as that stored within the recording 1. The time t1 is calculated by the CPU 1308 from a start of execution of the portion of the legacy game N accessed via the user account 2. The CPU 1308 determines whether the time has changed from t1 to t2 and instructs the GPU 1310 to display the ghost at a position and orientation corresponding to the time t2. The position and orientation corresponding to the time t2 are stored in the recording 1. Also, the CPU 1308 determines whether the time has changed from t2 to t3 and instructs the GPU 1310 to display the ghost at a position and orientation corresponding to the time t3. The position and orientation corresponding to the time t3 are stored in the recording 1.

As another example, the CPU 1308 accesses the recording 2 from the memory device 1304 (FIG. 13) and determines, from the recording 2, times at which a virtual object is at various positions and orientations. An illustration of the times include the time ta, the time tb, the time tc, the time td, and the time te. Continuing with the example, the CPU 1308 calculates the times from a start of execution of a portion of the legacy game N by the CPU 1308 for facilitating a play of the challenge 2 and stores the times within the recording 2. The portion is executed to facilitate the play, which is recorded as the recording 2. As such, the times from the start of execution of the portion are the same as times from a start of the recording 2. The CPU 1308 represents the virtual object as a ghost and moves the ghost based on the times corresponding to the challenge 2. When the portion of the legacy game N is accessed via the user account 2 for facilitating a play of the challenge 2, the GPU 1310 displays a virtual object and the ghost at the same position and orientation at the time ta as that stored in the recording 2. The time ta is calculated by the CPU 1308 from a start of execution of the portion of the legacy game N accessed via the user account 2. The CPU 1308 determines whether the time has changed from ta to tb and instructs the GPU 1310 to display the ghost at a position and orientation corresponding to the time tb. The position and orientation corresponding to the time tb are stored in the recording 2. Also, the CPU 1308 determines whether the time has changed from tb to tc and instructs the GPU 1310 to display the ghost at a position and orientation corresponding to the time tc. The position and orientation corresponding to the time tc are stored in the recording 2.

As yet another example, when the user 2 accesses the challenge 1 via the client device 1303 and the user account 2, the CPU 1308 instructs the GPU 1310 (FIG. 13) to render the first ghost on top of the first virtual object. In the example, when the user 2 accesses the challenge 2 via the client device 1303 and the user account 2, the CPU 1308 instructs the GPU 1310 to render the second ghost on top of the second virtual object. To illustrate, the first ghost represents the same character as the first virtual object and the second ghost represents the same character as the second virtual object. To further illustrate, when the first virtual object is a shooter, the first ghost is a shooter and when the second virtual object is a virtual plane, the second ghost is also virtual plane. As another example, when the user 2 accesses the challenge 1 via the client device 1303 and the user account 2, the CPU 1308 instructs the GPU 1310 (FIG. 13) to display the first ghost under the first virtual object as an underlay virtual object. In the example, when the user 2 accesses the challenge 2 via the client device 1303 and the user account 2, the CPU 1308 instructs the GPU 1310 (FIG. 13) to display the second ghost under the second virtual object as an underlay virtual object.

It should be noted that in the preceding two examples, there is no link between movement of the first virtual object and the first ghost and the second virtual object and the second ghost. For example, the first virtual object is controlled by the user 2 via the hand-held controller 1212 (FIG. 13) and the first ghost is displayed according to game play of the challenge 1 by the user 1. In the example, the overlay or the underlay of the first ghost with respect to the first virtual object occurs at a time of start of play of the challenge 1 by the user 2 via the user account 2. Also, in the example, after some play time during the challenge 1, the first ghost is a different position and orientation than a position and orientation of the first virtual object. As another example, the second virtual object is controlled by the user 2 via the hand-held controller 1212 (FIG. 13) and the second ghost is displayed according to game play of the challenge 2 by the user 1. In the example, the overlay or the underlay of the second ghost with respect to the second virtual object occurs at a time of start of play of the challenge 2 by the user 2 via the user account 2. Also, in the example, after some play time during the challenge 2, the second ghost is a different position and orientation than a position and orientation of the second virtual object.

It should be noted that the meta-game is executed in the operation 1636 or in the operation 1638 according to the sequence indicated by the graphical button 1554 or 1556 (FIG. 15B). For example, when an indication of selection of the graphical button 1554 is received, the block dispatcher 302 executes one or more of the basic blocks 101-105 after executing one or more of the basic blocks 1-5 to execute the meta-game. On the other hand, when an indication of selection of the graphical button 1556 is received, the block dispatcher 302 executes one or more of the basic blocks 1-5 after executing one or more of the basic blocks 101-105 to execute the meta-game.

In one embodiment, instead of attaching one or more ghosts to corresponding one or more virtual objects, based on the operations 1634 and 1638, one or more videos, such as one or more videos of game play by the user 1 of the meta-game or one or more videos of the user 1 playing the meta-game, are displayed during a play of the meta-game by the user 2 via the user account 2. For example, instead of the operation 1634, the CPU 1308 determines whether a user input to overlay one or more videos of game play of the meta-game by the user 1 via the client device 1301 and the user account 1 is received from the user 2 via the client device 1303 and the user account 2. The user input includes a signal that is generated by the hand-held controller 1212 when the user 2 selects one or more buttons on the hand-held controller. In response to determining that the user input is not received, instead of the operation 1636, the meta-game is executed without overlaying the one or more videos. On the other hand, upon determining that the user input is received, instead of executing the operation 1638, the CPU 1308 executes the gameplay hook to overlay the one or more videos on the meta-game. For example, the CPU 1308 accesses the recordings 1 and 2 from the memory device 1314 (FIG. 13), overlays a first video of the recording 1 during execution of the first challenge for play by the user 2, and overlays a second video of the recording 2 during execution of the second challenge for play by the user 2. The CPU 1308 controls the recorder 1302 to record the first video during execution of the challenge 1 via the user account 1 and record the second video during execution of the challenge 2 via the user account 1.

In an embodiment, a ghost is rendered by the GPU 1310 by using a different rendering factor, such as a different color, or intensity, or texture, or shape, or a combination thereof, than a virtual object. The ghost is to be attached to the virtual object.

Figure 16E:
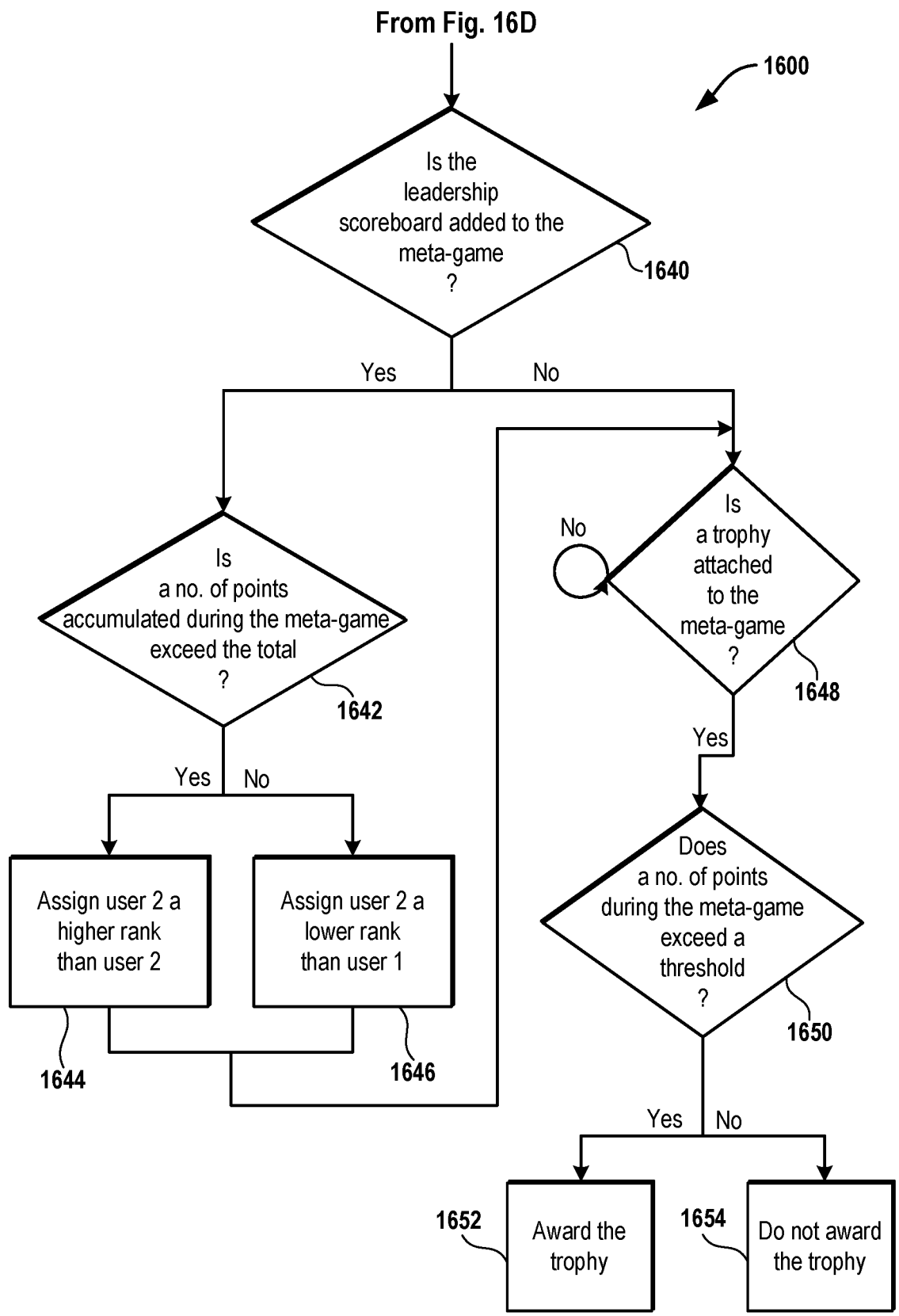
FIG. 16E is a continuation of the flowchart of FIG. 16D.

FIG. 16E is a continuation of the flowchart of FIG. 16D. In an operation 1640, the CPU 1308 (FIG. 13) determines whether the leadership scoreboard is added to the meta-game. For example, when the leadership scoreboard is added to the meta-game in the operation 1622 (FIG. 16C), an identifier indicating that the leadership scoreboard is added to the meta-game is stored by the CPU 1308 within the cache 102. The CPU 1308, checks, in the operation 1640, the cache 102 to find the identifier. Upon finding identifier, it is determined that the leadership scoreboard is added to the meta-game. When the identifier is not found, the CPU 1308 determines that the leadership scoreboard is not added to the meta-game.

In response to determining that the leadership scoreboard is added to the meta-game, in an operation 1642 of the method 1600, the CPU 1308 determines whether a number of points accumulated during a play of the meta-game by the user 2 via the user account 2 exceeds the total number of points published, in the operation 1626 (FIG. 16C), to the leadership scoreboard. The total number of points of the meta-game is accumulated by the user 1 via the user account 1 during a play of the meta-game. It should be noted that the play of the meta-game by the user 2 starts in the operation 1636 (FIG. 16D). As an example, the CPU 1308 determines that a first number of virtual points is accumulated by the user 1 via the user account 1 during a play of the challenge 1 and a second number of virtual points is accumulated by the user 1 via the user account 1 during a play of the challenge 2. The CPU 1308 multiplies the first number with a first balancing constant to output a first result and the second number with a second balancing constant to output a second result, and adds the first and second results to determine a first total. Similarly, the CPU 1308 determines that a third number of virtual points is accumulated by the user 2 via the user account 2 during a play of the challenge 1 and a fourth number of virtual points is accumulated by the user 2 via the user account 2 during a play of the challenge 2. The CPU 1308 multiplies the third number with the first balancing constant to output a third result and the fourth number with the second balancing constant to output a fourth result, and adds the third and fourth results to determine a second total. The CPU 1308 determines whether the second total is greater than the first total.

In response to determining, in the operation 1642, that the number of points accumulated during a play of the meta-game by the user 2 via the user account 2 exceeds the total number of points published in the operation 1626, the CPU 1308 assigns, in an operation 1644, a higher rank or a higher order to the user account 2 than the user account 1. For example, upon determining that the second total is greater than the first total in the preceding example, the CPU 1308 determines that the user 2 is the leader and adds the user ID2 assigned to the user 2 to the leadership scoreboard. The CPU 1308 controls the GPU 1310 (FIG. 13) to render the user ID2 above the user ID1.

On the other hand, upon determining, in the operation 1642, that the number of points accumulated during a play of the meta-game by the user 2 via the user account 2 does not exceed the total number of points published in the operation 1626, the CPU 1308 assigns, in an operation 1646, a lower rank to the user account 2 than the user account 1. For example, upon determining that the second total is not greater than the first total, the CPU 1308 determines that the user 1 is still the leader and adds the user ID2 assigned to the user 2 to the leadership scoreboard. The CPU 1308 controls the GPU 1310 (FIG. 13) to render the user ID2 below the user ID1.

In response to determining that the leadership scoreboard is not added to the meta-game in the operation 1640, the CPU 1308 determines, in an operation 1648, whether a trophy is attached to the meta-game. For example, when the trophy is attached to the meta-game in the operation 1628 (FIG. 16C), an identifier indicating that the trophy is included within the meta-game is stored by the CPU 1308 within the cache 102. The CPU 1308, checks, in the operation 1648, the cache 102 to find the identifier. Upon finding the identifier, it is determined that the trophy is attached to the meta-game. When the identifier is not found, the CPU 1308 determines that the trophy is not attached to the meta-game.

The CPU 1308 continues to check whether the trophy is attached to the meta-game upon determining that the trophy is not attached to the meta-game. On the other hand, in response to determining that the trophy is attached to the meta-game, in an operation 1650 of the method 1600, the CPU 1308 determines whether a number of points accumulated during a play of the meta-game via the user account 2 by the user 2 exceeds the pre-determined limit. For example, the CPU 1308 determines whether the second total accumulated during a play of the meta-game via the user account 2 is greater than the pre-determined number of points associated with the operation 1628 (FIG. 16C).

Upon determining that the number of points exceeds the pre-determined limit, the CPU 1308 determines to award the trophy to the user account 2 in an operation 1652 of the method 1600. An example, of the trophy is an accolade or a virtual reward, such as a virtual skin or a number of virtual points or a game level in the meta-game. The game level is unlocked to provide the trophy. Before the trophy is awarded, the game level is locked and cannot be accessed by the user 2 via the user account 2. On the other hand, when it is determined that the number of points does not exceed the pre-determined threshold, the CPU 1308 determines not to award the trophy to the user account 2 in an operation 1654 of the method 1600.

Figure 17:
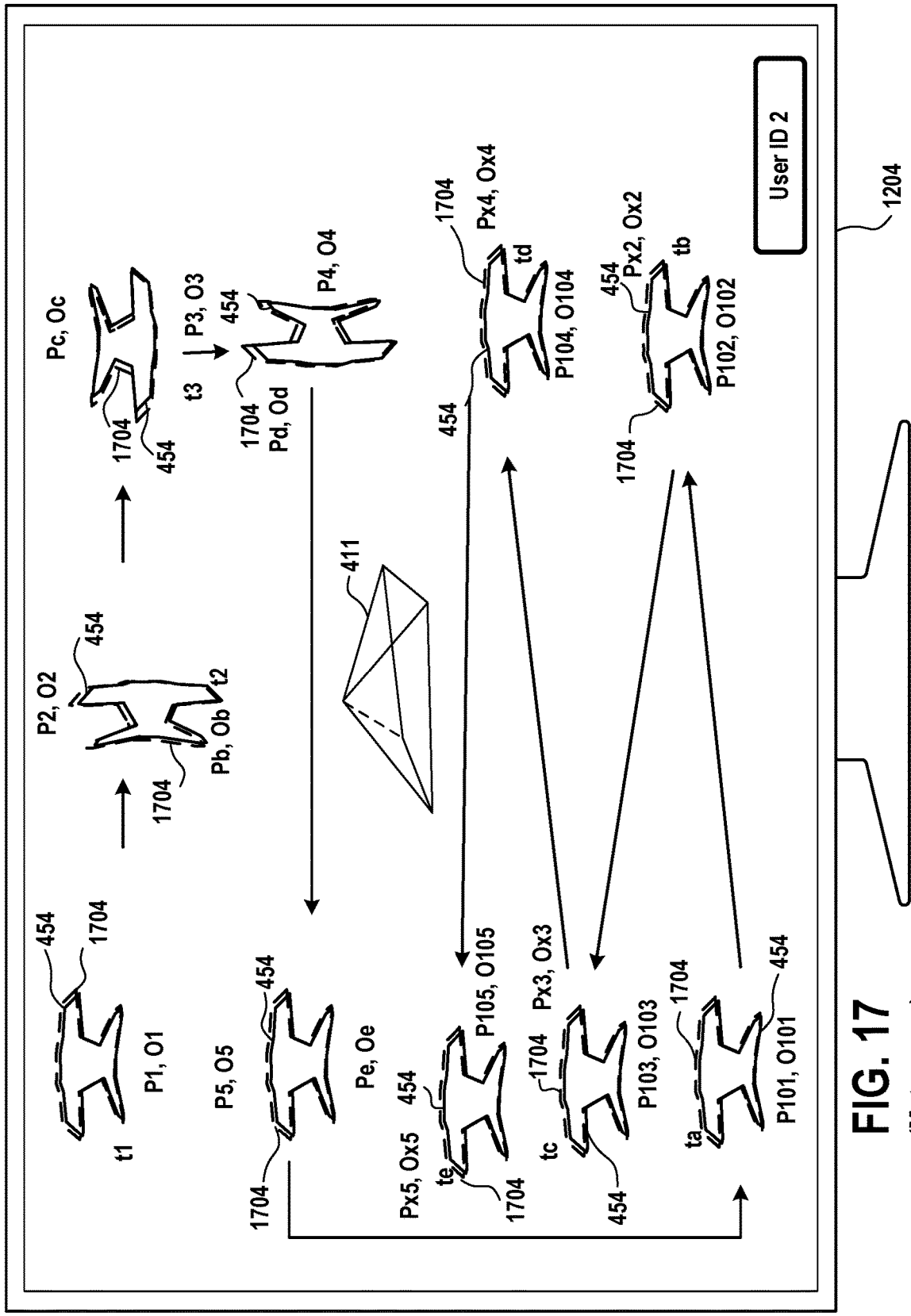
FIG. 17 is a diagram to illustrate an embodiment of the meta-game with a ghost displayed on a second display device.

FIG. 17 is a diagram to illustrate an embodiment of the meta-game with a ghost displayed on the display device 1204. During a play of the challenges 1 and 2 of the meta-game by the user 2 via the user account 2, the virtual object 454 is displayed on the display screen 1204. The virtual object 454 is rendered by the GPU 1310 (FIG. 13) on the display device 1204.

To facilitate a play of the challenge 1 via the user account 2, the CPU 1308 executes the same portion of the meta-game that is executed to facilitate a play of the challenge 1 via the user account 1. For example, the CPU 1308 executes a first portion of the legacy game N to facilitate a play of the legacy game N via the user account 1 and executes the first portion to facilitate a play of the legacy game N via the user account 2. Similarly, to facilitate a play of the challenge 2 via the user account 2, the CPU 1308 executes the same portion of the meta-game that is executed to facilitate a play of the challenge 2 via the user account 1. For example, the CPU 1308 executes a second portion of the legacy game N to facilitate a play of the legacy game N via the user account 1 and executes the second portion to facilitate a play of the legacy game N via the user account 2. As another example, the CPU 1308 executes a portion of the legacy game (N–1) to facilitate a play of the legacy game (N–1) via the user account 1 and executes the portion to facilitate a play of the legacy game (N–1) via the user account 2.

At the time t1, which is a time of start of the play of the challenge 1 of the meta-game, the virtual object 454 is displayed at the position P1 and the orientation O1 on a display screen of the display device 1204. Also, at the time t1, a virtual ghost 1704 is overlaid on top of the virtual object 454. The virtual ghost 1704 is rendered by the GPU 1310 on the display device 1204. The virtual ghost 1704 is at the same position P1 and the same orientation O1 as that of the virtual object 454 at the time t1. The virtual ghost 1704 is a representation of the virtual object 454 (FIG. 14C). The virtual ghost 1704 is illustrated using dashed lines in FIG. 17 and the virtual object 454 is illustrated using solid lines in FIG. 17.

During the play of the challenge 1, the virtual object 454 is moved by the user 2 via the hand-held controller 1212 (FIG. 13) from the position P1 and the orientation O1 to a position Pb and an orientation Ob. At the time t2 at which the virtual object 454 is at the position Pb and the orientation Ob, the virtual ghost 1704 is at the position P2 and an orientation O2. The position Pb is different from the position P2 and the orientation Ob is different from the orientation O2.

Thereafter, during the play of the challenge 1, the virtual object 454 is moved by the user 2 via the hand-held controller 1212 from the position Pb and the orientation Ob to a position Pc and an orientation Oc. At the time t3 at which the virtual object 454 is at the position Pc and the orientation Oc, the virtual ghost 1704 is at the position P3 and an orientation O3. The position Pc is different from the position P3 and the orientation Oc is different from the orientation O3.

Furthermore, during the play of the challenge 1, the virtual object 454 is moved by the user 2 via the hand-held controller 1212 from the position Pc and the orientation Oc to a position Pd and an orientation Od. At the time t4 at which the virtual object 454 is at the position Pd and the orientation Od, the virtual ghost 1704 is at the position P4 and an orientation O4. The position Pd is different from the position P4 and the orientation Od is different from the orientation O4.

Also, during the play of the challenge 1, the virtual object 454 is moved by the user 2 via the hand-held controller 1212 from the position Pd and the orientation Od to a position Pe and an orientation Oe. At the time t5 at which the virtual object 454 is that the position Pe and the orientation O5, the virtual ghost 1704 is at the position P5 and the orientation O5. The position Pe is different from the position P5 and the orientation Oe is different from the orientation O5.

The positions P1, Pb, Pc, Pd, and Pe and the orientations O1, Ob, Oc, Od, and Oe of the virtual object 454 occur during execution of a portion of the legacy game N for facilitating a play of the challenge 1. The portion corresponds to the challenge 1 when accessed via the user account 2. Also, the positions P1 through P5 and the orientations O1 through 5 of the virtual ghost 1704 occur during execution of the same portion of the legacy game N when accessed via the user account 1.

At the time ta, which is a time of start of the play of the challenge 2 of the meta-game via the user account 2, the virtual object 454 is displayed at the position P101 and the orientation O101 on the display screen of the display device 1204. For example, in the meta-game, the CPU 1308 instructs the GPU 1310 to move the virtual object 454 from the position Pe to the position P101 and from the orientation Oe to the orientation O101. Also, at the time ta, the virtual ghost 1704 is overlaid on top of the virtual object 454. The virtual ghost 1704 is at the same position P101 and the same orientation O101 as that of the virtual object 454 at the time ta.

During the play of the challenge 2, the virtual object 454 is moved by the user 2 via the hand-held controller 1212 from the position P101 and the orientation O101 to a position Px2 and an orientation Ox2. At the time tb at which the virtual object 454 is at the position Px2 and the orientation Ox2, the virtual ghost 1704 is at the position P102 and the orientation O102. The position Px2 is different from the position P102 and the orientation Ox2 is different from the orientation O102.

Thereafter, during the play of the challenge 2, the virtual object 454 is moved by the user 2 via the hand-held controller 1212 from the position Px2 and the orientation Ox2 to a position Px3 and an orientation Ox3. At the time tc at which the virtual object 454 is at the position Px3 and the orientation Ox3, the virtual ghost 1704 is at the position P103 and the orientation O103. The position Px3 is different from the position P103 and the orientation Ox3 is different from the orientation O103.

Furthermore, during the play of the challenge 2, the virtual object 454 is moved by the user 2 via the hand-held controller 1212 from the position Px3 and the orientation Ox3 to a position Px4 and an orientation Ox4. At the time td at which the virtual object 454 is at the position Px4 and the orientation Ox4, the virtual ghost 1704 is at the position P104 and the orientation O104. The position Px4 is different from the position P104 and the orientation Ox4 is different from the orientation O104.

Also, during the play of the challenge 2, the virtual object 454 is moved by the user 2 via the hand-held controller 1212 from the position Px4 and the orientation Ox4 to a position Px5 and an orientation Ox5. At the time to at which the virtual object 454 is at the position Px5 and the orientation Ox5, the virtual ghost 1704 is at the position P105 and the orientation O105. The position Px5 is different from the position P105 and the orientation Ox5 is different from the orientation O105.

The positions P101, Px2, Px3, Px4, and Px5 and the orientations O101, Ox2, Ox3, Ox4, and Ox5 through O105 of the virtual object 454 occur during execution of a portion of the meta-game, such as a portion of the legacy game N or a portion of the legacy game (N−1), for facilitating a play of the challenge 2. The portion of the meta-game is accessed via the user account 2. Also, the positions P101 through P105 and the orientations O101 through O105 of the virtual ghost 1704 occur during execution of the same portion of the meta-game when accessed via the user account 1.

It should be noted that during a play of the meta-game, the virtual pyramid 411 is rendered by the GPU 1310 at a position around which the challenges 1 and 2 are performed. For example, the positions P1, Pb, Pc, Pd, and Pe are achieved above the virtual pyramid 411 and the positions P101, Px2, Px3, Px4, and Px5 are achieved below the virtual pyramid 411.

Figure 18A:
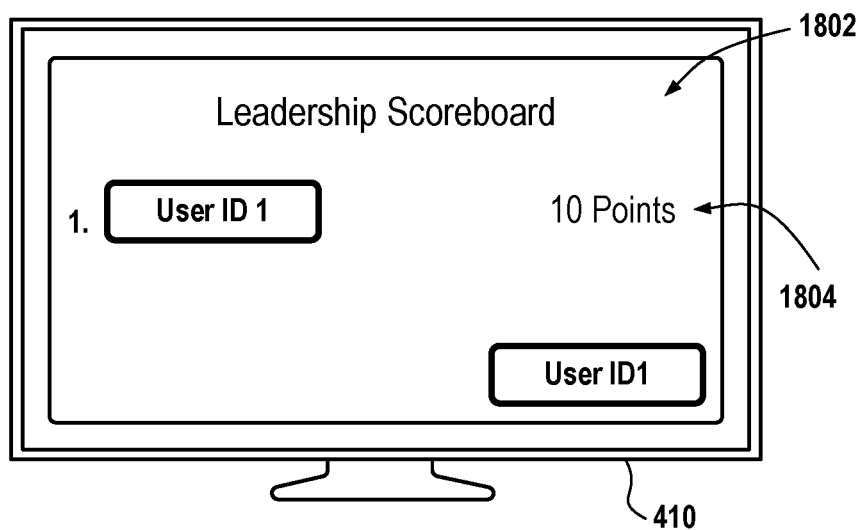
FIG. 18A is a diagram of an embodiment of the leadership scoreboard that is displayed on the first display device.

FIG. 18A is a diagram of an embodiment of a leadership scoreboard 1802 that is displayed on the display device 410 operated by the user 1. The leadership scoreboard 1802 includes a row 1804, which includes a number of points that are accumulated by the user 1 via the user account 1 during a play of the meta-game. The leadership scoreboard 1802 is accessed by the user 1 after logging into the user account 1.

Figure 18B:
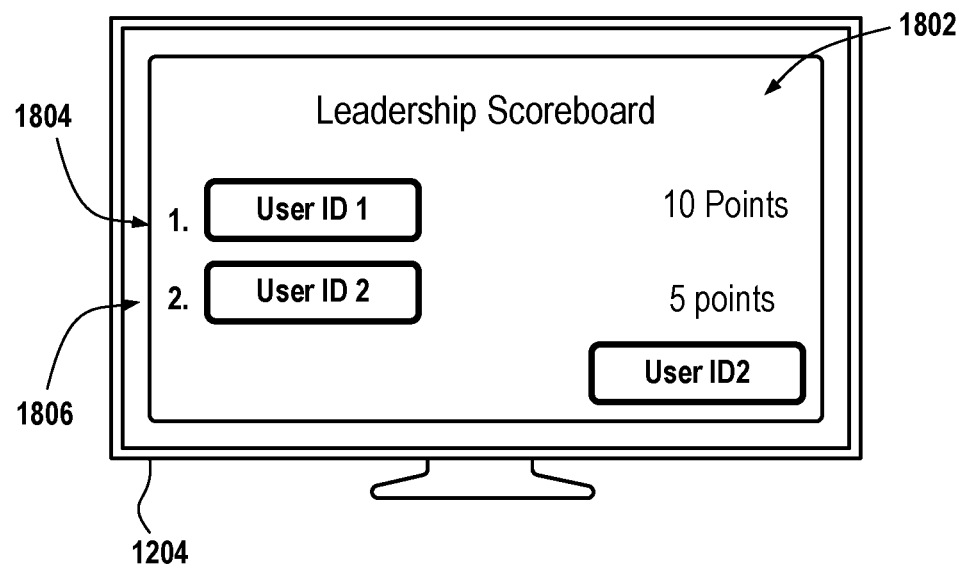
FIG. 18B is a diagram of an embodiment of the leadership scoreboard that is displayed on the second display device.

FIG. 18B is a diagram of an embodiment of the leadership scoreboard 1802 that is displayed on the display device 1204 operated by the user 2. The leadership scoreboard 1802 includes an additional row 1806. The additional row 1806 includes the user ID2 and a number of points accumulated by the user 2 via the user account 2 during a play of the meta-game. It should be noted that the user 1 has accumulated a higher number of points compared to the user 2, and therefore the user ID1 is displayed in the row 1804. The row 1804 is at a higher level compared to the row 1806. As such, the number of points accumulated by the user 1 is ordered or ranked higher than the number of points accumulated by the user 2.

Figure 19:
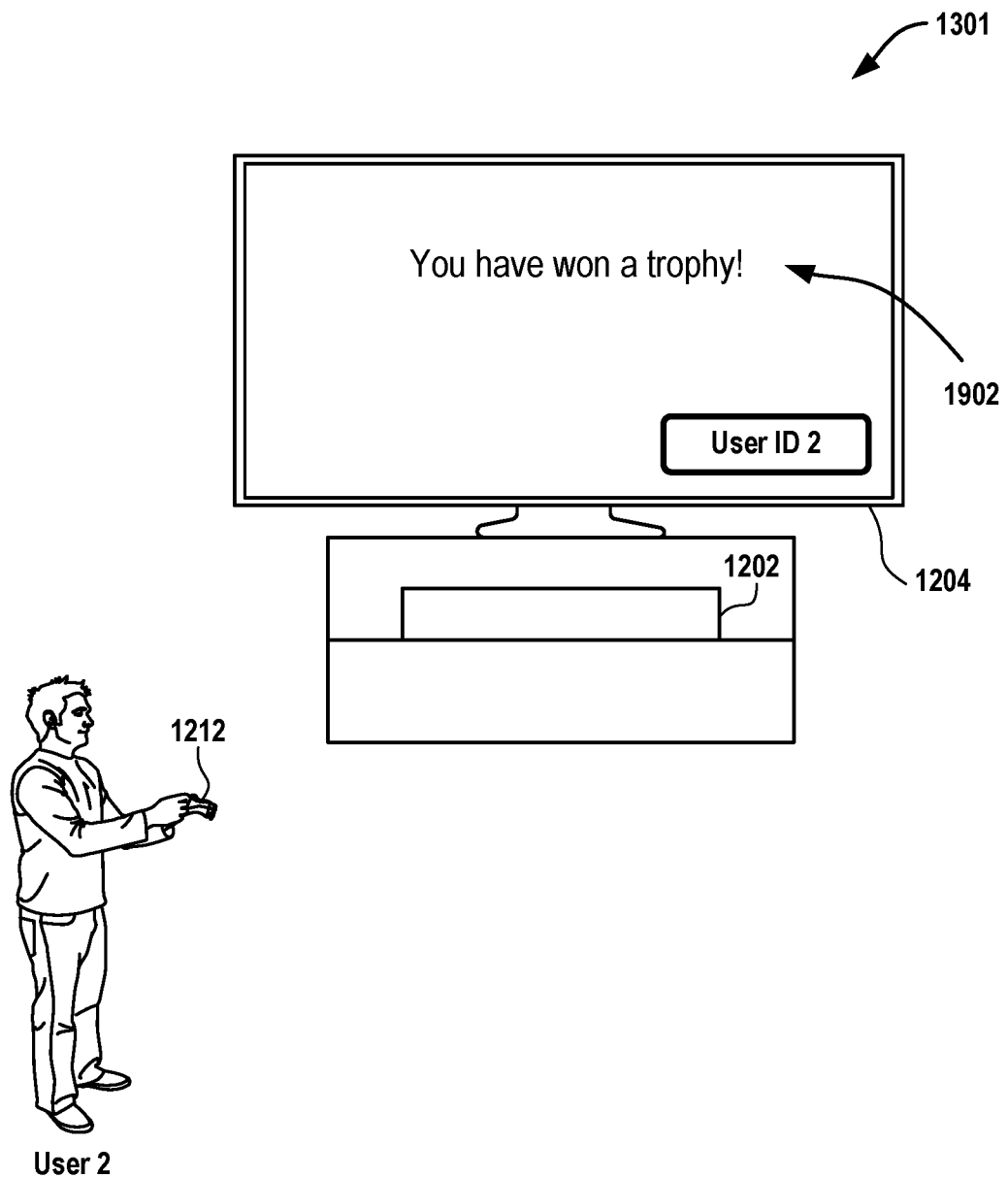
FIG. 19 is a diagram of an embodiment of the second display device to illustrate a notification indicating that a user has won a trophy after a play of the meta-game.

FIG. 19 is a diagram of an embodiment of the display device 1204, operated by the user 2, to illustrate a notification 1902 indicating that the user 2 has won a trophy after a play of the meta-game. As an example, the notification 1902 includes a textual description, such as a sentence or a phrase. As another example, a notification indicating that their user 2 has won the trophy in the user account 2 includes a series of alphanumeric characters or symbols or graphics or a combination thereof.

In one embodiment, a notification indicating that the user 2 has won a trophy includes a reward. The reward is won by the user 2 via the user account 2. For example, the notification includes that the user 2 can now access a game level of the meta-game. The game level cannot be accessed by the user 2 via the user account 2 before winning the trophy. As another example, the notification includes a number of virtual points that are awarded to the user 2 by the CPU 1308 (FIG. 13) via the user account 2.

Figure 20:
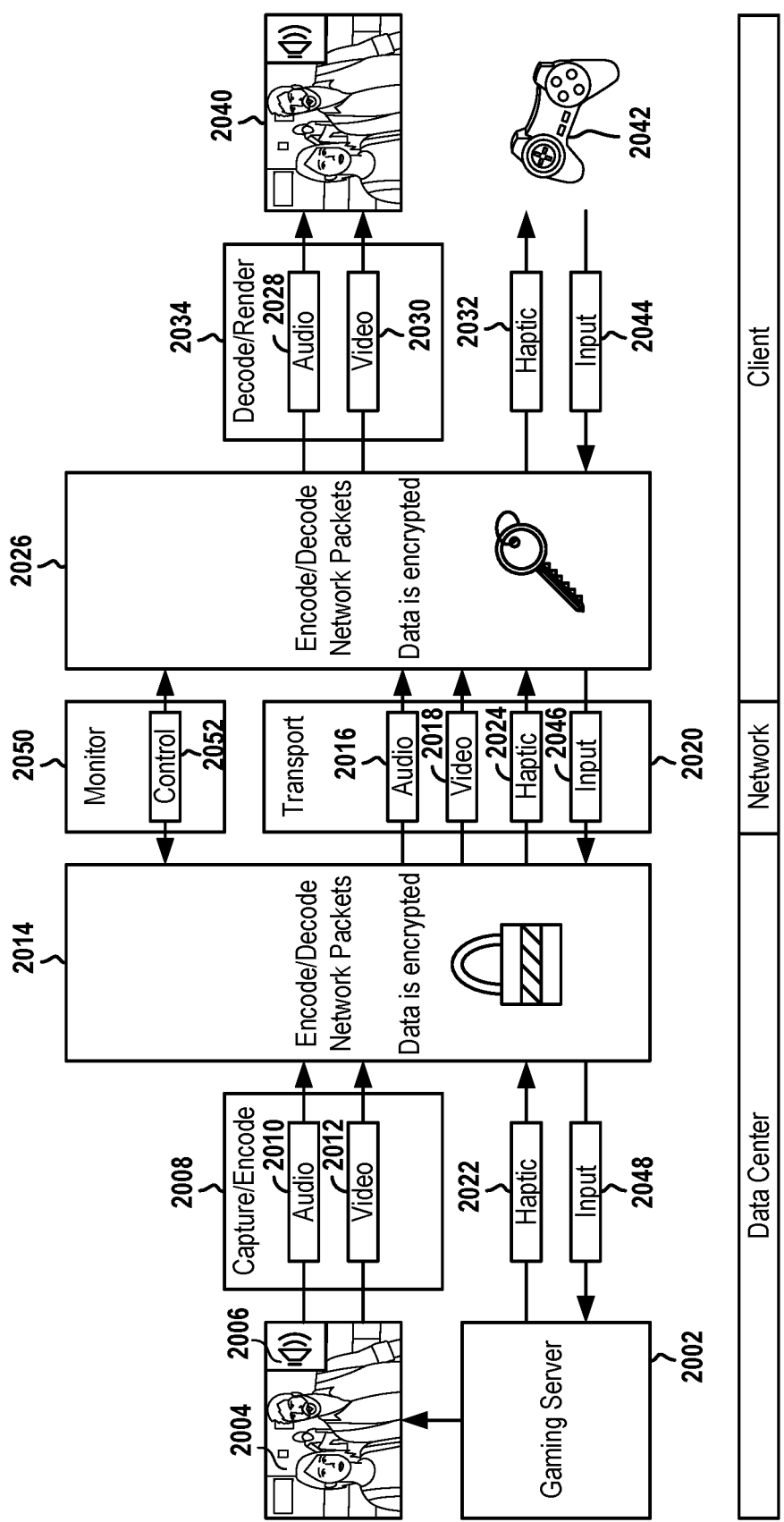
FIG. 20 is a flow diagram conceptually illustrating various operations, which are performed for streaming a cloud video game to a client device, in accordance with implementations of the present disclosure.

FIG. 20 is a flow diagram conceptually illustrating various operations which are performed for streaming a cloud video game to a client device, in accordance with implementations of the disclosure. Examples of the client device include a game controller, a smart phone, a game console, and a computer. A game server 2002 executes a video game, such as the meta-game or the legacy game N, and generates raw (uncompressed) video 2004 and audio 2006. A virtual environment, such as the virtual environment 452 (FIG. 4A), a virtual scene illustrated in FIG. 14, a virtual scene illustrated in FIG. 17A, or a virtual scene illustrated in FIG. 17C, and audio output during presentation of the virtual environment are examples of the video 2004 and audio 2006. The game server 2002 is an example of the server system 404 (FIG. 4A). The video 2004 and audio 2006 are captured and encoded for streaming purposes, as indicated at reference 2008 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 2010 and encoded video 2012 are further packetized into network packets, as indicated at reference numeral 2014, for purposes of transmission over a computer network 2020, which is an example of the computer network 408 (FIGS. 4A and 13). In some embodiments, the network packet encoding process also employs a data encryption process, thereby providing enhanced data security. In the illustrated implementation, audio packets 2016 and video packets 2018 are generated for transport over the computer network 2020.

The game server 2002 additionally generates haptic feedback data 2022, which is also packetized into network packets for network transmission. In the illustrated implementation, haptic feedback packets 2024 are generated for transport over the computer network 2020.

The foregoing operations of generating the raw video and audio and the haptic feedback data are performed on the game server 2002 of a data center, and the operations of encoding the video and audio, and packetizing the encoded audio/video and haptic feedback data for transport are performed by the streaming engine of the data center. As indicated, the audio, video, and haptic feedback packets are transported over the computer network 2020. As indicated at reference 2026, the audio packets 2016, video packets 2018, and haptic feedback packets 2024, are disintegrated, e.g., parsed, etc., by the client device to extract encoded audio 2028, encoded video 2030, and haptic feedback data 2022 at the client device from the network packets. If data has been encrypted, then the data is also decrypted. The encoded audio 2028 and encoded video 2030 are then decoded by the client device, as indicated at reference 2034, to generate client-side raw audio and video data for rendering on a display device 2040 of the client device. The haptic feedback data 2022 is processed by a processor of the client device to produce a haptic feedback effect at a controller device 2024 or other interface device, e.g., the HMD, etc., through which haptic effects can be rendered. The controller device 2024 is an example of a hand-held controller of the client device. One example of a haptic effect is a vibration or rumble of the controller device 2024.

It will be appreciated that a video game is responsive to player inputs, and thus, a similar procedural flow to that described above for transmission and processing of player input, but in the reverse direction from client device to server, is performed. As shown, the controller device 2024 or another input component, e.g., a body part of the user 1, a body part of the user 2, etc., or a combination thereof generates input data 2048. The input data 2048 is packetized at the client device for transport over the computer network 2020 to the data center. Input data packets 2046 are unpacked and reassembled by the game server 2002 to define the input data 2048 on the data center side. The input data 2048 is fed to the game server 2002, which processes the input data 2048 to generate a game state of the video game.

During transport via the computer network 2020 of the audio packets 2016, the video packets 2018, and haptic feedback packets 2024, in some embodiments, the transmission of data over the computer network 2020 is monitored to ensure a quality of service. For example, network conditions of the computer network 2020 are monitored as indicated by reference 2050, including both upstream and downstream network bandwidth, and the game streaming is adjusted in response to changes in available bandwidth. That is, the encoding and decoding of network packets is controlled based on present network conditions, as indicated by reference 2052.

Figure 21:
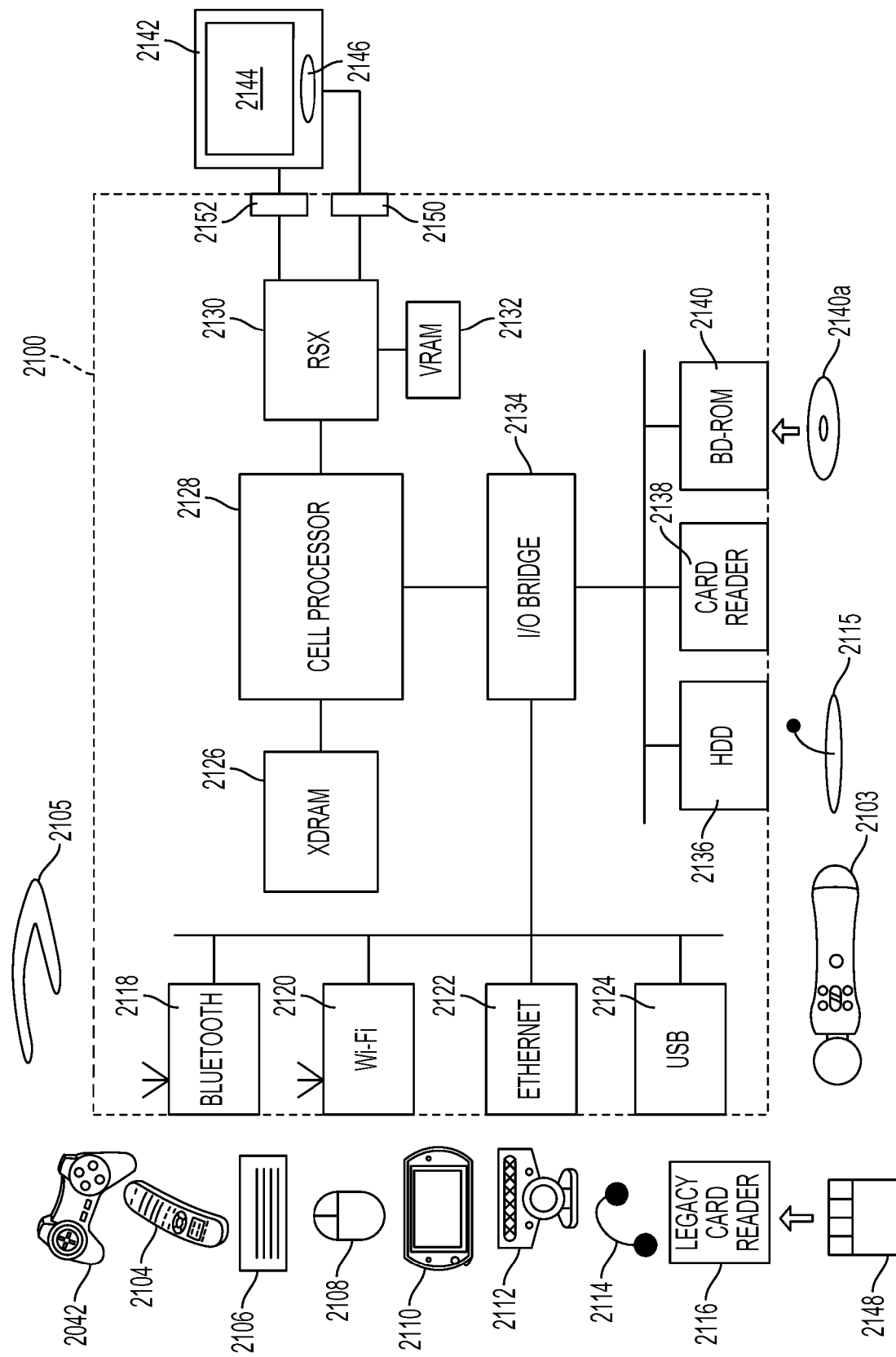
FIG. 21 is a block diagram of an embodiment of a game console that is compatible for interfacing with a display device of a client device and is capable of communicating via a computer network with a game hosting system.

FIG. 21 is a block diagram of an embodiment of a game console 2100 that is compatible for interfacing with a display device of a client device and is capable of communicating via the computer network 2020 (FIG. 20) with a game hosting system, such as the server system 404 (FIGS. 4A, 12, and 13). The game console 2100 is an example of the game console 402 or the game console 1202 (FIG. 13). The game console 2100 is located within the data center or is located at a location at which a player, such as the user 1 or 2, is located. In some embodiments, the game console 2100 is used to execute a game that is displayed on an HMD. The game console 2100 is provided with various peripheral devices connectable to the game console 2100. The game console 2100 has a cell processor 2128, a dynamic random access memory (XDRAM) unit 2126, a Reality Synthesizer graphics processor unit 2130 with a dedicated video random access memory (VRAM) unit 2132, and an input/output (I/O) bridge 2134. The game console 2100 also has a Blu Ray® Disk read-only memory (BD-ROM) optical disk reader 2140 for reading from a disk 2140a and a removable slot-in hard disk drive (HDD) 2136, accessible through the I/O bridge 2134. Optionally, the game console 2100 also includes a memory card reader 2138 for reading compact flash memory cards, memory Stick® memory cards and the like, which is similarly accessible through the I/O bridge 2134. The I/O bridge 2134 also connects to USB 2.0 ports 2124, a gigabit Ethernet port 2122, an IEEE 802.11b/g wireless network (Wi-Fi™) port 2120, and a Bluetooth® wireless link port 2118 capable of supporting Bluetooth connections.

In operation, the I/O bridge 2134 handles all wireless, USB and Ethernet data, including data from a game controller and from the HMD 2105. For example, when the player is playing the video game generated by execution of a portion of a game code, such as the game code GCN, the I/O bridge 2134 receives input data or an input signal, described herein, from a game controller 2042 (FIG. 20) or 2103 and/or from the HMD 2105 via a Bluetooth link and directs the input data to the cell processor 2128, which updates a current state of the video game accordingly. As an example, a camera within the HMD 2105 captures a gesture of the player to generate an image representing the gesture. The game controller 2042 is an example of the hand-held controller 406 or 1212 (FIG. 13).

The wireless, USB and Ethernet ports also provide connectivity for other peripheral devices in addition to the game controllers 2042 and 2103 and the HMD 2105, such as, for example, a remote control 2104, a keyboard 2106, a mouse 2108, a portable entertainment device 2110, such as, e.g., a Sony Playstation Portable® entertainment device, etc., a video camera, such as, e.g., an EyeToy® video camera 2112, etc., a microphone headset 2114, and a microphone 2115. The portable entertainment device 2110 is an example of a game controller. In some embodiments, such peripheral devices are connected to the game console 2100 wirelessly, for example, the portable entertainment device 2110 communicates via a Wi-Fi™ ad-hoc connection, whilst the microphone headset 2114 communicates via a Bluetooth link.

The provision of these interfaces means that the game console 2100 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 2116 is connected to the game console 2100 via the USB port 2124, enabling the reading of memory cards 2148 of a kind used by the game console 2100. The game controllers 2042 and 2103, and the HMD 2105 are operable to communicate wirelessly with the game console 2100 via the Bluetooth link 2118, or to be connected to the USB port 2124, thereby also receiving power by which to charge batteries of the game controller 2042 and 2103 and the HMD 2105. In some embodiments, each of the game controllers 2042 and 2103, and the HMD 2105 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 2100, and wireless devices using protocols, such as, e.g., Bluetooth, Wi-Fi, etc.

The game controller 2042 is a controller designed to be used with two hands by a player, such as the user 1 or 2, and the game controller 2103 is a single-hand controller with an attachment. The HMD 2105 is designed to fit on top of a head and/or in front of eyes of the player. In addition to one or more analog joysticks and conventional control buttons, each game controller 2042 and 2103 is susceptible to three-dimensional location determination. Similarly, the HMD 2105 is susceptible to three-dimensional location determination. Consequently, in some embodiments, gestures and movements by the player that uses the game controller 2042 and 2103 and of the HMD 2105 are translated as inputs to a game code of the video game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 2104 is also operable to communicate wirelessly with the game console 2100 via the Bluetooth link 2118. The remote control 2104 includes controls suitable for the operation of the Blu Ray™ Disk BD-ROM reader 2140 and for navigation of disk content.

The Blu Ray™ Disk BD-ROM reader 2140 is operable to read CD-ROMs compatible with the game console 2100, in addition to conventional pre-recorded and recordable CDs, and so-called Super Audio CDs. The Blu Ray™ Disk BD-ROM reader 2140 is also operable to read digital video disk-ROMs (DVD-ROMs) compatible with the game console 2100, in addition to conventional pre-recorded and recordable DVDs. The Blu Ray™ Disk BD-ROM reader 2140 is further operable to read BD-ROMs compatible with the game console 2100, as well as conventional pre-recorded and recordable Blu-Ray Disks.

The game console 2100 is operable to supply audio and video, either generated or decoded via the Reality Synthesizer graphics unit 2130, through audio connectors 2150 and video connectors 2152 to a display and sound output device 2142, such as, e.g., a monitor or television set, etc., having a display screen 2144 and one or more loudspeakers 2146, or to supply the audio and video via the Bluetooth® wireless link port 2118 to the display device of the HMD 2105. The audio connectors 2150, in various embodiments, include conventional analogue and digital outputs whilst the video connectors 2152 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 2108. An operating system of the game console 2100 supports Dolby® 5.1 surround sound, Dolby® Theatre Surround (DTS), and the decoding of 7.1 surround sound from Blu-Ray® disks. The display and sound output device 2142 is an example of the display device 410 or 1204 (FIGS. 4A and 13).

In some embodiments, a video camera, e.g., the video camera 2112, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 2100. An LED indicator of the video camera 2112 is arranged to illuminate in response to appropriate control data from the game console 2100, for example, to signify adverse lighting conditions, etc. Some embodiments of the video camera 2112 connect to the game console 2100 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 2100, an appropriate piece of software, such as, a device driver, etc., is provided.

In some embodiments, the aforementioned system devices, including the game console 2100 and the game controller 2042 or 2103, enable the HMD 2105 to display and capture video of an interactive session of the video game. The system devices initiate an interactive session of the video game. The interactive session defines interactivity between the player and other players of the video game. The system devices further determine an initial position and orientation of the game controller 2042 or 2103, and/or the HMD 2105 operated by the player. The game console 2100 determines a current state of a game based on the interactivity between the player and the video game. The system devices track a position and orientation of the game controller 2042 or 2103 and/or the HMD 2105 during an interactive session of the player with the video game. The system devices generate a spectator video stream of the interactive session based on a current state of the legacy game N and the tracked position and orientation of a hand-held controller (HHC) and/or the HMD 2105. Examples of the HHC include the controller 2042 and the controller 2103. In some embodiments, the HHC renders the spectator video stream on a display screen of the HHC. In various embodiments, the HMD 2105 renders the spectator video stream on a display screen of the HMD 2105.

Figure 22:
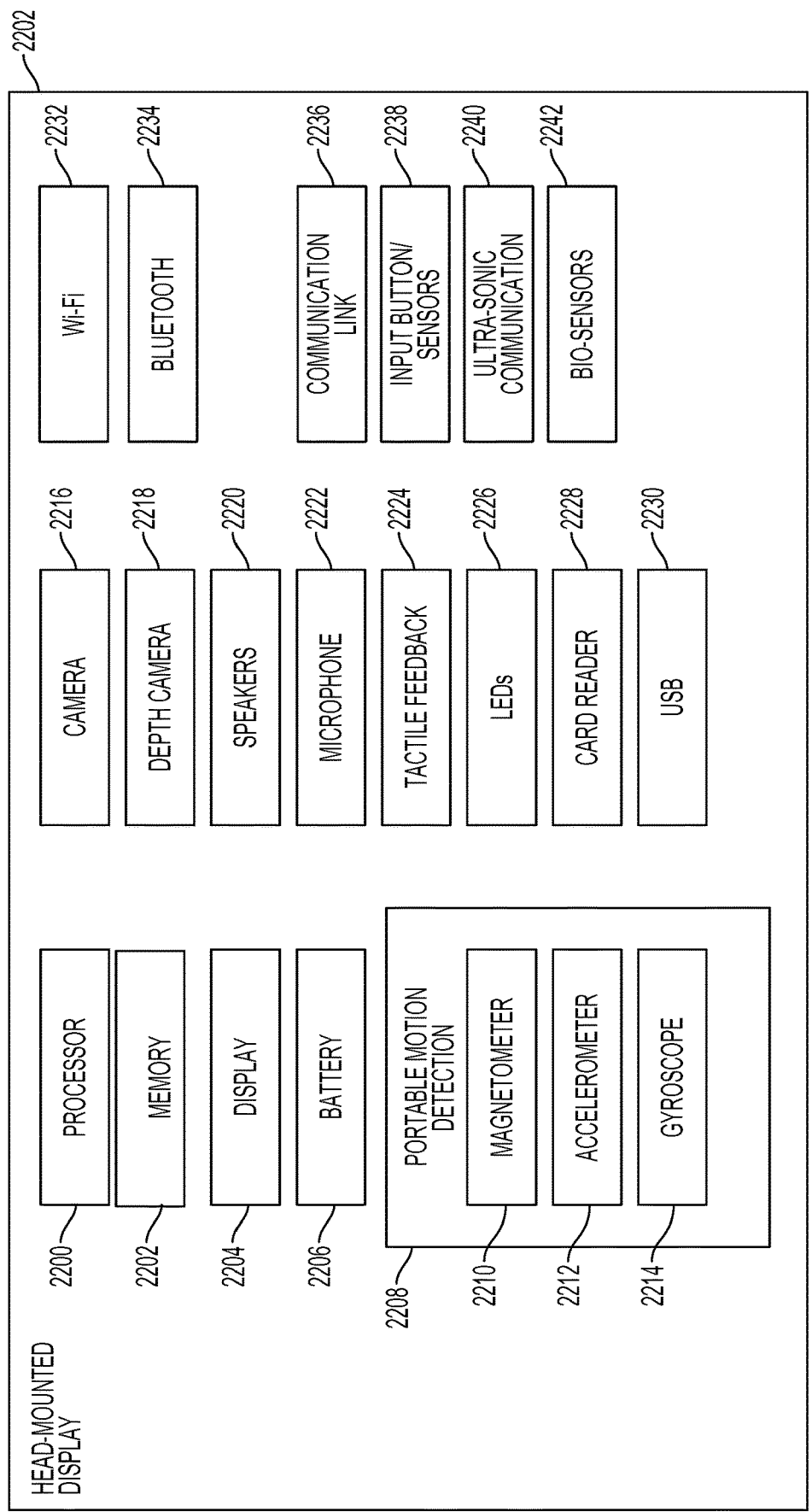
FIG. 22 is a diagram illustrating components of a head-mounted display (HMD).

With reference to FIG. 22, a diagram illustrating components of an HMD 2202 is shown. The HMD 2202 is an example of the HMD 2105 (FIG. 21). The HMD 2202 includes a processor 2200 for executing program instructions. A memory device 2202 is provided for storage purposes. Examples of the memory device 2202 include a volatile memory, a non-volatile memory, or a combination thereof. A display device 2204 is included which provides a visual interface, e.g., display of image frames generated from save data, etc., that the player views. A battery 2206 is provided as a power source for the HMD 2202. A motion detection module 2208 includes any of various kinds of motion sensitive hardware, such as a magnetometer 2210, an accelerometer 2212, and a gyroscope 2214.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 2212 are used to provide the direction of gravity, which gives an absolute reference for two angles, e.g., world-space pitch and world-space roll, etc.

A magnetometer measures a strength and a direction of a magnetic field in a vicinity of the HMD 2202. In some embodiments, three magnetometers 2210 are used within the HMD 2202, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 2214, a camera 2216, etc. In one embodiment, the accelerometer 2212 is used together with magnetometer 2210 to obtain the inclination and azimuth of the HMD 2202.

A gyroscope is a device for measuring or maintaining orientation, based on the principles of angular momentum. In one embodiment, instead of the gyroscope 2214, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 2216 is provided for capturing images and image streams of the real-world environment, e.g., room, cabin, natural environment, etc., surrounding the player. In various embodiments, more than one camera is included in the HMD 2202, including a camera that is rear-facing, e.g., directed away from the player, when the player is viewing the display of the HMD 2202, etc., and a camera that is front-facing, e.g., directed towards the player when the player is viewing the display of the HMD 2202, etc. Additionally, in several embodiments, a depth camera 2218 is included in the HMD 2202 for sensing depth information of objects in the real-world environment.

The HMD 2202 includes speakers 2220 for providing audio output. Also, a microphone 2222 is included, in some embodiments, for capturing audio from the real-world environment, including sounds from an ambient environment, and speech made by the player, etc. The HMD 2202 includes a tactile feedback module 2224, e.g., a vibration device, etc., for providing tactile feedback to the player. In one embodiment, the tactile feedback module 2224 is capable of causing movement and/or vibration of the HMD 2202 to provide tactile feedback to the player.

LEDs 2226 are provided as visual indicators of statuses of the HMD 2202. For example, an LED may indicate battery level, power on, etc. A card reader 2228 is provided to enable the HMD 2202 to read and write information to and from a memory card. A USB interface 2230 is included as one example of an interface for enabling connection of peripheral devices, or connection to other devices, such as other portable devices, computers, etc. In various embodiments of the HMD 2202, any of various kinds of interfaces may be included to enable greater connectivity of the HMD 2202.

A Wi-Fi™ module 2232 is included for enabling connection to the Internet via wireless networking technologies. Also, the HMD 2202 includes a Bluetooth™ module 2234 for enabling wireless connection to other devices. A communications link 2236 is also included, in some embodiments, for connection to other devices. In one embodiment, the communications link 2236 utilizes infrared transmission for wireless communication. In other embodiments, the communications link 2236 utilizes any of various wireless or wired transmission protocols for communication with other devices.

Input buttons/sensors 2238 are included to provide an input interface for the player. Any of various kinds of input interfaces are included, such as buttons, touchpad, joystick, trackball, etc. An ultra-sonic communication module 2240 is included, in various embodiments, in the HMD 2202 for facilitating communication with other devices via ultra-sonic technologies.

Bio-sensors 2242 are included to enable detection of physiological data from the player. In one embodiment, the bio-sensors 2242 include one or more dry electrodes for detecting bio-electric signals of the player, through the player's skin.

The foregoing components of HMD 2202 have been described as merely exemplary components that may be included in HMD 2202. In various embodiments, the HMD 2202 includes or does not include some of the various aforementioned components.

Figure 23:
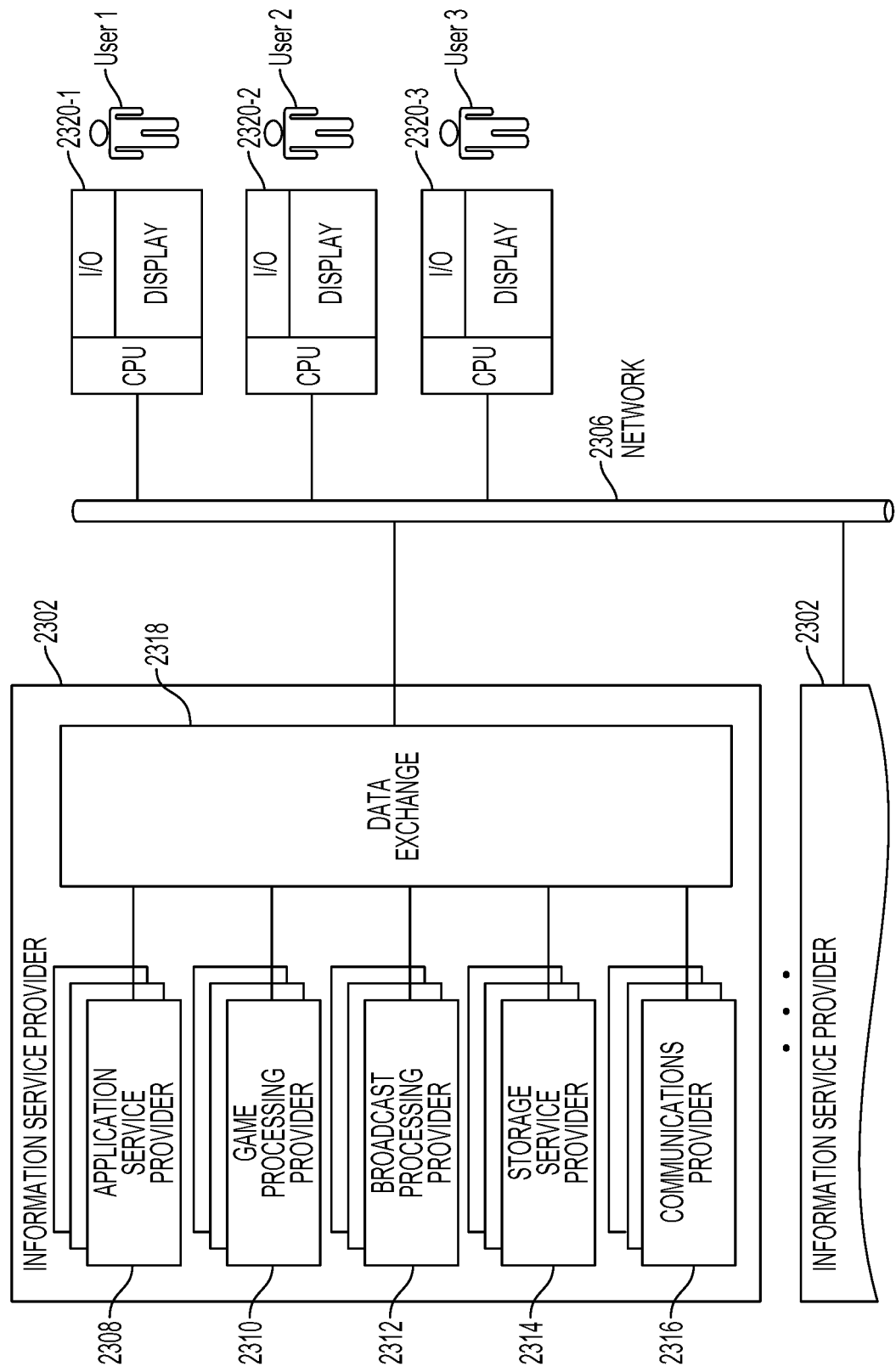
FIG. 23 illustrates an embodiment of an Information Service Provider (INSP) architecture.

FIG. 23 illustrates an embodiment of an Information Service Provider (INSP) architecture. INSPs 2302 delivers a multitude of information services to the player geographically dispersed and connected via a computer network 2306, e.g., a local area network (LAN), a wide area network (WAN), or a combination thereof, etc. The computer network 2306 is an example of the computer network 2020 (FIG. 20). An example of the WAN includes the Internet and an example of the LAN includes an Intranet. The user 1 operates a client device 2320-1, the user 2 operates another client device 2320-2, and a user 3 operates yet another client device 2320-3.

In some embodiments, each client device 2320-1, 2320-2, and 2320-3 includes a central processing unit (CPU), a display, and an input/output (I/O) interface. Examples of each client device 2320-1, 2320-2, and 2320-3 include a personal computer (PC), a mobile phone, a netbook, a tablet, a gaming system, a personal digital assistant (PDA), the game console 2100 and a display device, the HMD 2202 (FIG. 22), the game console 2100 and the HMD 2202, a desktop computer, a laptop computer, and a smart television, etc. In some embodiments, the INSP 2302 recognizes a type of a client device and adjusts a communication method employed.

In some embodiments, an INSP 2302 delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 2320-1 is served by an INSP in near proximity to the client device 2320-1 while the client device 2320-1 is in a home town of the user 1, and client device 2320-1 is served by a different INSP when the user 1 travels to a different city. The home-town INSP will transfer requested information and data to the new INSP, such that the information "follows" the client device 2320-1 to the new city making the data closer to the client device 2320-1 and easier to access. In various embodiments, a master-server relationship is established between a master INSP, which manages the information for the client device 2320-1, and a server INSP that interfaces directly with the client device 2320-1 under control from the master INSP. In some embodiments, data is transferred from one ISP to another ISP as the client device 2320-1 moves around the world to make the INSP in better position to service client device 2320-1 be the one that delivers these services.

The INSP 2302 includes an Application Service Provider (ASP) 2308, which provides computer-based services to customers over the computer network 2306. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 2320-1, 2320-2, and 2320-3 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 2306. The users 1 through 3 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 2306, e.g., using servers, storage and logic, etc., based on how the computer network 2306 is depicted in computer network diagrams and is an abstraction for the complex infrastructure it conceals.

Further, the INSP 2302 includes a game processing provider (GPP) 2310, also sometime referred to herein as a game processing server, which is used by the client devices 2320-1, 2320-2, and 2320-3 to play single and multiplayer video games. Most video games played over the computer network 2306 operate via a connection to a game server. Typically, games use a dedicated server application that collects data from the client devices 2320-1, 2320-2, and 2320-3 and distributes it to other clients that are operated by other users. This is more efficient and effective than a peer-to-peer arrangement, but a separate server is used to host the server application. In some embodiments, the GPP 2310 establishes communication between the client devices 2320-1, 2320-2, and 2320-3, which exchange information without further relying on the centralized GPP 2310.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 2312, sometimes referred to herein as a broadcast processing provider, distributes audio or video signals to an audience. Broadcasting to a very narrow range of audience is sometimes called narrowcasting. A final leg of broadcast distribution is how a signal gets to the client devices 2320-1, 2320-2, and 2320-3, and the signal, in some embodiments, is distributed over the air as with a radio station or a television station to an antenna and receiver, or through a cable television or cable radio or "wireless cable" via the station. The computer network 2306 also brings, in various embodiments, either radio or television signals to the client devices 2320-1, 2320-2, and 2320-3, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 2314 provides computer storage space and related management services. The SSP 2314 also offers periodic backup and archiving. By offering storage as a service, the client devices 2320-1, 2320-2, and 2320-3 use more storage compared to when storage is not used as a service. Another major advantage is that the SSP 2314 includes backup services and the client devices 2320-1, 2320-2, and 2320-3 will not lose data if their hard drives fail. Further, a plurality of SSPs, in some embodiments, have total or partial copies of the data received from the client devices 2320-1, 2320-2, and 2320-3, allowing the client devices 2320-1, 2320-2, and 2320-3 to access data in an efficient way independently of where the client devices 2320-1, 2320-2, and 2320-3 are located or of types of the clients. For example, the player accesses personal files via a home computer, as well as via a mobile phone while the player is on the move.

A communications provider 2316 provides connectivity to the client devices 2320-1, 2320-2, and 2320-3. One kind of the communications provider 2316 is an Internet service provider (ISP), which offers access to the computer network 2306. The ISP connects the client devices 2320-1, 2320-2, and 2320-3 using a data transmission technology appropriate for delivering Internet Protocol datagrams, such as dial-up, digital subscriber line (DSL), cable modem, fiber, wireless or dedicated high-speed interconnects. The communications provider 2316 also provides, in some embodiments, messaging services, such as e-mail, instant messaging, and short message service (SMS) texting. Another type of a communications Provider is a network service provider (NSP), which sells bandwidth or network access by providing direct backbone access to the computer network 2306. Examples of network service providers include telecommunications companies, data carriers, wireless communications providers, Internet service providers, cable television operators offering high-speed Internet access, etc.

A data exchange 2318 interconnects the several modules inside INSP 2302 and connects these modules to the client devices 2320-1, 2320-2, and 2320-3 via the computer network 2306. The data exchange 2318 covers, in various embodiments, a small area where all the modules of INSP 2302 are in close proximity, or covers a large geographic area when the different modules are geographically dispersed. For example, the data exchange 2302 includes a fast Gigabit Ethernet within a cabinet of a data center, or an intercontinental virtual LAN.

In some embodiments, communication between the server system 404 (FIGS. 4A and 13) and the client devices 2320-1 through 2320-3 may be facilitated using wireless technologies. Such technologies may include, for example, 5G wireless communication technologies.

In one embodiment, a video game, such as the legacy game N or the meta-game, as described herein, is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a CD-ROM, a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method generating a meta-game, comprising:
receiving, via a first user account, a first user input for a first challenge during a play of one or more legacy games, wherein the first challenge is created from a first plurality of basic blocks of the one or more legacy games;
recording at least a portion of the first challenge;
receiving, via the first user account, a second user input for a second challenge during the play of the one or more legacy games, wherein the second challenge is created from a second plurality of basic blocks of the one or more legacy games, wherein the first plurality of basic blocks are compiled from a first plurality of instructions of the one or more legacy games and the second plurality of basic blocks are compiled from a second plurality of instructions of the one or more legacy games to enable the one or more legacy games to be played on an updated machine;
recording at least a portion of the second challenge;
determining whether a third user input is received via the first user account to request creation of the meta-game; and
generating the meta-game from the first and second challenges upon determining that the third user input is received.

2. The method of claim 1, further comprising:
providing an option via the first user account to select a sequence of execution of the first challenge and the second challenge;
receiving the sequence via the first user account;
stitching the first plurality of basic blocks and the second plurality of basic blocks according to the sequence;
receiving a user input via a second user account requesting execution of the meta-game; and
executing the first and second plurality of basic blocks in the sequence in response to the user input received via the second user account.

3. The method of claim 1, further comprising:
receiving a fourth user input via the first user account to create a leadership scoreboard for the meta-game;
creating the leadership scoreboard in response to the fourth user input, wherein the leadership scoreboard includes a total of a first number of points accumulated via the first user account during a play of the first challenge and a second number of points accumulated via the first user account during a play of the second challenge;
posting the total to the leadership scoreboard;
receiving a number of points accumulated in a second user account during a play of the meta-game;
determining whether the total exceeds the number of points accumulated in the second user account; and determining an order of display of the total and the number of points accumulated in the second user account.

4. The method of claim 1, further comprising:
attaching a trophy to the meta-game;
receiving a request to play the meta-game via a second user account;
determining whether a number of points accumulated during a play of the meta-game via the second user account exceeds a pre-determined limit;
awarding the trophy to the second user account in response to determining that the number of points accumulated during the play of the meta-game exceeds the pre-determined limit.

5. The method of claim 1, further comprising:
determining that a first user input to play the meta-game is received via the second user account;
determining whether a second user input is received via a second user account to attach a ghost to a virtual object of the meta-game, wherein the virtual object is controlled during a play of the first challenge and a play of the second challenge via the first user account;
attaching the ghost to the virtual object controlled via the second user account upon determining that the second user input is received via the second user account.

6. The method of claim 1, further comprising:
determining that a first user input to play the meta-game is received via a second user account;
determining whether a second user input is received via the second user account to play the recordings of the first and second challenges;
overlaying the recordings on a display of the meta-game upon determining that the second user input is received via the second user account.

7. The method of claim 1, wherein the first plurality of instructions and the second plurality of instructions cannot be executed in the updated machine that includes a 64-bit processor and can be executed in a legacy machine that includes a 32-bit processor.

8. The method of claim 1, wherein the first and second pluralities of basic blocks cannot be executed in a legacy machine that includes a 32-bit processor and can be executed in the updated machine that includes a 64-bit processor.

9. A computer system for generating a meta-game, comprising:
a processor configured to:
receive, via a first user account, a first user input for a first challenge during a play of one or more legacy games, wherein the first challenge is created from a first plurality of basic blocks of the one or more legacy games;
record at least a portion of the first challenge;
receive, via the first user account, a second user input for a second challenge during the play of the one or more legacy games, wherein the second challenge is created from a second plurality of basic blocks of the one or more legacy games, wherein the first plurality of basic blocks are compiled from a first plurality of instructions of the one or more legacy games and the second plurality of basic blocks are compiled from a second plurality of instructions of the one or more legacy games to enable the one or more legacy games to be played on an updated machine;
record at least a portion of the second challenge;
determine whether a third user input is received via the first user account to request a play of the meta-game; and
generate the meta-game from the first and second challenges upon determining that the third user input is received; and
a memory device coupled to the processor.

10. The computer system of claim 9, wherein the processor is configured to:
provide an option via the first user account to select a sequence of execution of the first challenge and the second challenge;
receive the sequence via the first user account;
stitch the first plurality of basic blocks and the second plurality of basic blocks according to the sequence;
receive a user input via a second user account requesting execution of the meta-game; and
execute the first and second plurality of basic blocks in the sequence in response to the user input received via the second user account.

11. The computer system of claim 9, wherein the processor is configured to:
receive a fourth user input via the first user account to create a leadership scoreboard for the meta-game;
create the leadership scoreboard in response to the fourth user input, wherein the leadership scoreboard includes a total of a first number of points accumulated via the first user account during a play of the first challenge and a second number of points accumulated via the first user account during a play of the second challenge;
post the total to the leadership scoreboard;
receive a number of points accumulated in a second user account during a play of the meta-game;
determine whether the total exceeds the number of points accumulated in the second user account; and
determine an order of display of the total and the number of points accumulated in the second user account.

12. The computer system of claim 9, wherein the processor is configured to:
attach a trophy to the meta-game;
receive a request to play the meta-game via a second user account;
determine whether a number of points accumulated during a play of the meta-game via the second user account exceeds a pre-determined limit;
award the trophy to the second user account in response to determining that the number of points accumulated during the play of the meta-game exceeds the pre-determined limit.

13. The computer system of claim 9, wherein the processor is configured to:
determine that a first user input to play the meta-game is received via the second user account;
determine whether a second user input is received via a second user account to attach a ghost to a virtual object of the meta-game, wherein the virtual object is controlled during a play of the first challenge and a play of the second challenge via the first user account;
attach the ghost to the virtual object controlled via the second user account upon determining that the second user input is received via the second user account.

14. The computer system of claim 9, wherein the processor is configured to:
determine that a first user input to play the meta-game is received via a second user account;

determine whether a second user input is received via the second user account to play the recordings of the first and second challenges;

overlay the recordings on a display of the meta-game upon determining that the second user input is received via the second user account.

15. The computer system of claim 9, wherein the first plurality of instructions and the second plurality of instructions cannot be executed in the updated machine that includes a 64-bit processor and can be executed in a legacy machine that includes a 32-bit processor.

16. The computer system of claim 9, wherein the first and second pluralities of basic blocks cannot be executed in a legacy machine that includes a 32-bit processor and can be executed in the updated machine that includes a 64-bit processor.

17. A non-transitory computer-readable medium containing program instructions for generating a meta-game, wherein execution of the program instructions by one or more processors of a computer system causes the one or more processors to carry out a plurality of operations of:

receiving, via a first user account, a first user input for a first challenge during a play of one or more legacy games, wherein the first challenge is created from a first plurality of basic blocks of the one or more legacy games;

recording at least a portion of the first challenge;

receiving, via the first user account, a second user input for a second challenge during the play of the one or more legacy games, wherein the second challenge is created from a second plurality of basic blocks of the one or more legacy games, wherein the first plurality of basic blocks are compiled from a first plurality of instructions of the one or more legacy games and the second plurality of basic blocks are compiled from a second plurality of instructions of the one or more legacy games to enable the one or more legacy games to be played on an updated machine;

recording at least a portion of the second challenge;

determining whether a third user input is received via the first user account to request a play of the meta-game; and generating the meta-game from the first and second challenges upon determining that the third user input is received.

18. The non-transitory computer-readable medium of claim 17, wherein the plurality of operations include:

providing an option via the first user account to select a sequence of execution of the first challenge and the second challenge;

receiving the sequence via the first user account;

stitching the first plurality of basic blocks and the second plurality of basic blocks according to the sequence;

receiving a user input via a second user account requesting execution of the meta-game; and executing the first and second plurality of basic blocks in the sequence in response to the user input received via the second user account.

19. The non-transitory computer-readable medium of claim 17, wherein the plurality of operations include:

receiving a fourth user input via the first user account to create a leadership scoreboard for the meta-game;

creating the leadership scoreboard in response to the fourth user input, wherein the leadership scoreboard includes a total of a first number of points accumulated via the first user account during a play of the first challenge and a second number of points accumulated via the first user account during a play of the second challenge;

posting the total to the leadership scoreboard;

receiving a number of points accumulated in a second user account during a play of the meta-game;

determining whether the total exceeds the number of points accumulated in the second user account; and determining an order of display of the total and the number of points accumulated in the second user account.

20. The non-transitory computer-readable medium of claim 17, wherein the plurality of operations include:

attaching a trophy to the meta-game;

receiving a request to play the meta-game via a second user account;

determining whether a number of points accumulated during a play of the meta-game via the second user account exceeds a pre-determined limit;

awarding the trophy to the second user account in response to determining that the number of points accumulated during the play of the meta-game exceeds the pre-determined limit.

* * * * *